United States Patent
Isaacson et al.

(10) Patent No.: US 10,489,776 B2
(45) Date of Patent: Nov. 26, 2019

(54) SYSTEM AND METHOD FOR MANAGING GIFT CREDITS

(71) Applicant: GiftYa LLC, Pittsburgh, PA (US)

(72) Inventors: Thomas M. Isaacson, Huntingtown, MD (US); Ryan C. Durham, Dunkirk, MD (US); Jason Wolfe, Sewickley, PA (US); Patrick Ledbetter, Arlington, VA (US); Adam Ludwig, San Francisco, CA (US)

(73) Assignee: GIFTYA LLC, Pittsburgh, PA (US)

( * ) Notice: Subject to any disclaimer, the term of this patent is extended or adjusted under 35 U.S.C. 154(b) by 0 days.

(21) Appl. No.: 15/882,597

(22) Filed: Jan. 29, 2018

(65) Prior Publication Data

US 2018/0165675 A1    Jun. 14, 2018

Related U.S. Application Data

(63) Continuation-in-part of application No. 14/335,358, filed on Jul. 18, 2014, now Pat. No. 9,881,299, which
(Continued)

(51) Int. Cl.
*G06Q 30/00*    (2012.01)
*G06Q 20/34*    (2012.01)
(Continued)

(52) U.S. Cl.
CPC .......... *G06Q 20/342* (2013.01); *G06Q 20/10* (2013.01); *G06Q 20/105* (2013.01); *G06Q 20/12* (2013.01);
(Continued)

(58) Field of Classification Search
CPC ..................................................... G06Q 20/00
(Continued)

(56) References Cited

U.S. PATENT DOCUMENTS 5,580,196 A    12/1996    Thompson
5,590,196 A    12/1996    Moreau
(Continued)

FOREIGN PATENT DOCUMENTS

GB    2376787    12/2002
JP    2002/222377    8/2002
(Continued)

OTHER PUBLICATIONS

NPL Search History.*
(Continued)

*Primary Examiner* — John H. Holly

(57) ABSTRACT

A system transfers money to a recipient's payment card account, without requiring an additional payment card or without acquiring a recipient's payment card or account information. A recipient registers a payment account with a service provider. A system receives an identification, generated from an entity such as a business or a person, of the recipient and information associated with an electronic notice to be transmitted to a device associated with the recipient. The system transmits the notice (advertisement or offer) to the device, the notice being associated with the recipient payment account and being transmitted prior to the recipient buying product or service associated with the notice using the recipient payment account. The notice can be associated with a network merchant category or network merchant ID for managing a gift credit identified in the notice. The system receives an indication of a purchase associated with the notice and completed using the recipient payment account and applies the gift credit.

20 Claims, 61 Drawing Sheets

Related U.S. Application Data is a continuation of application No. 14/219,276, filed on Mar. 19, 2014, now abandoned, which is a continuation-in-part of application No. 14/193,068, filed on Feb. 28, 2014, now Pat. No. 8,751,392, which is a continuation of application No. 12/075,655, filed on Mar. 13, 2008, now Pat. No. 8,676,704, said application No. 14/335,358 is a continuation-in-part of application No. 12/475,122, filed on May 29, 2009, now abandoned, said application No. 14/335,358 is a continuation-in-part of application No. 13/301,327, filed on Nov. 21, 2011, now abandoned, which is a continuation-in-part of application No. 12/967,253, filed on Dec. 14, 2010, now Pat. No. 8,285,643, said application No. 14/335,358 is a continuation-in-part of application No. 13/754,401, filed on Jan. 30, 2013, now abandoned, which is a continuation-in-part of application No. 13/175,234, filed on Jul. 1, 2011, now abandoned, which is a continuation of application No. 12/967,253, filed on Dec. 14, 2010, now Pat. No. 8,285,643, said application No. 14/335,358 is a continuation-in-part of application No. 13/771,791, filed on Feb. 20, 2013, now abandoned, which is a continuation-in-part of application No. 13/686,189, filed on Nov. 27, 2012, now abandoned, which is a continuation of application No. 13/470,969, filed on May 14, 2012, now abandoned, which is a continuation of application No. 12/967,253, filed on Dec. 14, 2010, now Pat. No. 8,285,643.

(60) Provisional application No. 61/057,106, filed on May 29, 2008.

(51) Int. Cl.
*G06Q 40/02* (2012.01)
*G06Q 20/10* (2012.01)
*G06Q 20/24* (2012.01)
*G06Q 20/12* (2012.01)

(52) U.S. Cl.
CPC .............. *G06Q 20/24* (2013.01); *G06Q 20/34* (2013.01); *G06Q 40/02* (2013.01)

(58) Field of Classification Search
USPC ...... 705/41, 1.1, 39, 14.32, 44, 26.1, 67, 64, 705/40; 235/380, 381
See application file for complete search history.

(56) References Cited

U.S. PATENT DOCUMENTS

| | | |
|---|---|---|
| 5,794,219 A | 8/1998 | Brown |
| 5,848,396 A | 12/1998 | Gerace |
| 5,861,841 A | 1/1999 | Gildea et al. |
| H1794 H | 4/1999 | Claus |
| 5,963,647 A | 10/1999 | Downing et al. |
| 5,984,180 A | 11/1999 | Albrecht |
| 6,000,608 A | 12/1999 | Dorf |
| 6,014,634 A | 1/2000 | Scroggie et al. |
| 6,014,635 A | 1/2000 | Harris et al. |
| 6,044,360 A | 3/2000 | Picciallo |
| 6,068,183 A | 5/2000 | Freeman et al. |
| 6,173,269 B1 | 1/2001 | Solokl et al. |
| 6,175,823 B1 | 1/2001 | Van Dusen |
| 6,182,895 B1 | 2/2001 | Albrecht |
| 6,189,787 B1 | 2/2001 | Dorf |
| 6,292,786 B1* | 9/2001 | Deaton .............. G06Q 20/0457 705/14.25 |
| 6,321,211 B1 | 11/2001 | Dodd |
| 6,330,543 B1 | 12/2001 | Kepecs |
| 6,370,514 B1 | 4/2002 | Messner |
| 6,408,307 B1 | 6/2002 | Semple et al. |
| 6,454,165 B1 | 9/2002 | Dawson |
| 6,484,148 B1 | 11/2002 | Boyd |
| 6,487,538 B1 | 11/2002 | Gupta et al. |
| 6,505,046 B1 | 1/2003 | Baker |
| 6,526,335 B1 | 2/2003 | Treyz et al. |
| 6,546,257 B1 | 4/2003 | Stewart |
| 6,571,279 B1 | 5/2003 | Herz et al. |
| 6,587,835 B1 | 7/2003 | Treyz et al. |
| 6,594,644 B1 | 7/2003 | Van Dusen |
| 6,601,037 B1 | 7/2003 | Kolls |
| 6,606,602 B1 | 8/2003 | Kolls |
| 6,609,106 B1 | 8/2003 | Robertson |
| 6,672,507 B1 | 1/2004 | Walker et al. |
| 6,711,474 B1 | 3/2004 | Treyz et al. |
| 6,775,539 B2 | 8/2004 | Deshpande |
| 6,795,710 B1 | 9/2004 | Creemer |
| 6,805,289 B2 | 10/2004 | Noriega et al. |
| 6,865,546 B1 | 3/2005 | Song |
| 6,889,054 B2 | 5/2005 | Himmel et al. |
| 6,947,976 B1 | 9/2005 | Devitt et al. |
| 6,970,871 B1 | 11/2005 | Rayburn |
| 7,010,512 B1 | 3/2006 | Gillin et al. |
| 7,021,531 B2 | 4/2006 | Myttenaere |
| 7,039,601 B2 | 5/2006 | Gary |
| 7,089,208 B1 | 8/2006 | Levchin et al. |
| 7,127,236 B2 | 10/2006 | Khan et al. |
| 7,165,049 B2 | 1/2007 | Slater |
| 7,200,566 B1 | 4/2007 | Moore et al. |
| 7,204,412 B2 | 4/2007 | Foss, Jr. |
| 7,213,027 B1 | 5/2007 | Kominek et al. |
| 7,280,984 B2 | 10/2007 | Phelan, III et al. |
| 7,357,331 B2 | 4/2008 | Blossom |
| 7,512,552 B2 | 3/2009 | Karas et al. |
| 7,559,465 B2 | 7/2009 | Rosenblatt |
| 7,593,862 B2 | 9/2009 | Mankoff |
| 7,603,292 B1 | 10/2009 | Bragg et al. |
| 7,698,221 B2 | 4/2010 | Blinn et al. |
| 7,792,751 B2 | 9/2010 | Tan |
| 7,831,439 B1 | 11/2010 | Bryar |
| 7,860,789 B2 | 12/2010 | Hirka et al. |
| 7,861,919 B2 | 1/2011 | Spaeth et al. |
| 7,870,022 B1 | 1/2011 | Bous et al. |
| 7,873,573 B2 | 1/2011 | Realini |
| 8,046,266 B1 | 10/2011 | Geller et al. |
| 8,112,315 B2 | 2/2012 | Dooley et al. |
| 8,452,707 B2 | 5/2013 | Sharma |
| 8,478,638 B2 | 7/2013 | Postrel |
| 8,577,735 B2 | 11/2013 | Wilen et al. |
| 8,589,267 B2 | 11/2013 | Hurst |
| 8,639,629 B1* | 1/2014 | Hoffman ................ G06Q 20/20 705/44 |
| 9,760,936 B1 | 9/2017 | Shaw |
| 2001/0039519 A1 | 11/2001 | Richards |
| 2001/0054066 A1 | 12/2001 | Spitzer |
| 2002/0035605 A1 | 3/2002 | McDowell et al. |
| 2002/0040438 A1 | 4/2002 | Fisher, Jr. |
| 2002/0042775 A1 | 4/2002 | Nelson |
| 2002/0046341 A1 | 4/2002 | Kazaks et al. |
| 2002/0062246 A1 | 5/2002 | Matsubara |
| 2002/0174016 A1 | 11/2002 | Cuervo |
| 2003/0028515 A1 | 2/2003 | Nishikado et al. |
| 2003/0028518 A1 | 2/2003 | Mankoff |
| 2003/0040959 A1 | 2/2003 | Fei et al. |
| 2003/0083941 A1 | 5/2003 | Moran et al. |
| 2003/0130907 A1 | 7/2003 | Karas et al. |
| 2003/0171997 A1 | 9/2003 | Eaton |
| 2003/0182191 A1 | 9/2003 | Oliver et al. |
| 2003/0216960 A1 | 11/2003 | Postrel |
| 2004/0002897 A1 | 1/2004 | Vishik |
| 2004/0073482 A1 | 4/2004 | Wiggins et al. |
| 2004/0078283 A1 | 4/2004 | Gary |
| 2004/0089714 A1 | 5/2004 | Raadsen |
| 2004/0111361 A1 | 6/2004 | Griffiths et al. |
| 2004/0148228 A1 | 7/2004 | Kwei |
| 2004/0162775 A1 | 8/2004 | Winklevoss et al. |
| 2004/0203852 A1 | 10/2004 | Janskiraman |
| 2004/0225605 A1 | 11/2004 | Rowe |

(56) References Cited

U.S. PATENT DOCUMENTS

| | | |
|---|---|---|
| 2004/0249712 A1 | 12/2004 | Brown et al. |
| 2004/0254891 A1 | 12/2004 | Blinn |
| 2005/0075932 A1 | 4/2005 | Mankoff |
| 2005/0092828 A1 | 5/2005 | Phillips |
| 2005/0097005 A1 | 5/2005 | Fargo |
| 2005/0108121 A1 | 5/2005 | Gravett et al. |
| 2005/0108159 A1 | 5/2005 | Gravett |
| 2005/0131761 A1 | 6/2005 | Trika et al. |
| 2005/0177493 A1 | 8/2005 | Sung |
| 2005/0197919 A1 | 9/2005 | Robertson |
| 2005/0199712 A1* | 9/2005 | Rosenblatt ............ G06Q 20/10 235/381 |
| 2005/0209958 A1 | 9/2005 | Michelsen et al. |
| 2005/0234771 A1 | 10/2005 | Register et al. |
| 2006/0015405 A1 | 1/2006 | Bala et al. |
| 2006/0059070 A1 | 3/2006 | Petruck |
| 2006/0074767 A1 | 4/2006 | Fortney et al. |
| 2006/0095338 A1 | 5/2006 | Seidel |
| 2006/0122856 A1 | 6/2006 | Rushton et al. |
| 2006/0178932 A1 | 8/2006 | Lang |
| 2006/0208065 A1 | 9/2006 | Mendelovich et al. |
| 2006/0229950 A1 | 10/2006 | Pabbisetty |
| 2006/0253320 A1 | 11/2006 | Heywood |
| 2006/0258397 A1 | 11/2006 | Kaplan et al. |
| 2006/0293963 A1 | 12/2006 | Hoblit |
| 2007/0012759 A1 | 1/2007 | Allarea et al. |
| 2007/0017976 A1 | 1/2007 | Peyret et al. |
| 2007/0022007 A1 | 1/2007 | Lawe |
| 2007/0050711 A1 | 3/2007 | Walker et al. |
| 2007/0063020 A1 | 3/2007 | Barrafato |
| 2007/0073589 A1 | 3/2007 | Vergeyle et al. |
| 2007/0088610 A1 | 4/2007 | Chen |
| 2007/0088801 A1 | 4/2007 | Levkovitz et al. |
| 2007/0103993 A1 | 5/2007 | Mount et al. |
| 2007/0140176 A1 | 6/2007 | Bachenberg |
| 2007/0143177 A1 | 6/2007 | Graves et al. |
| 2007/0150413 A1 | 6/2007 | Morgenstern |
| 2007/0158413 A1 | 7/2007 | Hastie |
| 2007/0168265 A1 | 7/2007 | Rosenberger |
| 2007/0174120 A1 | 7/2007 | Asmar et al. |
| 2007/0175984 A1 | 8/2007 | Khandaker et al. |
| 2007/0179888 A1 | 8/2007 | Angelovich |
| 2007/0192182 A1 | 8/2007 | Monaco et al. |
| 2007/0210152 A1 | 9/2007 | Read |
| 2007/0255620 A1 | 11/2007 | Tumminaro et al. |
| 2007/0255653 A1 | 11/2007 | Tumminaro et al. |
| 2007/0264991 A1 | 11/2007 | Jones et al. |
| 2007/0270165 A1 | 11/2007 | Poosala |
| 2007/0288313 A1 | 12/2007 | Brodson et al. |
| 2008/0004888 A1 | 1/2008 | Davis et al. |
| 2008/0004984 A1 | 1/2008 | Sendo et al. |
| 2008/0010114 A1 | 1/2008 | Head |
| 2008/0010120 A1 | 1/2008 | Chung |
| 2008/0027820 A1 | 1/2008 | Brill |
| 2008/0033817 A1 | 2/2008 | Billmaier et al. |
| 2008/0033857 A1 | 2/2008 | Moses |
| 2008/0040240 A1 | 2/2008 | Covington |
| 2008/0048023 A1 | 2/2008 | Russell et al. |
| 2008/0082424 A1 | 4/2008 | Walton |
| 2008/0091528 A1 | 4/2008 | Rampell et al. |
| 2008/0091535 A1 | 4/2008 | Heiser et al. |
| 2008/0097851 A1 | 4/2008 | Bemmel et al. |
| 2008/0099551 A1 | 5/2008 | Harper |
| 2008/0133257 A1 | 6/2008 | Adkisson et al. |
| 2008/0189189 A1 | 8/2008 | Morgenstern |
| 2008/0223922 A1 | 9/2008 | Weitzman |
| 2008/0235122 A1 | 9/2008 | Weitzman |
| 2008/0243628 A1 | 10/2008 | Wiseman |
| 2008/0243630 A1 | 10/2008 | Farney |
| 2008/0255948 A1 | 10/2008 | Garner |
| 2008/0288406 A1 | 11/2008 | Sequin et al. |
| 2008/0301005 A1 | 12/2008 | Nieda et al. |
| 2008/0301044 A1 | 12/2008 | Vardi |
| 2009/0006212 A1 | 1/2009 | Krajicek |
| 2009/0018916 A1 | 1/2009 | Seven et al. |
| 2009/0018959 A1 | 1/2009 | Doran et al. |
| 2009/0032581 A1 | 2/2009 | Esslinger et al. |
| 2009/0048926 A1 | 2/2009 | Salesky et al. |
| 2009/0063295 A1 | 3/2009 | Smith |
| 2009/0094134 A1 | 4/2009 | Toomer et al. |
| 2009/0112709 A1 | 4/2009 | Barhydt |
| 2009/0125410 A1 | 5/2009 | Perlman |
| 2009/0132387 A1 | 5/2009 | Majdoub |
| 2009/0132415 A1 | 5/2009 | Davis et al. |
| 2009/0138397 A1 | 5/2009 | Sharma |
| 2009/0159698 A1 | 6/2009 | Mullen et al. |
| 2009/0171683 A1 | 7/2009 | Hoyos et al. |
| 2009/0192928 A1 | 7/2009 | Abifaker |
| 2009/0234771 A1 | 9/2009 | Ledbetter et al. |
| 2009/0271265 A1 | 10/2009 | Lay et al. |
| 2009/0287579 A1 | 11/2009 | Walker et al. |
| 2009/0307130 A1 | 12/2009 | Tan |
| 2009/0307143 A1 | 12/2009 | Reistad et al. |
| 2009/0313109 A1 | 12/2009 | Bous et al. |
| 2009/0327067 A1 | 12/2009 | Berger et al. |
| 2009/0327129 A1 | 12/2009 | Collas |
| 2010/0010918 A1 | 1/2010 | Hunt |
| 2010/0017278 A1 | 1/2010 | Wilen et al. |
| 2010/0023341 A1 | 1/2010 | Ledbetter et al. |
| 2010/0023418 A1 | 1/2010 | Bader et al. |
| 2010/0036524 A1 | 2/2010 | Chirco |
| 2010/0057580 A1 | 3/2010 | Raghunathan |
| 2010/0076833 A1 | 3/2010 | Nelsen |
| 2010/0106592 A1 | 4/2010 | Brown |
| 2010/0299194 A1 | 11/2010 | Snyder |
| 2010/0299208 A1 | 11/2010 | Carlson et al. |
| 2010/0299227 A1 | 11/2010 | Smith |
| 2010/0299228 A1 | 11/2010 | Smith |
| 2010/0325006 A1 | 12/2010 | White |
| 2011/0004512 A1 | 1/2011 | Postrel |
| 2011/0011931 A1 | 1/2011 | Farley et al. |
| 2011/0016023 A1 | 1/2011 | Zakas |
| 2011/0029370 A1 | 2/2011 | Roeding |
| 2011/0106698 A1 | 5/2011 | Isaacson et al. |
| 2011/0282784 A1 | 11/2011 | Nelsen |
| 2011/0295749 A1 | 12/2011 | Scalisi |
| 2011/0311164 A1 | 12/2011 | Badharudeen |
| 2012/0029990 A1 | 2/2012 | Fisher |
| 2012/0066041 A1 | 3/2012 | Mankoff |
| 2012/0066212 A1 | 3/2012 | Jennings |
| 2012/0150728 A1 | 6/2012 | Isaacson |
| 2012/0197716 A1 | 8/2012 | Rampell et al. |
| 2012/0197754 A1 | 8/2012 | Kalin |
| 2012/0226614 A1 | 9/2012 | Gura |
| 2012/0265625 A1 | 10/2012 | Pletz |
| 2012/0316975 A1 | 12/2012 | Schorr |
| 2013/0073369 A1 | 3/2013 | Begum |
| 2013/0096997 A1 | 4/2013 | Benedikt |
| 2013/0132294 A1 | 5/2013 | Schvey |
| 2013/0166445 A1 | 6/2013 | Isaacson |
| 2013/0179268 A1 | 7/2013 | Hu |
| 2013/0211890 A1 | 8/2013 | Heitmueller |
| 2013/0254068 A1 | 9/2013 | Scipioni et al. |
| 2014/0019283 A1 | 1/2014 | Daley |
| 2015/0154587 A1 | 6/2015 | Chetty |

FOREIGN PATENT DOCUMENTS

| | | |
|---|---|---|
| JP | 2002/334287 | 11/2002 |
| JP | 2004/265294 | 9/2004 |
| KR | 2002/0070232 | 9/2002 |
| KR | 2002/0094340 | 12/2002 |
| KR | 2004/0076556 | 9/2004 |
| KR | 2006/0061515 | 6/2006 |
| KR | 2006/0083825 | 7/2006 |
| KR | 2007/0030467 | 3/2007 |
| KR | 2010/0045666 | 5/2010 |
| WO | WO 02/073489 | 9/2002 |
| WO | WO 03/014982 | 2/2003 |

(56) References Cited

FOREIGN PATENT DOCUMENTS

| | | |
|---|---|---|
| WO | WO 2006/065037 | 6/2006 |
| WO | WO 2013/033266 | 3/2013 |

OTHER PUBLICATIONS

"Digital Island Corrects and Replaces Previous News Release, BW2059, CA-Digital-Island", Business Wire, Jan. 22, 2001.
"AOL Digital City Kicks Off Major Expansion to Widen Lead in Fast-Growing Local Online Market", Business Wire, Mar. 21, 2000.
"WindWire Launches WindCaster; Wireless Ad Network Delivers Marketing and Advertising Over the New Wireless Web Medium", Business Wire, Jun. 27, 2000.
Launch of WindWire Undisputed Success; Leader in Wireless Advertising Solutions Serves Over One Million Ads With Click-Through Rates of More Than 15 Percent in First Week of Launch:, Business Wire, Oct. 17, 2000.
"Alcatel Introduces Advanced Version of Its Intelligent Location-Based Server", Canadian Corporate News, Mar. 20, 2001.
"Smart AdServer Targets Quova for Geolocation Needs; Adserving Innovator Switches to Quova for Reliability and Depth of Data", CCNMatthews Newswire, Feb. 5, 2008.
Susan Glairon, "New Marketing Scheme Brings Online Ads to Boulder, Colo., Wireless Customers", Knight Rider/Tribune Business News, Aug. 6, 2000.
Sarah Littman, "On the Verge: The Users are Catching Up with the Technology in the U.S. Mobile Marketing Arena. Are You Ready to Capitalize on a New Marketing Medium that is Almost Ready for its Close-Up? (Mobile Technology)", Response, Feb. 1, 2008.
"Personalized Information to Mobile Users—Add2Phone and Setec to Co-Operate in Mobile E-Commerce", M2 Presswire, Apr. 20, 2000.
Sarah McCammon, "Ladies, It's Your Night for a Bargain (Neighbor)", Daily Herald (Arlington Heights, IL), Feb. 5, 2004.
"The Next Wave in Advertising", New Straits Times, Jul. 2, 2000.
Sanjay Parekh, "Personalization: Turn Browsers Into Buyers: Gathering Customer Intelligence is an art and a Science (Customer Relationship Management)", e-Business Advisor, Sep. 1, 2002.
"[x + 1] Personalizes Web Optimization with New, Patented Technology", PR Newswire, Sep. 18, 2007.
"Power of Real Time (Brief Article)", Crain's New York Business, Oct. 30, 2000.
Michelle Speir, "BlackBerry pushes a Sweet Solution", Nov. 6, 2000, Federal Computer Week, pp. 40-42.
"Consumers Can Show Their Support for Small Business This Holiday Season on "Small Business Saturday(SM)"". Retrieved from http://about.americanexpress.com/news/pr/2010/sbs.aspx Nov. 28, 2011.
"Developments in cyberbanking" by: Adams, Lee S.; Martz, David J.; Poindexter, Obrea O.—The Business Lawyer 56.3, May 2001.

* cited by examiner

FIG. 4C

| 472 | 474 | 476 | 478 | 480 | 482 | 484 | 486 | 488 |
|---|---|---|---|---|---|---|---|---|
| SECURITY | HEADER | GIVER | RECIPIENT | AMOUNT | PAYMENT MODE | TIME | LOCATION | OTHER OPTIONS |

Figures 5A, 5B:
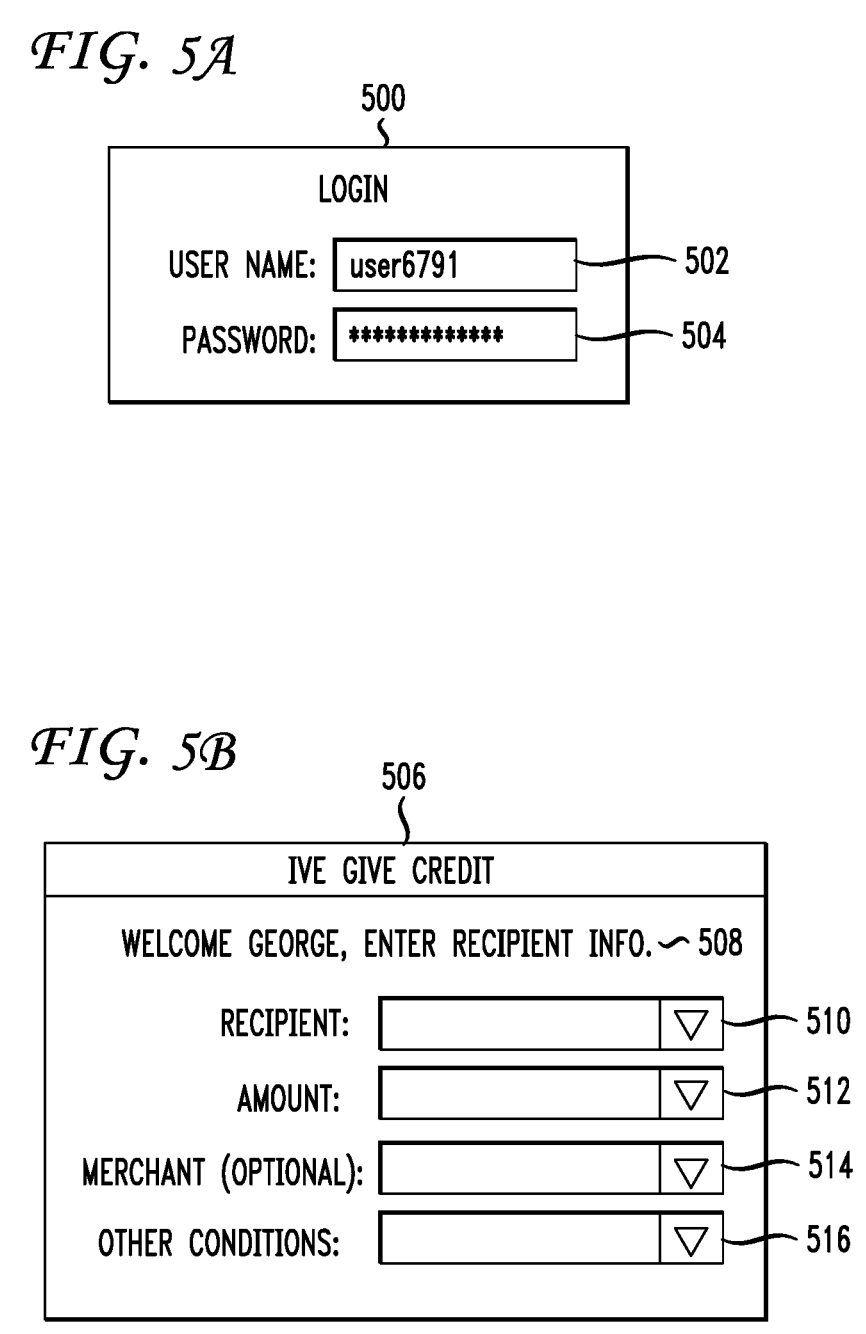

LOGIN

USER NAME: user6791 — 502

PASSWORD: ************ — 504

IVE GIVE CREDIT

WELCOME GEORGE, ENTER RECIPIENT INFO. — 508

RECIPIENT: ▽ — 510

AMOUNT: ▽ — 512

MERCHANT (OPTIONAL): ▽ — 514

OTHER CONDITIONS: ▽ — 516

From: Gift Credit Services
To: rachel@email.com
cc: george@email.com
Subject: Gift Credit from George for Home Depot

---

Rachel,

George has sent you a gift credit for Home Depot for $75 You can use the gift credit by simply using your Visa credit at any Home Depot or at Home Depot.com Best Regards,
Gift Credit Services

From: Gift Credit Services
To: rachel@email.com
cc: george@email.com
Subject: Gift Credit Funds Applied

---

Rachel,

We have applied gift credit funds of $29.64 to Your recent transaction for a shovel at Home Depot. $45.36 remains available for use at Home Depot. Just use your Visa and the remaining funds will be applied to that purchase. Click Here to manage your gift credit.

Best Regards,
Gift Credit Services rom: Gift Credit Services
To: rachel@email.com
cc: george@email.com
Subject: Gift Credit Reminder Rachel,
This is a reminder that you have $45.36 available for a Home Depot purchase. Just use your Visa to make the purchase After Dec 1 the amount will be applied to any transaction at any merchant using your Visa.

est Regards,
Gift Credit Services

FIG. 8 ent Gift Credit Portal – George (800)

| | | | | |
|---|---|---|---|---|
| 802 — 3/8/10 | Tom Jones | Home Depot | Unused | Send Reminder or Suggestion |
| 804 — 4/25/10 | Nora Jackson | Barnes & Noble | Used for "War & Peace" on 4/26/10 | Send Message |
| 806 — 6/7/10 | Chris Williams | Target | $49.99 Used for Clothing. $50.01 unused. | Send Message |
| 808 — 8/31/10 | Jade Murphy | any Video Game Purchase | Used on 9/12/10 at Gamestop for "Super Mario Galaxy 2" | Send Message |

FIG. 9

Recent Gift Credit Portal – George  900

| 3/8/10 | Tom Jones | Home Depot | Unused | Send Reminder or Suggestion |

☒ Valid Merchants: Home Depot
☐ Expiration Date: none
▨ Split Gift Credit
☒ Notification Settings: Send me an email notification when Tom uses the gift Credit
☐ Available Promotions: Require Tom to use MasterCard for a bonus 4% on the gift credit Change Policy Permissions

| IFT CREDIT PROMOTIONAL OFFERS |
|---|
| Give $50.00 to Rachel for use at Sizzler |
| PROMO FROM AMERICAN EXPRESS:<br>1102 — ☒ equire Rachel to pay via AMEX & get an extra $5.00 added to the gift credit amount.<br>PROMO FROM SIZZLER:<br>1104 — ☒ Require Rachel to use on a weekday (Monday-Thursday) evening & Rachel will get free dessert. |

| IFT CREDIT PAYMENT MODE OPTIONS |
|---|
| Giver: George<br>eceiver: Rachel.<br>Merchant: Olive Garden<br>Rachel. has two credits,<br>Please apply the virtual Gift Credit using<br>1108 — ○ Visa (+$2.00 to the credit)<br>○ Master Card (+1.00 to the credit)<br><div align="right">[SEND]</div> |

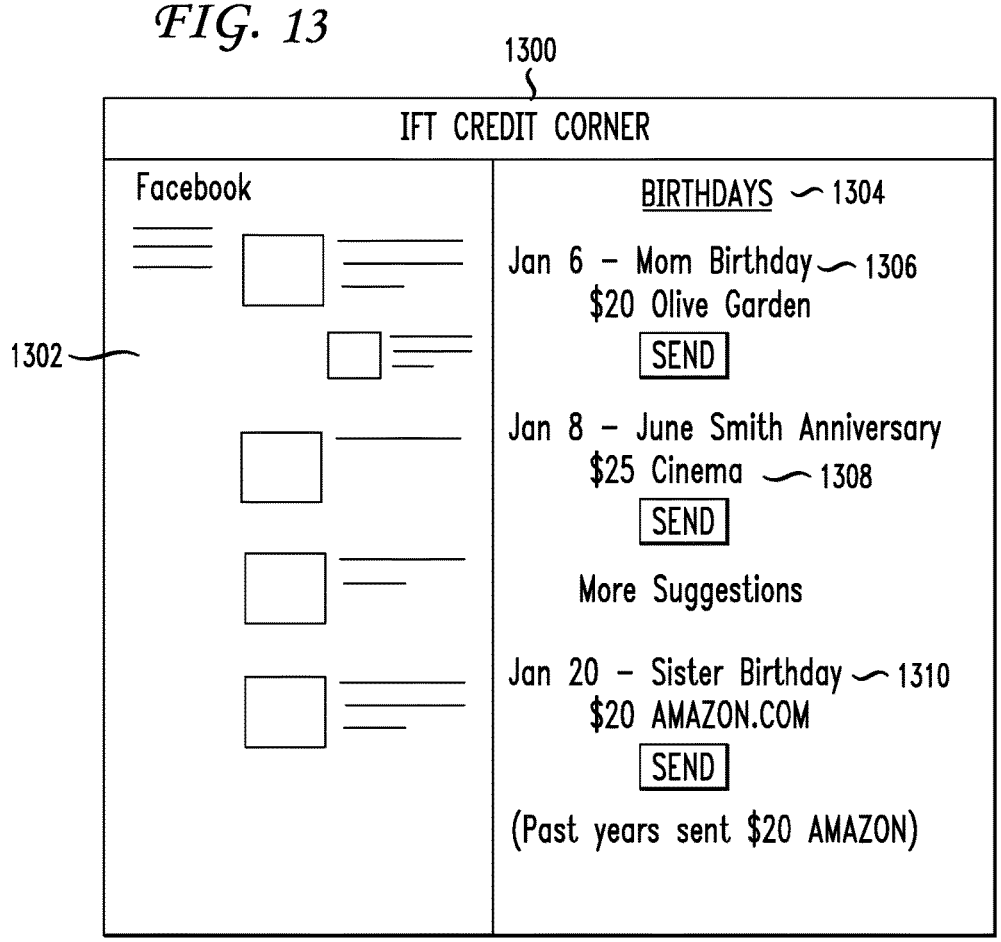

FIG. 14

IFT CREDIT SCHEDULER 1400

1402 — Mom
Birthday is: 1 April
Schedule For: 14 Mar    $40    AMEX at Red Lobster    "Happy Birthday"
☒ reminder
☐ preview 1404 — Dad
Birthday is: 6 March
Schedule For: 22 Feb    $40    VISA at Lowe's    "Don't hurt yourself! Love Ya, Tom"
☐ reminder
☒ preview 1406 — Sister
Anniversary is: 2 January
Schedule For: 17 Dec    $50    any novel by John Grisham    "Enjoy your reading in a cozy place. Happy B-Day!"
☒ reminder
☒ preview

ROUP GIFT CREDIT FOR TOM'S B-DAY

Total  $61
Largest Giver – Ginny $10
22 total Contributors
<expand> suggested amount – $10 for Business acquaintance

[Give $10]
   or
[Give] [$20] ←— 1516

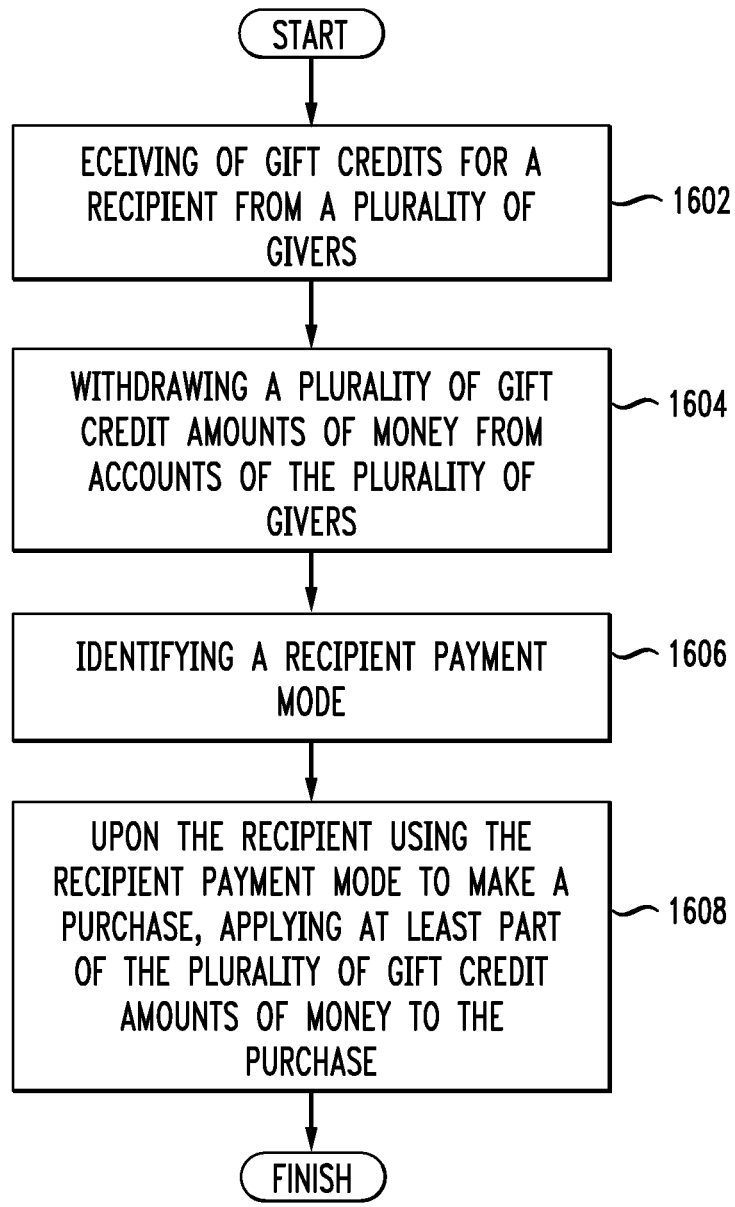

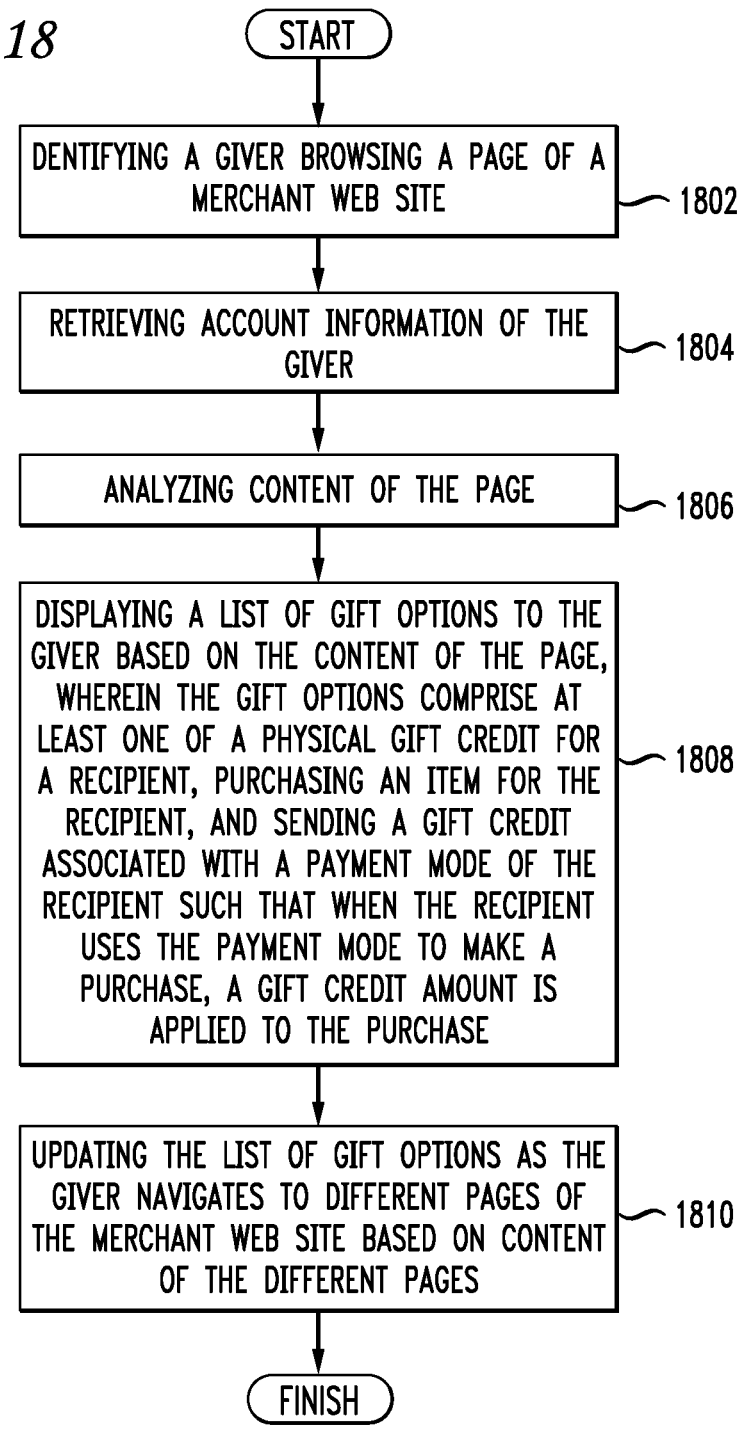

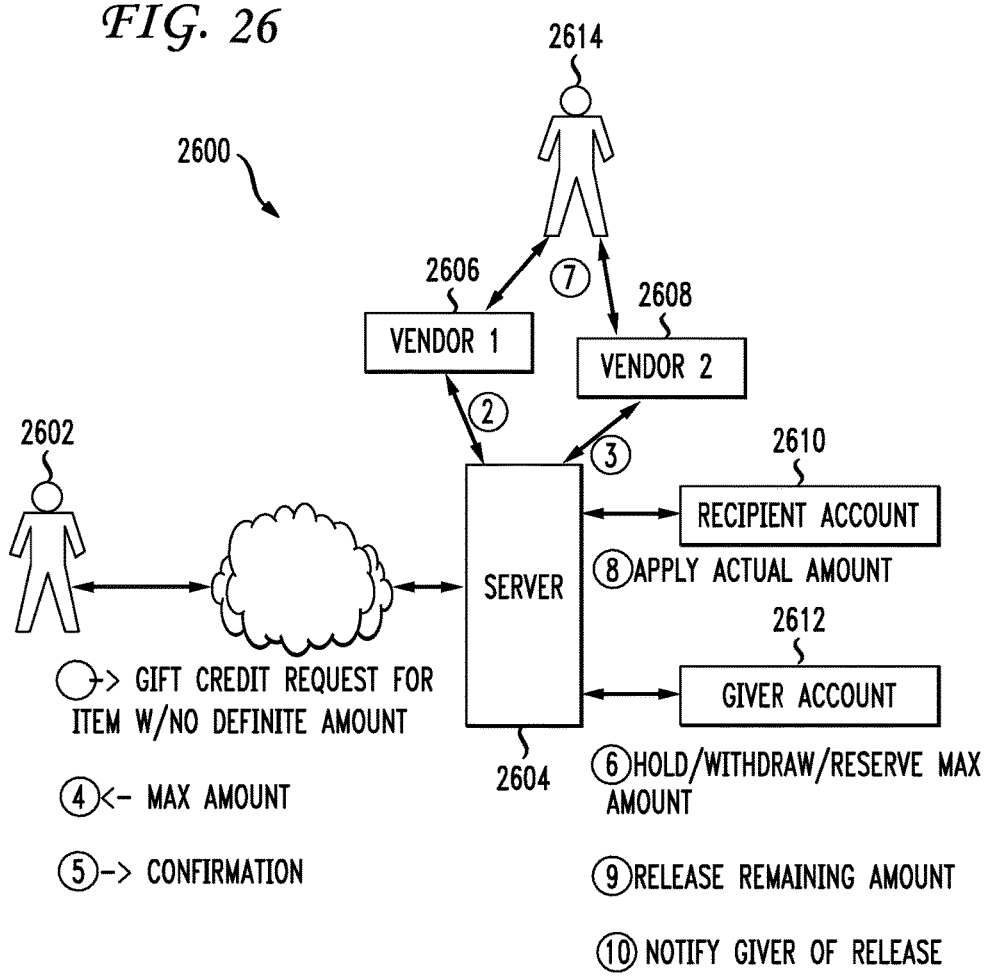

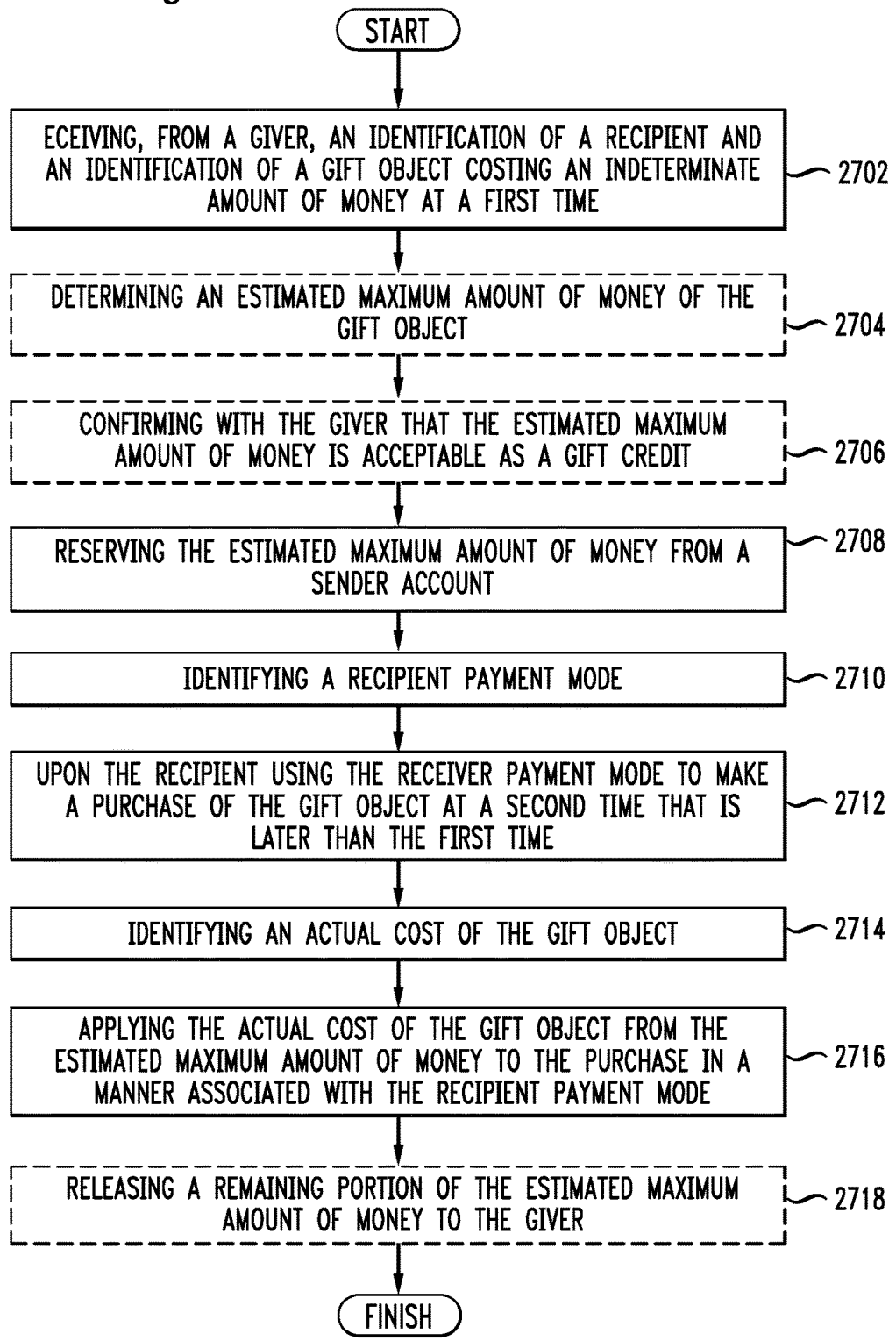

*FIG. 30*  3000

- 3002 — Bob Jones  [∞] — 3004
- 3006 — Giver 1 ▽
  $15 ▽
- 3008 — Giver 2 ▽
  $20 ▽
- 3010 — Add Giver ▽
- Total Remaining: $18 — 3012

DINNER PAYMENT

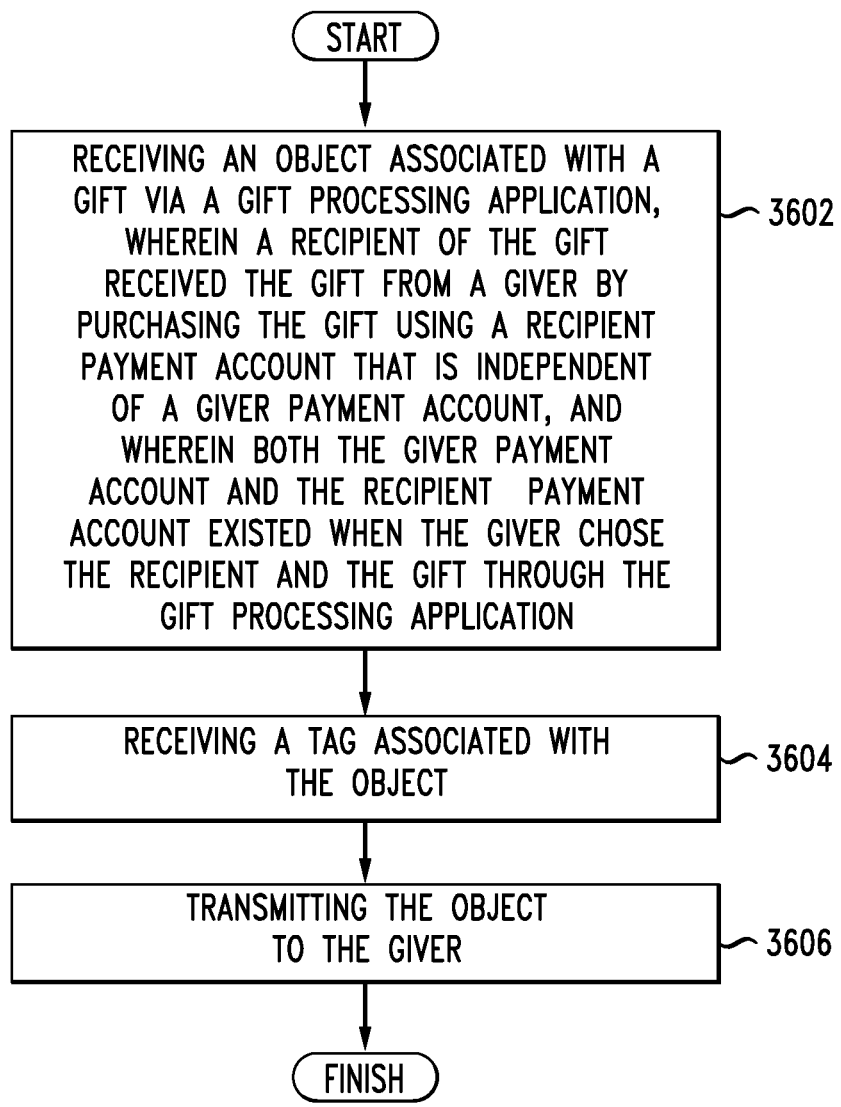

FIG. 39

```
┌─────────────────────────────────────────────────────────┐
│ ⌐ AMAZON.COM ┐ +                          3900          │
│ ←→  ↻ [www.amazon.com                            ]      │
│ ┌─────────────────────────────────────────────────────┐ │
│ │ SEARCH [ALL DEPARTMENTS ▽] [DIAMOND NECKLACE] [🛒CART]│ │
│ │ "DIAMOND NECKLACE"                         3902     │ │
│ ├─────────────────────────────────────────────────────┤ │
│ │ RELATED SEARCHES: DIAMOND BRACELET, DIAMOND EARRINGS, DIAMOND RING │
│ ├─────────────────────────────────────────────────────┤ │
│ │   SHOWING 1-4 OF 10 RESULTS                         │ │
│ ├─────────────────────────────────────────────────────┤ │
│ │   AARON, SELECT ITEMS BELOW TO INCLUDE IN LISA'S OFFERING: │
│ │ ☑1.  ♡   STERLING SILVER BLACK AND WHITE ROUND DIAMOND PENDANT │
│ │          BUY NEW  $139.99                           │ │
│ ├─────────────────────────────────────────────────────┤ │
│ │          STERLING SILVER AND 14K GOLD CULTURED PEAL AND │
│ │ ☑2.      DIAMOND DROP NECKLACE                      │ │
│ │          BUY NEW  $134.99                           │ │
│ ├─────────────────────────────────────────────────────┤ │
│ │ ☐3.      STERLING SILVER BLACK PEARL AND DIAMOND NECKLACE │
│ │          BUY NEW  $139.99                           │ │
│ ├─────────────────────────────────────────────────────┤ │
│ │ ☑4.      14K WHITE GOLD SOLITAIRE DIAMOND PENDANT NECKLACE │
│ │          BUY NEW  $399.99                           │ │
│ └─────────────────────────────────────────────────────┘ │
└─────────────────────────────────────────────────────────┘
```

SYSTEM AND METHOD FOR MANAGING GIFT CREDITS

PRIORITY

The present application is continuation-in-part of U.S. patent application Ser. No. 14/335,358, filed Jul. 18, 2014, which is a continuation of U.S. patent application Ser. No. 14/219,276, filed Mar. 19, 2014, which is a continuation-in-part application claiming priority to U.S. Non-provisional application Ser. No. 14/193,068, filed 28 Feb. 2014, now U.S. Pat. No. 8,751,392, issued 10 Jun. 2014, which is a continuation of U.S. Non-provisional application Ser. No. 12/075,655, filed 13 Mar. 2008, now U.S. Pat. No. 8,676,704, issued 18 Mar. 2014, and to U.S. Non-provisional application Ser. No. 12/475,122, filed 29 May 2009, which claims priority to U.S. Provisional Application 61/057,106, filed May 29, 2008, and to U.S. Non-provisional application Ser. No. 13/301,327, filed 21 Nov. 2011, which is a continuation-in-part of U.S. Non-provisional application Ser. No. 12/967,253, filed 14 Dec. 2010, now U.S. Pat. No. 8,285,643, issued 9 Oct. 2012, and to U.S. Non-provisional application Ser. No. 13/754,401, filed 30 Jan. 2013, which is a continuation-in-part of U.S. Non-provisional application Ser. No. 13/175,234, filed 1 Jul. 2011, which is a continuation of U.S. Non-provisional application Ser. No. 12/967,253, filed 14 Dec. 2010, now U.S. Pat. No. 8,285,643, issued 9 Oct. 2012, and to U.S. Non-provisional application Ser. No. 13/771,791, filed 20 Feb. 2013, which is a continuation-in-part of U.S. Non-provisional application Ser. No. 13/686,189, filed 27 Nov. 2012, which is a continuation of U.S. Non-provisional application Ser. No. 13/470,969, filed 14 May 2012, which is a continuation of U.S. Non-provisional application Ser. No. 12/967,253, filed 14 Dec. 2010, now U.S. Pat. No. 8,285,643, issued 9 Oct. 2012, the contents of each of which are herein incorporated by reference in their entireties.

RELATED APPLICATIONS

This continuation-in-part application claims priority to U.S. Non-provisional application Ser. No. 14/193,068, filed 28 Feb. 2014, which is a continuation of U.S. Non-provisional application Ser. No. 12/075,655, filed 13 Mar. 2008, now U.S. Pat. No. 8,676,704, issued 18 Mar. 2014, and to U.S. Non-provisional application Ser. No. 12/475,122, filed 29 May 2009, which claims priority to U.S. Provisional Application 61/057,106, filed May 29, 2008, and to U.S. Non-provisional application Ser. No. 13/301,327, filed 21 Nov. 2011, which is a continuation-in-part of U.S. Non-provisional application Ser. No. 12/967,253, filed 14 Dec. 2010, now U.S. Pat. No. 8,285,643, issued 9 Oct. 2012, and to U.S. Non-provisional application Ser. No. 13/754,401, filed 30 Jan. 2013, which is a continuation-in-part of U.S. Non-provisional application Ser. No. 13/175,234, filed 1 Jul. 2011, which is a continuation of U.S. Non-provisional application Ser. No. 12/967,253, filed 14 Dec. 2010, now U.S. Pat. No. 8,285,643, issued 9 Oct. 2012, and to U.S. Non-provisional application Ser. No. 13/771,791, filed 20 Feb. 2013, which is a continuation-in-part of U.S. Non-provisional application Ser. No. 13/686,189, filed 27 Nov. 2012, which is a continuation of U.S. Non-provisional application Ser. No. 13/470,969, filed 14 May 2012, which is a continuation of U.S. Non-provisional application Ser. No. 12/967,253, filed 14 Dec. 2010, now U.S. Pat. No. 8,245,643, issued 9 Oct. 2012, the contents of each of which are herein incorporated by reference in their entireties.

BACKGROUND

1. Technical Field

The present disclosure relates to gift credits and more specifically to gift credits that are given by an individual as a gift or by a company as a gift or benefit and are redeemable without use of a physical gift card, gift certificate, or electronic gift code but rather via the use of a gift credit recipients' existing credit/debit card or credit/debit card number according to an established policy.

2. Introduction

Gift cards have been used for many years as a mechanism for individuals to give a certain amount of money to a recipient. One example platform that illustrates the current variety of available gift cards is Amazon.com. At the Amazon.com website, a gift card link sends a giver of a gift card to a mechanism in which the gift giver can purchase gift cards in a variety of forms. Examples include personalized physical gift cards that a gift giver can print and/or have mailed to a recipient. Amazon.com provides email gift cards in which the giver enters an amount and a quantity and recipient email address with a message. The redemption process is only through Amazon.com or its affiliated website www.endless.com and the website deducts purchases from the gift card balance. They explain that they will place any unused balance in the recipient's gift card account when redeemed. They expressly state that such gift cards cannot be reloaded, resold, transferred for value, redeemed for cash, or applied to any other account, except to the extent required by law. In some cases, even email gift cards from Amazon.com require various steps in order to redeem the gift cards. Amazon.com sends the recipient an email that requires the recipient to click on a link to a principal gift card. In some cases, Amazon.com sends a long gift code to the recipient that the recipient must input in a special gift code field when making a purchase. These long codes can be difficult to enter accurately because they are alphanumeric. Other problems can arise when using any kind of link or code or requiring the user to perform any additional steps to redeem the gift card.

Amazon.com also offers a variety of gift cards from resellers such as Home Depot, Applebee's, P.F. Chang's, and so forth. These physical gift cards are mailed to the recipient and are for a specific amount. Similar gift cards can be printed on a printer for similar use. However, a number of problems exist with these different approaches to gift cards. For example, consider the case when a physical gift card for a restaurant such as P.F. Chang's for $50 is given and the recipient only spends $40 at P.F. Chang's. No easy mechanism exists for the recipient to know how much money is left on a particular gift card. Over time throughout the country millions of dollars are left unused due to this excess money associated with gift cards. Additionally, money is left unused when the recipient fails to keep track of gift cards or throws them away.

As noted in the Nov. 19, 2010, New York Times article "The More Convenient Gift Card", found at http://bucks.blogs.nytimes.com/2010/11/19/the-more-convenient-gift-card/, many solutions are being proposed for making "gift cards easier and more convenient to use", including an iPhone based alternative to manage gift cards. However, the iPhone application requires recipients to upload their gift cards by entering their gift card numbers such that retailers can use the bar codes as shown on the iPhone. The problem of users losing track of gift cards still exists. The article ends with the question "How do you make gift cards more convenient, so you don't forget to use them or don't lose track of them?" This article succinctly summarizes the current state of the art. The current approaches and improvements to gift cards are helpful and make gift cards somewhat easier, but still require complicated steps. Current approaches do not solve the fundamental problem of the recipient forgetting to use a gift card or losing track of a gift card. A solution is required.

SUMMARY

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure provides solutions to several gift-related problems, but focuses on systems, methods, and computer-readable storage devices for receiving an identification of a gift giver, a gift, an amount of money to pay for the gift, and a gift recipient of the gift at a first time. The system can associate a policy with the gift, and initiate, at the first time, a transfer of at least part of the amount of money to pay for the gift from the giver payment account to a holding account that is separate from the recipient payment account. The system can monitor, according to the policy, purchases of the gift recipient using the recipient payment account to yield purchasing information based on the purchasing information, and determine whether the gift recipient has made a qualifying purchase according to the policy. If so, the system can apply the amount of money to pay for the gift from the holding account to the recipient payment account.

This disclosure also addresses a first set of problems associated with retaining the social experience associated with giving and receiving a gift. A system configured to practice a first example method embodiment receives an object associated with a gift via a gift processing application, wherein a recipient of the gift received the gift from a gift giver by purchasing the gift using a recipient payment account that is independent of a giver payment account, and wherein both the giver payment account and the recipient payment account existed when the gift giver chose the gift recipient and the gift through the gift processing application. Then the system receives a tag associated with the object, and can transmit the object to the gift giver. The tag can be a date, a time, a location, a manually entered tag from the gift recipient, a description of the gift, or a message, for example. The object can be, but is not limited to, an image, audio, a text-based message, or a video. The object can be any digitally storable object for presentation to the gift giver and/or gift recipient. In one variation, after the gift recipient receives the gift, the system can receive an identification of an amount of money and a merchant associated with the object, and present the amount of money and the merchant information to the giver such that the giver can make a purchase at the merchant using the giver payment account and have the amount of money applied to the purchase. The recipient payment account and/or a merchant payment account can provide the amount of money to be applied to the purchase. In a related embodiment, the system can store an image associated with a gift via a gift processing application, wherein a recipient of the gift received the gift from a gift giver by purchasing the gift using a recipient payment account that is independent of a giver payment account, and wherein both the giver payment account and the recipient payment account existed when the gift giver chose the gift recipient and the gift through the gift processing application, receive a tag associated with the image, the tag identifying the gift giver, and receive a picture of an item in the image after storing the image. Then the system can present an indication of the gift giver to the gift recipient in response to receiving the picture.

The disclosure also addresses a second set of problems associated with monitoring a recipient of a gift in-store to provide reminders, suggestions, or notifications regarding suggestions or redemption of the gift. A system configured to practice a second example method embodiment can receive, via a face identification system at a merchant location, an identification of a recipient of a gift which is redeemable at the merchant using a recipient payment account that is independent of and not in control of a giver payment account, the gift having an associated policy and stored within a gift processing system. Then the system can transmit a reminder to the gift recipient via a recipient device that the gift recipient has the gift. The system can further transmit an additional offer from the merchant in addition to the gift, such as a coupon, promotion, coupon code, discount voucher, and so forth. The additional offer from the merchant can be conditional upon one of the gift recipient making a redeeming purchase in a period of time and the gift recipient making a redeeming purchase prior to leaving the merchant location. The system can place other conditions on the additional offer as well. The system can further receive an indication of a purchase made by the gift recipient using the recipient payment account at the merchant location.

The disclosure addresses a third set of problems associated with managing money contributed to a gift that is ultimately not redeemed or that is under-redeemed so that no money is lost in the gift transaction. A system configured to practice a third example method embodiment can create a gift for a gift recipient, based on a request from a gift giver, and notify the recipient of the gift. The gift can be redeemable at the merchant using a recipient payment account that is independent of and not in control of a giver payment account, the gift having an associated policy and stored within a gift processing system. If the gift recipient never redeems the gift using the recipient payment account, then the giver is not charged for the gift and no transaction occurs. Alternatively speaking, the giver payment account is charged only upon redemption of the gift using the recipient payment account. To avoid accumulation of such outstanding charges, the gift can expire after a certain period of time, such as after 2 years, after a certain number of notices to the gift recipient, and so forth. In the case of the gift giver closing the giver payment account, the organization administering the giver payment account can withhold sufficient funds to cover the eventual redemption of the gift for a certain period of time, after which the funds can revert to the gift giver, or can be applied to the recipient payment account.

Three separate example embodiments are presented herein for enhancing electronic delivery or redemption of gifts to provide a more immersive experience. In the first embodiment, a giver of a gift can use wearable or other 'intimate' electronic devices, such as smart glasses or a watch, to view sample electronic greeting or gift credits. One example of smart glasses includes Google Glass. As the gift giver views the gift or greeting card, the wearable electronic device can then show the gift giver a video clip or present some other form of media that the giver wants to be displayed to the gift recipient when receiving the gift or greeting card. The gift recipient can then also view the video clip or other media when the gift or greeting card is received, upon satisfying some trigger condition such as a geofence or a specific time of day, upon redemption, etc. In one embodiment, the recipient's wearable electronic device can automatically present the video or other media to the gift recipient, or a server can push the content to the recipient's wearable electronic device.

In a second embodiment, when a gift recipient of an electronic gift uses his or her wearable electronic device to view the product for which the electronic gift was intended, the wearable electronic device can play a message for the gift recipient. For example, the gift giver buys the gift recipient an electronic gift for a watch that is redeemable when the gift recipient simply purchases the watch via an associated recipient payment account. Once the gift recipient views the watch, enters the watch aisle at the store, views an advertisement for the watch, or encounters some other trigger associated with the watch, as detected by the wearable electronic device or an associated sensor or input signal, the wearable electronic device can display to the gift recipient a video clip or other media from the gift giver. The video or other media can be a recording of the gift giver or can be selected from a set of already recorded messages, for example.

In a third embodiment, when a gift recipient of an electronic gift enters the location of a merchant where the electronic gift is redeemable, a wearable electronic device can detect the location of the gift recipient. Based on the location coinciding with the merchant, the wearable electronic device can then play a media clip for the gift recipient from the gift giver. For example, the gift giver buys the gift recipient an electronic gift for the spa. The gift system associates the gift recipient and the recipient's payment account with the electronic gift. Then, once the gift recipient enters the spa, the wearable electronic device, such as smart glasses, can initiate a video clip that is attached to the electronic gift that the gift giver created.

These same concepts can be adapted for other electronic devices besides smart glasses, such as smart phones, watches, implanted devices, and so forth. This approach can provide an augmented reality environment surrounding, supporting, describing, and notifying the gift recipient of details of the electronic gift.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4C illustrates an exemplary packet structure for communicating v gift credit transactions with a server;

FIG. 5A illustrates an example login prompt in a process for sending a gift creditcredit;

FIG. 5B illustrates an example gift credit configuration screen in a process for sending a gift credit;

FIG. 5C illustrates an example notification email to a recipient of a gift credit;

FIG. 5D illustrates an example confirmation email to a recipient of a gift credit that the gift credit was successfully applied to a transaction;

FIG. 8 illustrates an example management portal for sent gift credits;

FIG. 9 illustrates an example interface for managing policies associated with gift credits;

FIG. 11A illustrates a first exemplary user interface for adding promotions to a gift credit;

FIG. 11B illustrates a second exemplary user interface for adding promotions to a gift credit;

FIG. 13 illustrates an exemplary suggested recipient list of gift credits in a social networking context;

FIG. 14 illustrates an example gift credit scheduler interface;

FIG. 15A illustrates an example interface for a group gift credit;

FIG. 16 illustrates an example method embodiment for a group gift credit;

FIG. 18 illustrates an example method embodiment for intelligently populating and transitioning between what to offer a potential gift giver as they navigate an online merchant site;

FIG. 26 illustrates a system and control flow for processing gift credits for items with an as yet unknown value;

FIG. 27 illustrates an example method embodiment for processing gift credits for items with a value not yet known;

FIG. 30 illustrates an exemplary user interface for requesting a reverse gift credit;

FIG. 36 illustrates a method embodiment of a one-click gift offering utilizing a recipient payment and delivery account;

FIG. 39 illustrates an exemplary gift offering preview 3900 using a one-click gift offering utilizing a recipient payment and delivery account;

DETAILED DESCRIPTION

Figure 1:
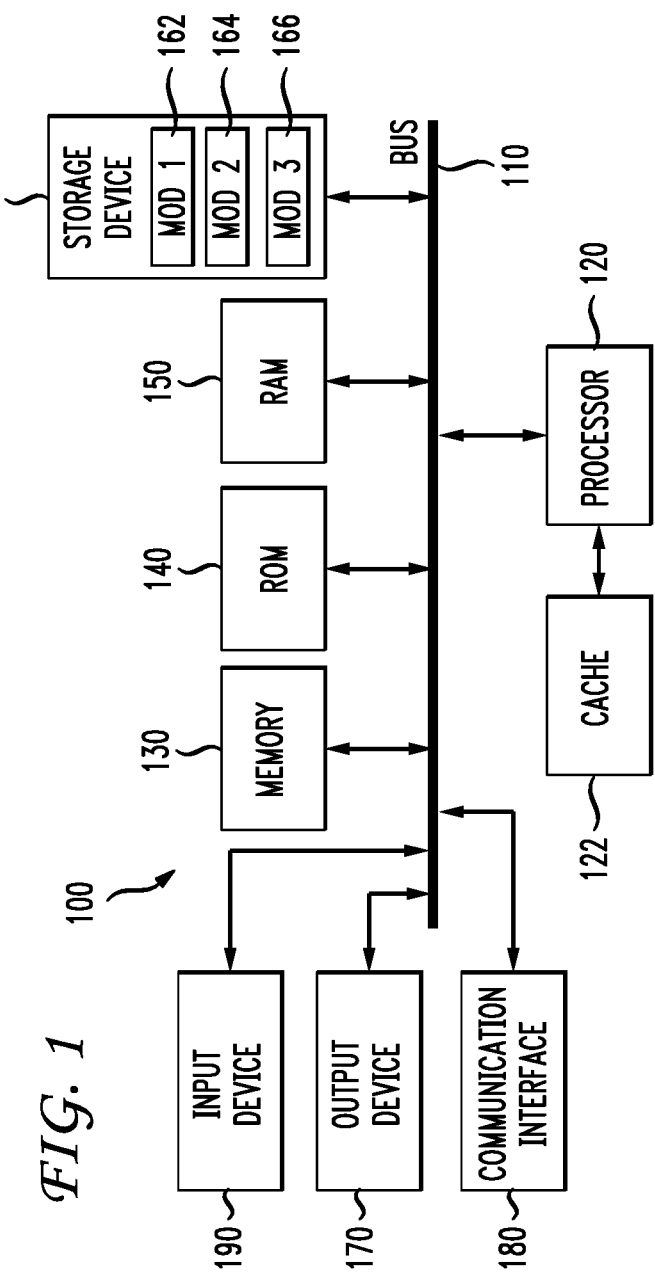
FIG. 1 illustrates an example system embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Any particular function disclosed in connection with one embodiment or aspect can expressly be integrated into another disclosed embodiment, function or aspect. This disclosure considers mixing and matching of the various functions although particular functions are not specifically discussed in one example.

The present disclosure addresses the need in the art for removing hurdles in giving, redeeming, and processing gifts and particular to gifts or gift credits that are given and redeemed without a physical gift card or gift code.

The concepts disclosed herein represent an improvement to previous approaches to providing gifts to gift recipients and which includes the concepts related to individuals giving a gift credit to a gift recipient, a business giving a gift credit or a discount credit to a customer, or a group of merchants providing a promotion in connection with the gift credit. Patent eligible improvements under recent case law do not have to be hardware or computer network improvements per se. The present disclosure describes improvements in the functioning of a computer and relies on the mechanisms that enable a more simple and focused user interaction with the system in order for a giver to give a gift to a gift recipient. Furthermore, the overall components used to achieve the giving of the gift also include additional hardware components not previously utilized when giving gift cards. These can include such components as a recipient device that receives an electronic notice linked to a recipient payment account, a monitoring system or processor that monitors recipient purchases, a service provider that receives a registration of a recipient payment account, and so forth.

For example, the previous approach of giving gift cards included a giver buying a physical gift card, which has an accompanying payment account stored at a gift card payment account provider. The giver would simply hand the gift card to the gift recipient who could then take the gift card to the merchant and make a purchase. The only hardware associated with this process was the gift card payment account provider and the payment processing hardware at a merchant location. The problems with this approach have been previously articulated, such as the need to print and create a physical gift card, the need to maintain a separate gift card account, the possibility of losing the gift card and thus the gift, the benefit by the gift recipient, the extra room required in the wallet or purse to store the gift card, and so forth.

Disclosed herein are a variety of embodiments in which novels steps and a new configuration of hardware components are described that improve the process of gift (credit) giving and receiving including a concept of incorporating a merchant promotion into the process. As such, the disclosure embodies an improvement in the technical field of payment processing and includes a new set of hardware components that are required to achieve the improvement. In this regard, the claims do amount to the improvement to the functioning of a computer or a network itself as well as a new physical structure implemented to achieve the gift giving process.

Many features described in the embodiments disclosed herein represent computer components and payment accounts that were not previously utilized in the process of giving a gift card to a gift recipient. As such, the combined hardware components, and the combination of steps disclosed represent an improvement to computer related technology by allowing the computer performance of a function not previously performable by a computer. The combination of components is unconventional in the gift card space and represents the new use of gift credits.

The improvements disclosed herein can also include software-based improvements or a set of rules that compute that improve computer related technology by allowing the computer to perform a function not previously performable by a computer. Whether under a hardware standard or under a software standard, the present disclosure represents an improvement to computer related technology and addresses and solves numerous articulated deficiency was is within the prior art.

The overall process of gift giving as disclosed herein is not simply the application of conventional hardware. As has been noted above, the previous gift giving process, which employed a physical gift card, merely required a payment gift card payment provider to store the gift card account and whatever point-of-sale terminal would be required at a merchant to receive the physical gift card and process the payment. These two elements represent the conventional hardware that were previously required to process gift cards. The present solution introduces numerous new hardware components, which previously had no part in the gift card process. The combined use, in various embodiment disclosed herein, of a network service provider, a giver device, a recipient device, a monitoring service, a service provider, and/or other hardware that receives a transmitted electronic notice would all be considered as not conventional hardware for giving and receiving gift cards.

As has been articulated above, there are problems with the previous approach of giving and redeeming gift cards that does utilize the realm of computer networks. The improved solution combines a set of new hardware components and an organized set of steps which resolves the problem of losing physical gift cards, expanding the size and weight of wallets and purses, and the requirement of maintaining a separate physical gift card payment account. Other improvements such as fraud detection improvement are also provided by the new method. These are real world improvements to real world problems. The combination of these various elements is not conventional or routine for managing the process of giving and redeeming gift credits. Indeed, the combination of hardware components and steps that must be taken to manage this new process of using gift credits involves a specific and discrete implementation of the process and does solve many of the identified problems with the previous infrastructure for giving and redeeming gift cards.

A brief introductory description of a basic general-purpose system or computing device in FIG. 1 that can be employed to practice the concepts is disclosed herein. A more detailed description will then follow of the various credit/debit processing infrastructure, the exemplary methods, and other financial processing infrastructure and concepts in conjunction with gift credits that are redeemed using an existing payment mechanism transparently, that is, without any additional physical gift card, gift certificate or any gift code. A recipient of a gift credit can simply purchase a qualifying good or service with her Visa card, for example, and the payment processing infrastructure associated with the Visa card applies the gift credit amount automatically to the transaction. This disclosure involves more than just a direct transfer of money from one person to another, or from a gift card to a credit card account, but rather focuses on a gift card approach in which a gift card is established at a first time having a policy, and a gift recipient, at a second time that is later than the first time, executes a purchasing transaction according to the policy. When that transaction is detected, the system will implement the policy and apply the gift card funds at a third time which is later than the first time, and can be approximately around the second time or later than the second time. The implementation and use of such a policy to guide/manage gift card payment through a recipient's use of an existing account introduces many novel features that are disclosed herein.

The policy can include at least one of: a class of goods or services, an amount of money, a merchant or group of merchants, a ceiling amount of money to be used in the gift card, a time frame for use of the gift card, one or more recipient accounts that when used can trigger the transfer of money from the giver account to the one or more recipient accounts, and a predetermined period of time in which if all the amount of money associated with the gift card is not used according to the policy, a remainder amount of money is transferred from the giver account to the recipient account.

A new result of this approach is to render a recipient open-loop credit/debit card account into a hybrid open-loop/closed-loop account. The system monitors the activity of the account such, that for average purchase, the account is open-loop and not restricted, but the application of the gift card to specific purchases according the policy is considered closed loop.

For the sake of clarity, the methods herein are discussed in terms of an exemplary system 100 as shown in FIG. 1 configured to practice the method. The steps of each method outlined herein are exemplary and can be implemented in any combination and/or permutation thereof, including combinations that exclude, add, or modify certain steps. These and other variations are discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high-speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs hard disk 160, those skilled in the art should appreciate that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general-purpose DSP circuit, may also be provided.

The logical operations of the various embodiments are implemented as: (1) a sequence of computer-implemented steps, operations, or procedures running on a programmable circuit within a general use computer, (2) a sequence of computer-implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

The term "system" or similar terms also apply to the herein disclosed systems for processing various types of transactions. There are differences in systems for processing credit card and debit card transactions. It is assumed that with the policies and processing disclosed herein, that appropriate adaptations are made for specific systems where necessary. Those of skill in the art will understand the hardware components used for accomplishing such transactions.

Gift Credits

Figure 2A:
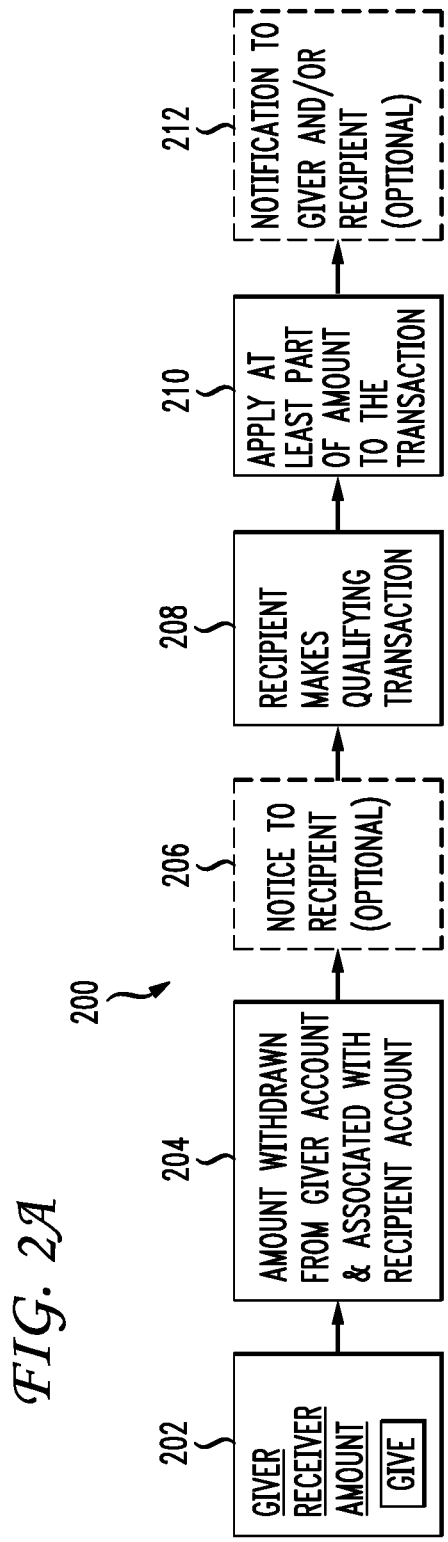
FIG. 2A illustrates an example flow for processing a gift credit.

Having disclosed some components of a computing system, the disclosure now turns to FIG. 2A, which illustrates an example flow 200 of the basic approach disclosed herein for processing a gift credit. The embodiments disclosed herein are discussed in terms of an exemplary system 100 or computing device as shown in FIG. 1 configured to practice the various embodiments. A more specific exemplary system for implementing this flow 200 is illustrated in more detail in FIG. 4 with respect to a control engine that manages the redemption and processing of each gift card according to its policy via communications and instructions with various accounts and/or merchants accounts. Feature 202 represents a giver interface. An example will be used to step through the various blocks. Assume that a giver desires to give a $50 gift credit to a gift recipient. The interface 202 enables the giver to either input identification information and recipient account information or have it prepopulated based on a previous login. The interface 202 can be a web interface, a software client interface, a point of sale interface that a store employee uses on behalf of a gift giver, a self-service kiosk, a voice-based interface, an interface via a handheld device, a multi-modal interface, speech interface, or any other suitable interface. The system 100 identifies, via the gift giver selection, a predictive approach, or some other approach, a gift recipient such as a mother, sister, or friend of the gift giver, etc., and an amount that the giver desires to give to the gift recipient. The recipient credit/debit card data/account is identified via a secure communication to a database or inserted by the gift giver or recipient if necessary or possible. Through one or more different methods, the giver account and recipient account are identified.

Figure 2B:
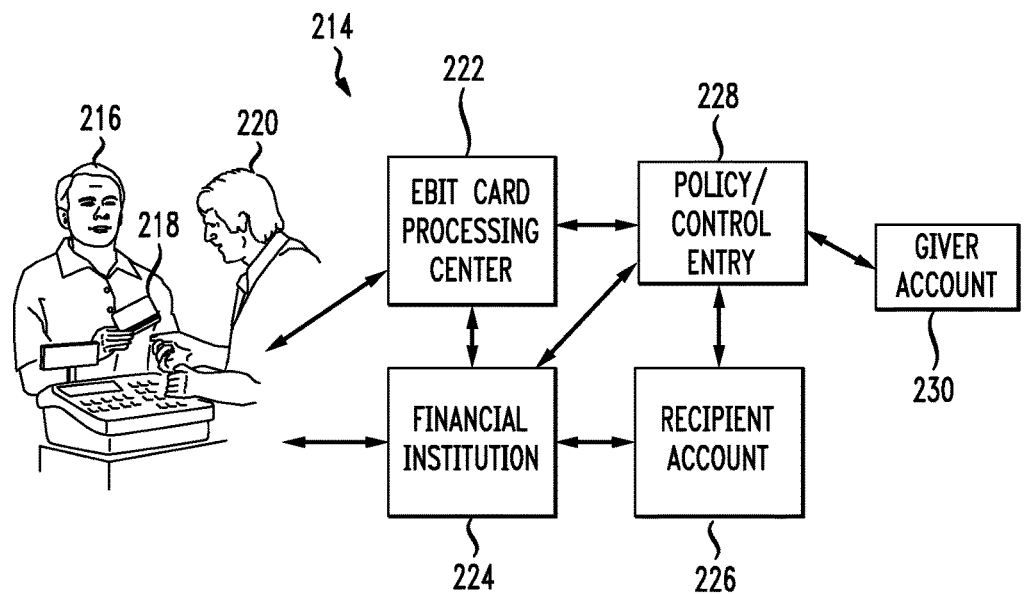
FIG. 2B illustrates an exemplary debit card processing architecture.

The system can apply at least part of the amount to the transaction in a variety of ways. FIG. 2B illustrates an exemplary debit card processing architecture 214. For example, assume the gift recipient 216 uses a debit card 218 for the qualifying transaction. In the debit card processing infrastructure 214, the gift recipient 216 presents the debit card 218 to a merchant 220 at a point of sale. The merchant 220 or gift recipient 216 swipes the debit card 218 through a scanner or otherwise obtains the debit card number, such as by entering the number into a computing device. The merchant system contacts the financial institution 224 indicated by the debit card number, either directly or through a debit card processing center 222. The financial institution 224 verifies that funds are available in the recipient account 226 and approves the transaction by immediately (or nearly immediately) withdrawing funds from the recipient account 226 and transferring the funds to the merchant 220. In this debit card processing infrastructure 214, if the debit card account only has $20 in the account (and the purchase was for $40), then the policy/control entity 228 can dictate to apply at least part of the gift card amount to the transaction. The system identifies that the gift recipient wants to use the debit card for a $40 transaction, whereas they only have $20 in their account, the system can credit $20 to the recipient account 226 from the giver account 230 prior to completing the transaction, at which point the debit card can be used to complete the transaction. If the recipient account 226 has sufficient funds, then the system can process the qualifying transaction in a normal fashion, and then credit the recipient account 226 the appropriate amount of $40 from the giver account 230 after the transaction with the merchant is completed.

Figure 2C:
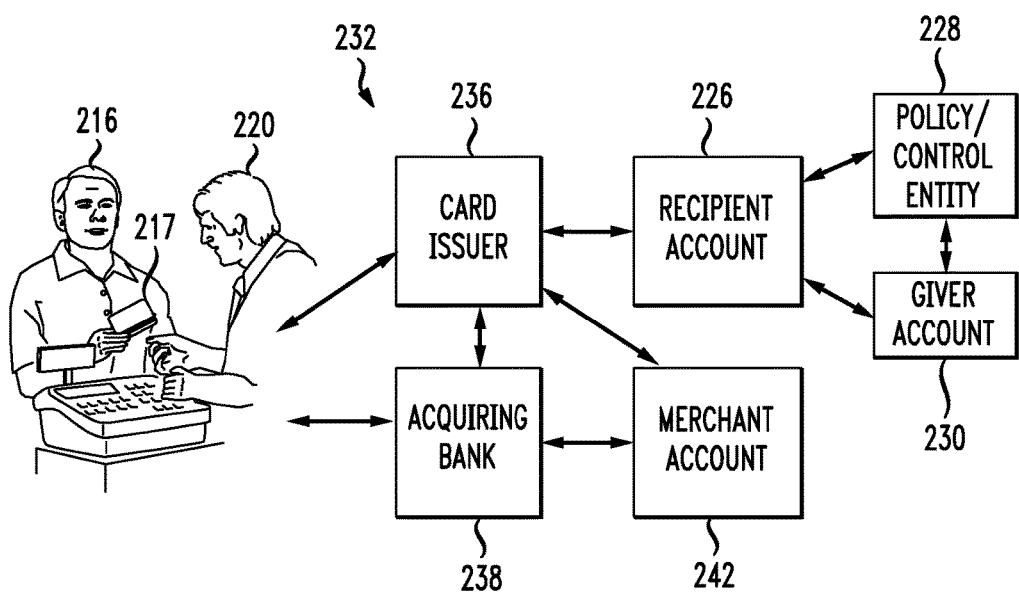
FIG. 2C illustrates an exemplary credit card processing architecture.

FIG. 2C illustrates an exemplary credit card processing infrastructure 232 in which the system can credit the recipient account at the time of sale or shortly thereafter. In a credit card processing infrastructure 232, the issuer 236 of the credit card 217 lends money to the gift recipient 216 to be paid to a merchant 220. In most cases, the merchant 220 and/or the gift recipient 216 swipes the credit card 217 through a machine known as reader. If the card issuer 236 approves the transaction, an acquiring bank 238, which receives credit card transactions from the merchant 220, then credits the merchant's account 242. A credit card association (not shown) may also be involved to set the terms of transactions for merchants, card-issuing banks and acquiring banks. The merchant 220 can pay the acquiring bank 238 a fee for processing the transaction. Once approved, the card issuer 236 posts the transaction to the recipient's account 226. At the end of the billing period, the cardholder 216 receives a credit card statement from the issuer 236, at which time payment for the transaction is due. In this credit card processing infrastructure 232, the system can credit the recipient account 226 when a bill is due, such as a monthly credit card bill, shortly before or on the due date. In this way, the system can hold on to the money, potentially earning interest on the money until the last minute it is needed to satisfy the gift card transaction. This floating period can be one source of revenue to fund the gift card system infrastructure and/or to provide a profit to the operators of the gift card system infrastructure. Also shown in FIG. 2C is a policy/control entity 228 and the giver account 230 which are used to communicate with, monitor and manage the gift card transactions according the principles and concepts disclosed herein.

Often recipients will have multiple gift cards with varying amounts that they lose track of or have little incentive to redeem. These approaches provide a new result of reducing the barriers to obtaining a greater benefit from a gift card with far less effort on the part of the gift recipient and/or the gift giver.

Figure 3:
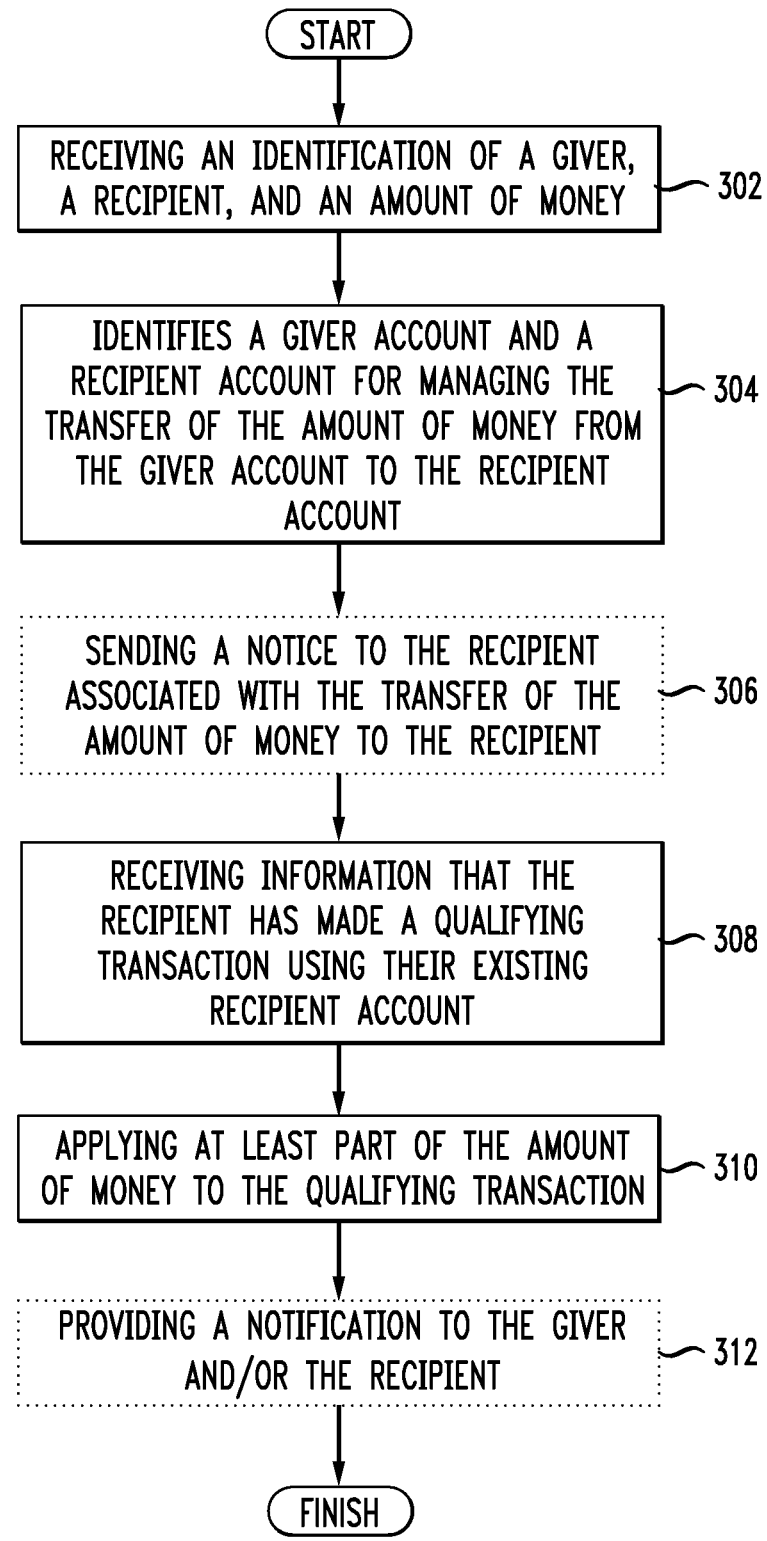
FIG. 3 illustrates an example method embodiment for processing a gift credit.

FIG. 3 illustrates an example method embodiment for processing a gift credit. The method may be practiced by an individual computing device or a computing device in communication with other computing devices within a network. One or more of the various computing devices can reside in a merchant bank, an acquiring bank, a giver account, a recipient account, a merchant, credit card association, a policy control entity or engine, and so forth. The system receives an identification of a gift giver of a gift card and a recipient of the gift card at a first time (302). The system identifies a giver account and a recipient account for managing the transfer of the amount of money or a gift credit from the giver account to the recipient account (304) or to a merchant bank according to a policy. The recipient account can exist prior to the first time and can be an open-loop payment mechanism that is not restricted to a particular merchant or shopping portal, such as a credit/debit card or checking account. An optional notice is sent to the recipient associated with the transfer of the amount of money to the recipient (306). The system receives information that the recipient has made a qualifying transaction using their existing recipient account (308), the transaction occurring at a second time which is later than the first time. The system then applies at least part of the amount of money to the qualifying transaction (310) in a manner according to whether the transaction is a credit or debit transaction for both the gift giver and the recipient. The system can apply the amount of money to the purchase to yield a remaining amount of money. An optional feature is the system providing a notification to the gift giver and/or the recipient (312). The gift credit may be held in the giver account until after the qualified purchase is made, and then the gift credit is transferred to the recipient account, the merchant or other location.

The recipient of the gift credit can, in some circumstances, manage, change, or remove a policy associated with a gift credit. The system can receive a request from the recipient to use the amount of money or gift credit to make the purchase outside the purchase condition, deduct a penalty from the amount of money according to the purchase condition to yield a reduced amount of money, and apply the reduced amount of money to the purchase in a manner associated with the recipient payment mode. As can be appreciated, the processing system disclosed herein provides much greater flexibility and possibilities when processing gift cards.

Gift Credit Processing Infrastructure

Figure 4A:
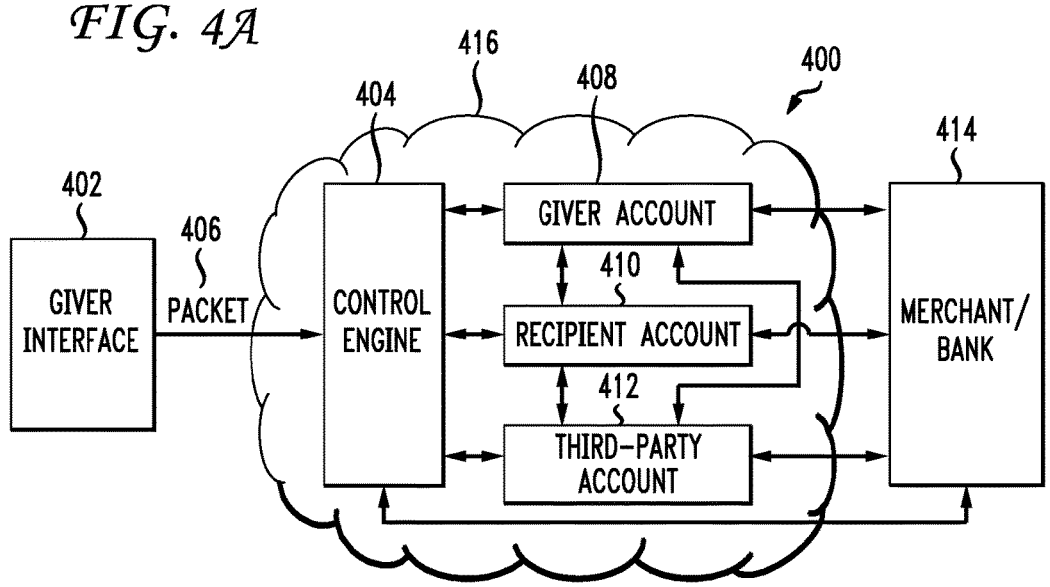
FIG. 4A illustrates a sample system configuration for processing gift creditcredits.

FIG. 4A illustrates an example block diagram 400 of a network 416 in which the system can operate. Network 416 includes various components that make the processing disclosed herein possible. A giver interface 402 is used in a variety of ways to receive initial information about the gift giver. For example, the giver interface 402 can simply be a web site accessible via a web browser in which there is an opportunity for the gift giver to provide the basic information to identify the gift recipient, the amount associated with the gift credit and so forth. The giver interface 402 can be a device such as kiosk, ATM machine, or gas pump.

A giver interface 402 can include a website in which a gift giver types into a web interface a particular gift code that may or may not be associated with a physical gift card. The system can receive this information to identify an amount, the gift giver, and the company to which the gift card applies. Then the gift giver can also add their information as the gift recipient and therefore provide the necessary information via the giver interface for the remaining transactions to occur under the processes defined herein. In this manner, any recipient of a physical gift card can easily transfer that gift card to the gift credit system disclosed herein. The gift recipient no longer has to worry about losing the gift card or forgetting to use all the money on the gift card.

The disclosure temporarily turns to FIG. 4C, which illustrates an example packet 406 as is introduced in FIG. 4A. FIG. 4C shows packet 406 with various data fields. The exact names, types, sizes, and order of data fields in the packet are exemplary. The packet can be implemented in any variation thereof, including any combination or permutation of these and/or other data elements. These example fields include a security header 472, a general header 474, information about the gift giver 476, information about the gift recipient 478, a currency amount 480, a payment mode 482, a time associated with the gift credit 484, a location or geographic limitation associated with the gift credit 486 and another optional field 488 or fields. The amount can be in any currency: domestic, foreign or virtual. The system can automatically handle conversion between currencies, if needed. Some of the packet fields shown are optional. The use of such a packet enables a central control engine 404 to receive a single set of data associated with a gift card and carry out all of the transactions associated with monitoring recipient purchasing activities, apply gift card money as guided by the policy, and credit or debit money from the appropriate accounts.

The packet structure can allow for the information about the gift giver 476 and the information about the gift recipient 478 to identify more than one individual. The packet can include information about each giver 476 and gift recipient 478 in the form of, for example, an email address, name, account number, or other unique identifier. Further, in the case of multiple givers, the amount field 480 can include one or more sub-amounts corresponding to each gift giver. The payment mode 482 can be identified by credit card number, bank account number, routing number, club or loyalty card number, PayPal address, and so forth. In one case, the payment mode can be a user profile such that any payment mode associated with that user profile is able to use the gift credit.

Based at least in part on data received from the giver interface 402, the system can develop a packet 406 as discussed above and shown in FIG. 9. The packet 406 includes the basic information to manage, create, trigger, or perform other actions associated with the gift credit and optionally the additional information. At a basic level, the packet 406 provides information about the gift giver, the gift recipient, the amount, and other management information about how the amount is to be applied. The packet can identify whether the giver account and recipient account are credit or debit accounts. The network 416 receives this packet at a control engine 404. This can represent a computing device, acquiring bank, debit card bank, issuing bank, and/or server within the network 416 that can manage the policy of distribution, use, and/or notifications associated with the gift credit. The control engine 404 can be part of or in communication with an acquiring bank. Network 416 can be the Internet, an intranet, a virtual private network, an encrypted network, electronic or fiber-optic network, and/or any other kind of network that can include a wireline or wireless network. Therefore, the giver interface 402 can also be a wireless interface via a wireless device with the appropriate software to enable communication of such information.

The control engine 404 communicates with the giver account 408 and a recipient account 410 and optionally with a third party account 412 and/or a merchant or bank 414. The control engine 404 can communicate with or operate on any one or more of these systems. For example, the third-party account 412 does not necessarily need to be involved in each transaction. Furthermore, the control engine 404 can optionally communicate directly with the merchant or bank 414.

Figure 4B:
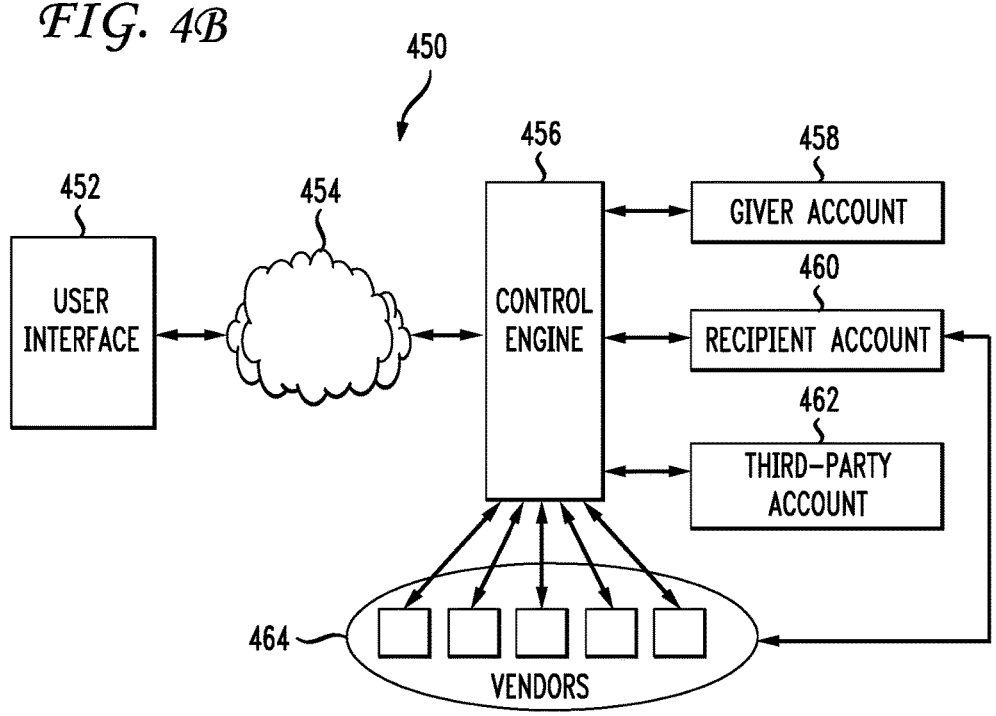
FIG. 4B illustrates a sample system configuration for processing gift creditcredits exclusively in an online retail environment.

FIG. 4B illustrates a second example block diagram 450 of an architecture 450 in which the system can operate. The architecture 450 represents a model operated by an online merchant such as Amazon.com. For purposes of illustration, Amazon is used herein to represent a generic online merchant in which the data about the gift giver and gift recipient are stored or received via a user interaction to process a gift card as disclosed herein. A gift giver of a gift credit communicates with the control engine 456 through a network 454 via a user interface 452.

The gift giver provides instructions to the control engine 456 through the user interface 452 to send a gift credit to the gift recipient. The gift giver can provide partial information to the control engine 456 to identify the gift recipient, such as an email address, username or a first name, last name, and mailing address. The control engine 456 and the user interface 452 can provide the giver a way to select which types of information to provide. As the gift giver enters information, the control engine 456 and the user interface 452 can also provide feedback to the giver regarding the entered information.

Because the control engine 456 controls the gift card implementation based on policies, handles the transactions, and controls (at least indirectly) giver and/or recipient payment accounts, the control engine 404 and the merchant or bank 414 of FIG. 4A are effectively merged into one entity in FIG. 4B. As part of the process of creating a gift card, the control engine 456 can withdraw funds from the giver account 458 and place them in a third-party account 462 until the recipient redeems or uses the gift card. Alternatively, the control engine 456 places a hold on the gift card amount in the giver account 458 until the gift card is redeemed. The hold can be a reservation of available credit on the giver account, which is charged when the gift recipient redeems the gift card. The control engine 456 can implement other fund processing variations as well. In one aspect, the user accounts 458, 460 at Amazon are proxies for actual bank accounts such that Amazon can deposit, withdraw, hold, and perform other operations on funds in the actual bank accounts. The control engine 456 generates a gift credit associated with the recipient account 460.

Gift Card User Interfaces

Figures 5E, 6:
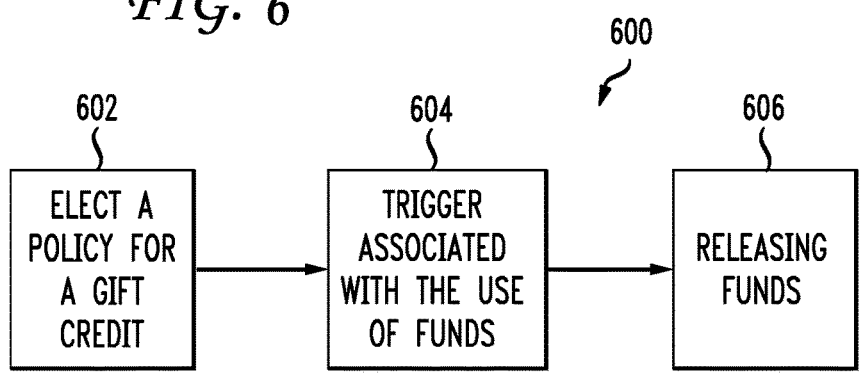
FIG. 5E illustrates an example reminder email to a recipient of an outstanding balance on a gift credit.
FIG. 6 illustrates a sample flow for a releasing funds of a gift credit.

The disclosure now turns to some example user interfaces, as shown in FIGS. 5A-5E. FIG. 5A illustrates a basic log in screen 500 where the gift giver enters credentials before entering into a giver interface to begin a gift card transaction. This provides basic information such as gift giver or recipient name 502 and a password 504, but can incorporate other authentication techniques, such as speaker verification, biometric identification, swiping a credit card (or other identification card) through a card reader, personal confirmation such as recipient high school, pet name, and so forth.

FIG. 5B assumes that the gift giver has logged in and the giver's name is "George". Here, screen 506 illustrates a welcome screen for George, optionally including a greeting 508, and presents various specific options to George for giving a gift credit. The recipient list can be prepopulated based on previous gift cards or preentered names and information associated with various people that would receive a gift card from George. This can be presented in a drop down menu 510 or via some other user interface component. The gift giver fills in an amount field 512 or selects from a list of amounts from a drop down menu or other graphical or multimodal manner. The drop down menu can be prepopulated with a list of previous amounts given to this particular recipient, common amounts given, or suggested amounts based on the selected merchant, and so forth. Another field 514 provides a drop down menu (or other graphical or multimodal mechanism) of merchants. The gift giver can enter other conditions 516 associated with the gift card based on a variety of factors.

FIG. 5C illustrates an example notification email 518 which explains to the gift recipient 520, Rachel, that says, "George has sent you a gift card for Home Depot for $75. You can use the gift card by simply using your Visa card at Home Depot or at homedepot.com". The email can include a CC to the gift giver 522, in this case george@email.com. The notification is optional and can be provided via other communication modalities as well, such as voicemail, Facebook communication, tweet, SMS, personal call, a mailed letter or postcard, and so forth. The notification can include other instructions as well. FIG. 5D illustrates an email 526 that the system can optionally send to Rachel after she makes a purchase using her credit/debit card. The message 528 can include various gift details, as shown. FIG. 5E illustrates an exemplary optional reminder communication 536 from the gift credit services to the recipient, Rachel.

FIG. 6 illustrates a series of steps 600 associated with the management of gift card funds. Step 602 includes selecting a policy for a gift card. This can occur via a default mode or a user selected mode to establish a certain policy or schedule for the distribution and use of the gift credit. The system includes a trigger associated with the use of the funds in step 604. The trigger can be an actual transaction using the credit/debit card in which the funds have to now be applied and released for a transaction. The last step involves releasing or applying the funds 606 to a transaction which, as noted above, can either be releasing or using those funds for a particular purchase or can involve transferring those funds directly to the recipient account or to some other location. Then the policy can include a series of triggers that cause the system to apply funds according to the policy.

Gift Credit Management Portals

Figure 7:
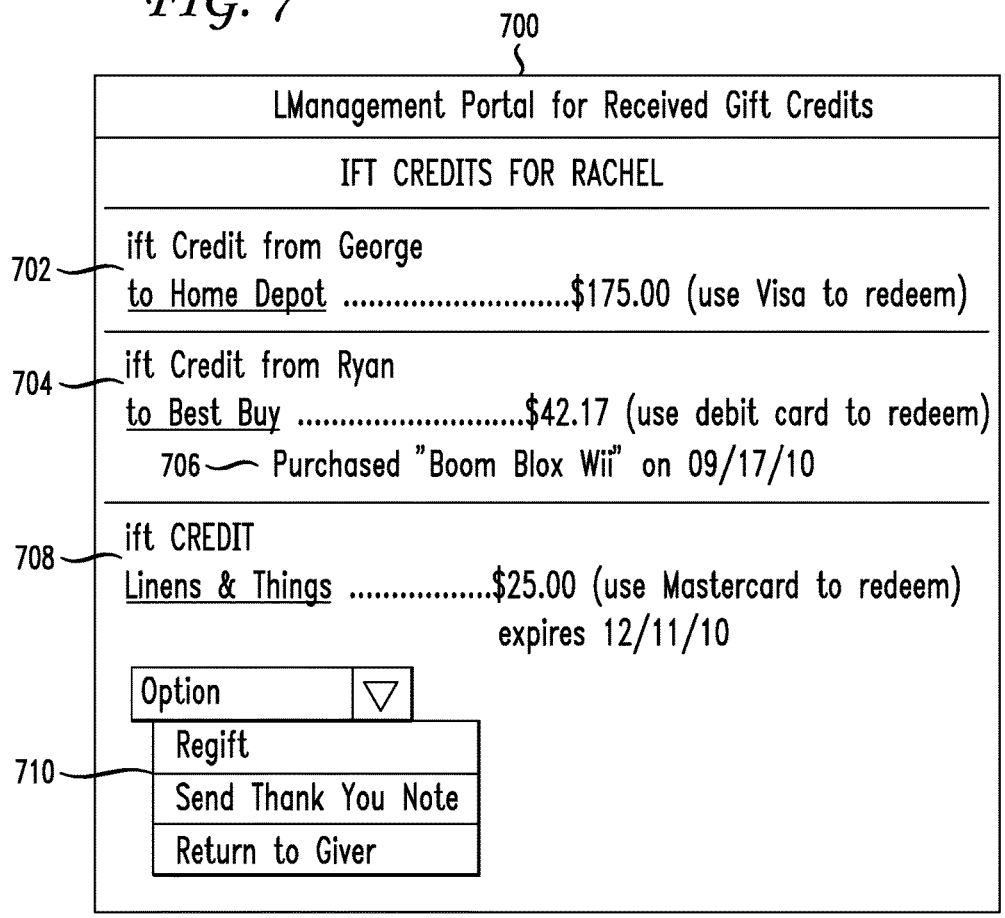
FIG. 7 illustrates an example management portal for received gift credits.

The disclosure turns to a discussion of management interfaces for gift credits. FIG. 7 illustrates an example portal 700 in which users, including gift givers and recipients, can manage their various gift cards. A network-based server and/or a local server can provide the portal 700 in which the gift recipient receives a number of different gift credits. The prior art approach for dealing with such gift cards is to simply carry physical cards around in one's wallet or store them at home or elsewhere. The remaining amount on those particular gift cards is easily forgotten and not always easy to retrieve. This ultimately leads to wasted funds or the funds can revert to the merchant through fees or inactivity. It is almost impossible for the recipient of the gift card to remember how much money remains on the cards, especially if multiple gift cards are received at the same time. Accordingly, using the system disclosed herein, a recipient can manage, identify, and view a variety of gift cards all in one location. Portal 700 illustrates all of the gift cards for one recipient or for one payment mode (such as a checking account, Visa credit card, or PayPal account). Information 702, 704, and 708 identify various gifts from George to Rachel.

FIG. 8 illustrates an example portal 800 for use by a gift giver. Both portals 700, 800 can be integrated into a same web interface so that a gift giver can manage all received and sent gift cards in one location, but the portals 700, 800 can also be completely separate. Just as a receiving party can have a portal as shown in FIG. 7 to identify all of the received cards, a portal 800 can be presented for those who send gift cards. Here, information such as found in rows 802, 804, 806 and 808 can identify the date a gift card was sent, the gift recipient, the amount, the merchant, the current status, and additional optional actions which can be taken, such as send a message, send a reminder or suggestion, or any other additional communication option for the giver to communicate with the gift recipient.

FIG. 9 illustrates an example interface for managing policies associated with sent and/or received gift credits. In the interface 800 of FIG. 8, the gift giver can click on the row 802 for Tom Jones to expand a list 902 of available and/or applicable policies. The list can be a compilation of different policies from different sources or a single policy encompassing each presented aspect.

Figure 10:
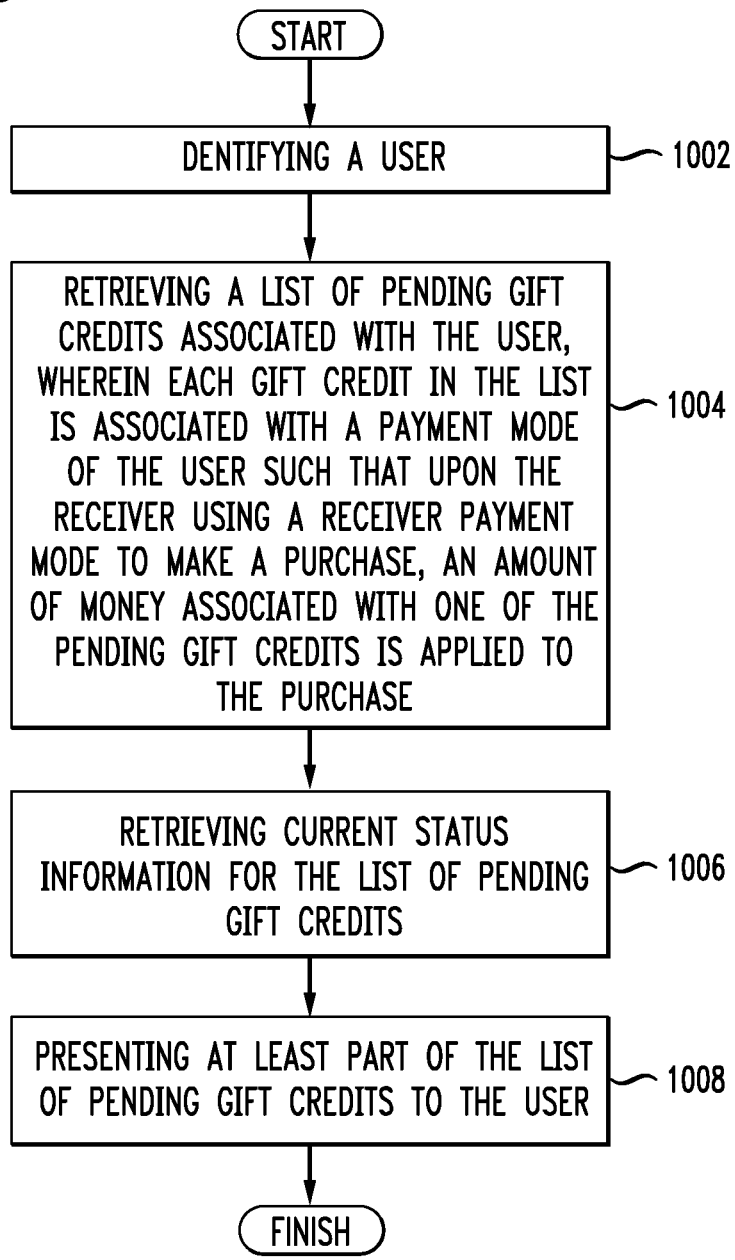
FIG. 10 illustrates an exemplary method for managing gift credits.

FIG. 10 illustrates an exemplary method for managing gift credits. A system configured to practice the method identifies a user, which can be a gift giver and/or recipient of a gift card (1002) and retrieves a list of pending gift cards associated with the user, wherein each gift card in the list is associated with a payment mode of the user such that upon the recipient using a recipient payment mode to make a purchase, an amount of money (the gift credit) associated with one of the pending gift cards is applied to the purchase (1004). The system retrieves current status information for the list of pending gift cards (1006). The system presents at least part of the list of pending gift cards to the user (1008). Users can access this information via a gift credit management portal such as a web site, smart phone application, automated speech interface, and so forth.

Gift Credit Promotions

The disclosure now turns to a discussion of adding promotions to a gift credit. FIGS. 11A and 11B illustrate interfaces for a gift giver to add promotions during a creation event of a gift credit, but a gift recipient can also view and accept promotional offers when the card is received, when managing a received card, when redeeming a received gift credit, when reviewing remaining amounts, and/or at any other suitable time. FIG. 11A illustrates a window 1100 for additional accessorizing, including promotions, or upselling of the gift credit. The gift giver, George, wants to give $50 to Rachel for use at the Sizzler restaurant. The system can identify different available promotions to "accessorize" the gift credit. Here, one promo 1102 is from American Express. A gift giver can select the promo 1102 with a checkbox or other input to require Rachel to pay via American Express and thus get an extra $5 added to the gift card amount. Promo 1104 indicates that if Rachel uses the gift card on a weekday that he would get a free dessert. That box can be checked as a promotion by Sizzler in order to drive the recipient's behavior to come to the restaurant as a certain time, perhaps when business is normally slow.

FIG. 11B presents a potential widget 1106 in which the system has identified the gift giver as George, the recipient as Rachel, and the merchant as Olive Garden. The system has identified that Rachel typically uses, has used, or is eligible to use one of two payment mechanisms for purchases at Olive Garden: a Visa and a MasterCard. The opportunity 1108 presented to George in FIG. 11B enables George to choose between the Visa and the MasterCard. As is shown in the widget, Visa is offering an additional $2 to the gift credit and MasterCard is offering an additional $1 to the gift credit. The Olive Garden can offer an extra $10 if it is limited to lunchtime on Saturdays. This presents an opportunity for the credit card issuers to upsell or encourage the gift giver to select a particular card for redemption of the gift credit. The gift giver, George, can click the send button to complete the transaction. If George does not select either Visa or MasterCard, the system can present additional information to George that the most common card used by Rachel is the Visa card and that the Visa card is the default if no specific card is selected.

Figure 12:
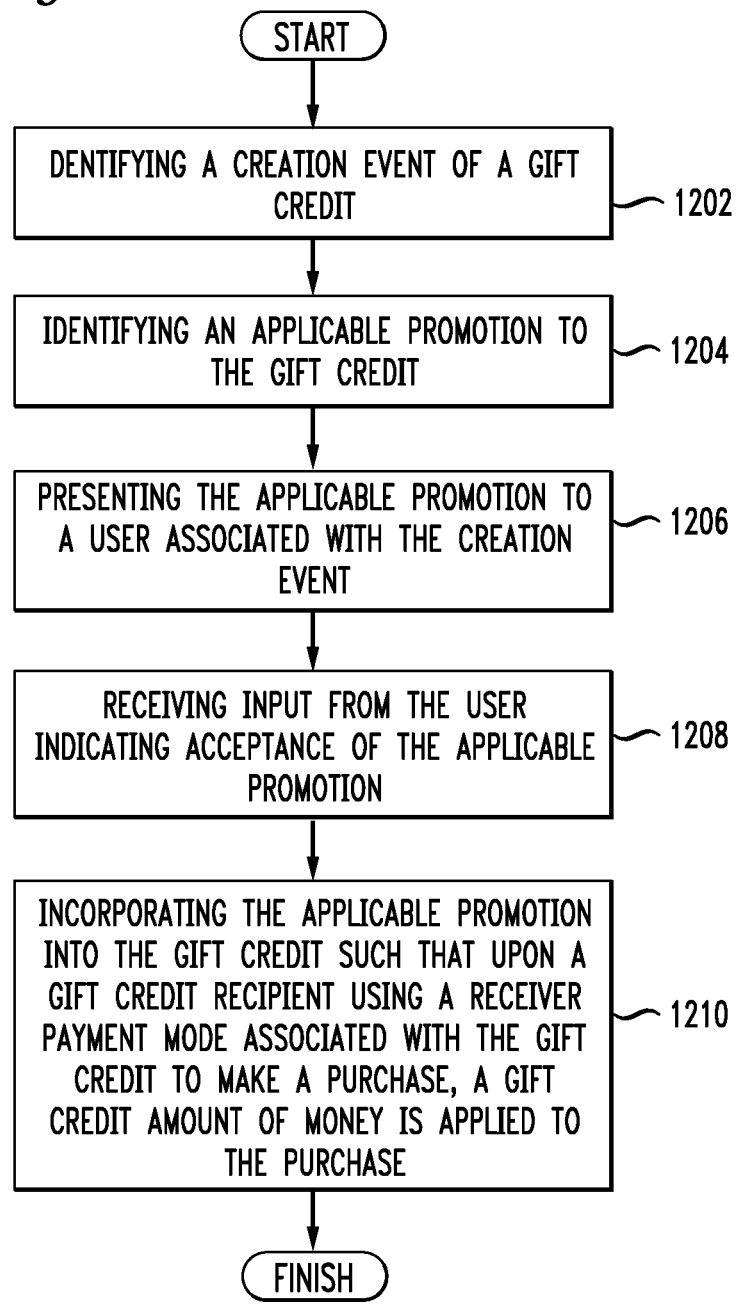
FIG. 12 illustrates an exemplary method embodiment for adding a promotion to a gift credit.

FIG. 12 illustrates an example method of the promotion-related user interfaces of FIGS. 11A and 11B. The system identifies a creation event of a gift card (1202) and identifies an applicable promotion to the gift card (1204). Then the system presents the applicable promotion to a user, either a gift giver or a gift recipient, associated with the creation event (1206). The system receives input from the user indicating acceptance of the applicable promotion (1208). Then the system can incorporate the applicable promotion into the gift card such that upon a gift recipient using a recipient payment mode associated with the gift card to make a purchase, a gift credit amount of money (or gift credit) is applied to the purchase according to the applicable promotion (1210).

Gift Credits and Social Networking

The disclosure now turns to a discussion of gift credits and social networking. The gift credits identified herein also advantageously can be used in specific verticals and social networks. For example, FIG. 13 illustrates a Facebook page 1300 in which a gift credit can be applied. Window 1302 includes the typical Facebook information, which can include birthdays 1304 (or other special events such as anniversaries, graduations, engagements, weddings, holidays, and so forth) in a certain order in which Mom's birthday 1306 is identified as being January 6th, the system can present a suggested option of Olive Garden and $20 as a gift credit, in addition to the Send button. The birthday list 1304 can include other entries. One entry 1308 identifies June Smith has an anniversary coming up and suggests a $25 gift credit for Cinema 10. The system can generate other suggestions upon request based on an analysis of a number of factors, such as previous gift credit history, previous use of Facebook, previous amounts given via gift credit, what others have already given June Smith (gift card amounts and gift card merchants), and so forth. The system can identify and correlate this information in order to present suggestions in window 1300 for giving gift credits from the gift giver.

The example birthday list 1304 includes an entry 1310 for a $20 gift certificate for Sister through Amazon.com. Accordingly, the recipient can use that gift card in their next purchase on Amazon.com.

Scheduling Gift Credits

FIG. 14 illustrates an interface 1400 that enables a gift giver of a gift credit or cards to schedule recurring gift credits. For example, a gift giver wants to schedule gift cards for significant events of certain close relatives or friends. The events can be scheduled for recurring events, such as a yearly birthday gift card or at some other interval such as an anniversary gift card every five years, or for one-time events such as a wedding, birth, or graduation. Row 1402 illustrates a schedule for the giver's Mom whose birthday is on April 1st. The gift giver can select various options such as reminder and preview, choose a dollar amount, choose identification of the card to be used by the recipient to redeem the gift card, and a merchant for redemption. Messages can be added such as "Happy Birthday" which can add to the personal nature of the communication. The gift giver can then schedule gift credit email to be communicated on a certain date in advance of the birthday. The reminder option instructs the system to remind the gift giver to send a gift card for a particular recipient and/or event. The reminder can include a gift card history for that recipient or event. Row 1404 illustrates an example scheduled gift credit for Dad's birthday. Row 1406 illustrates a scheduled gift credit for Sister's anniversary at a certain date with a reminder box checked as well as the preview box checked. Row 1406 illustrates another point in which the scope of the gift credit can be modifiable. A typical physical gift card applies to a particular store or close group of stores such as the Olive Garden or any store within a mall. Because the recipient redeems the gift card by simply using a Visa card online or at a merchant store, the system can gather additional information about the purchase.

Combined Gift Credits From Many to One

The disclosure turns to a discussion of another aspect of this disclosure, namely a group gift card. FIG. 15A illustrates an exemplary user interface 1500 for giving a group gift card to Tom for his birthday. The display 1500 can include a number of total contributions, and a "one click" button to give the suggested (or other) amount, or a separate field or input element 1516 where the gift giver enters a certain dollar amount. A human can initiate the group gift credit and become an organizer for the card. The organizer can set the terms of the gift card, the contribution period, and other aspects associated with the gift credit. The organizer can also filter messages to the recipient from the other contributors associated with the gift credit, and so forth. The organizer can decide, for example, whether to enable voting for the gift card merchant and can manually select a particular vendor, item, or other restriction for the gift credit. In one variation, the social network is the "organizer" and can maintain that role throughout the gift credit creation process or can hand off that role to a human participant. In another variation, the highest contributor automatically assumes the role of the "organizer". The system can hold contributed money in a third-party account until redeemed, transferred to the recipient's account, or otherwise used by the gift recipient. In the event that a group gift card is rejected or cancelled before the system completes the process, the system can refund the contributed funds to the contributors directly and optionally notify them of the failed gift credit.

Figure 15B:
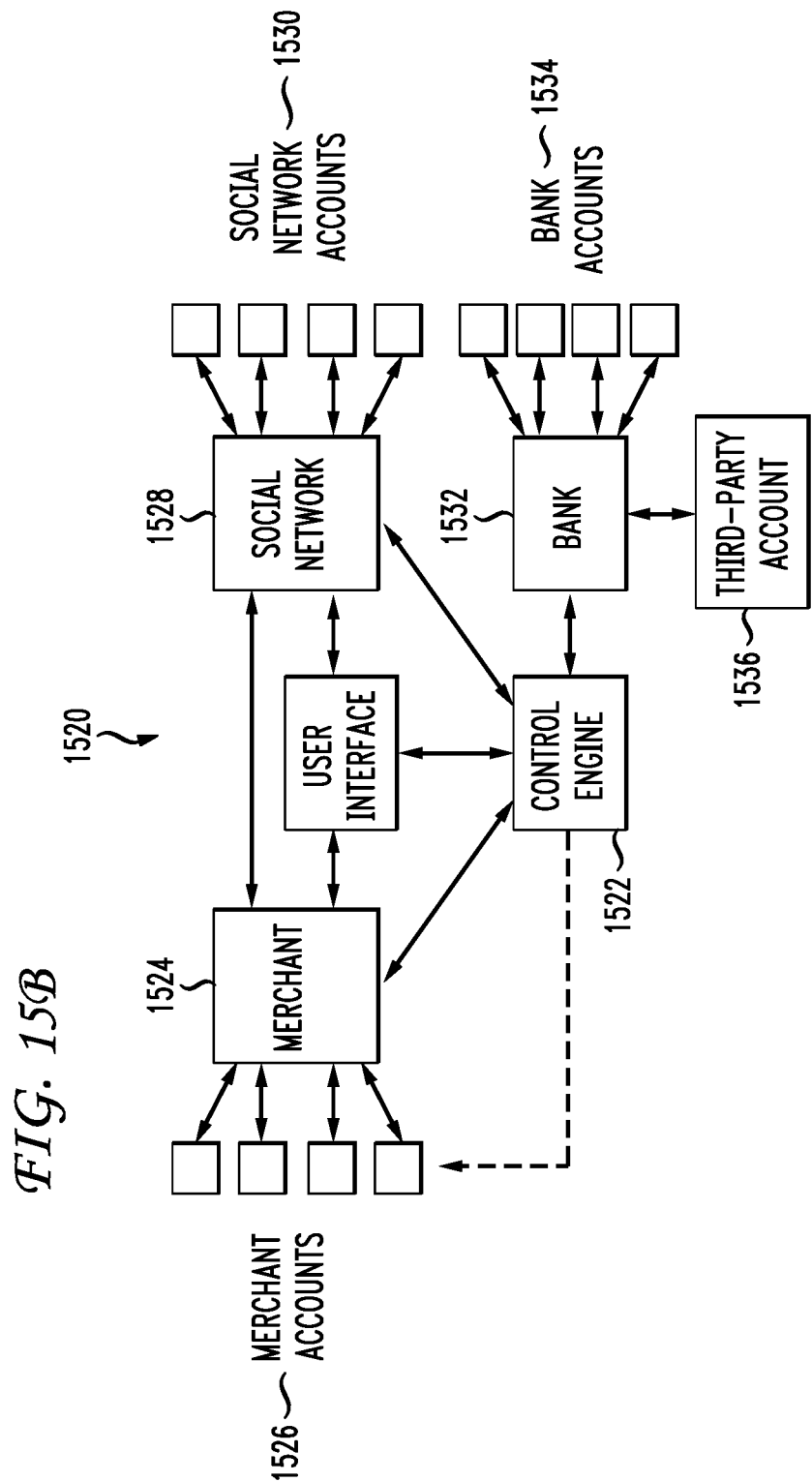
FIG. 15B illustrates an example architecture for interfacing between online merchants, social networks, and banks.

FIG. 15B illustrates an example architecture 1520 for interfacing between online merchants, social networks, and banks that can be used for individual or group gift credits. This architecture 1520 allows a merchant 1524, such as Amazon.com, with established user accounts 1526 with the merchant 1524 to communicate with a social network 1528, such as Facebook or MySpace, with established user accounts 1530 with the social network 1528, for the purpose of processing (i.e. giving, receiving, managing, and redeeming) gift credits. Further, a control engine 1522 can interact with the social network 1528 and/or the merchant 1524 to guide or control gift credit transactions. The control engine 1522 can communicate with a bank 1532 or other financial institution holding a group of bank accounts 1534 and a third-party account 1536 for holding funds in some gift credit scenarios. Some bank accounts 1534 correspond to the various accounts 1526, 1530 in the social network 1528 and/or the merchant 1526. The architecture 1520 can provide a user interface for the users on the social network, merchant, and/or control engine to manage gift credits. The social network 1528, merchant 1524, control engine 1522, and bank 1532 can communicate with each other via established APIs for purposes relating to creating, delivering, notifying, and predicting related to gift credits.

FIG. 16 illustrates a method embodiment of this approach. In one variation, the system receives a gift card for a gift recipient from a group of givers (1602). Then the system withdraws a group of gift card amounts of money from accounts, or reserves credit available, of the group of givers (1604). The system identifies a recipient payment mode (1606). Then, upon the recipient using the recipient payment mode to make a purchase, the system applies at least part of the group of gift card amounts of money to the purchase (1608).

Intelligent Transitions for Gift Credit Options

FIGS. 17A-17D illustrate an aspect of this disclosure associated with intelligently transitioning gift card options, including gift credits, at a web shopping portal such as Amazon.com. Here, a window 1700 illustrates a giver George 1704 who is shopping on Amazon. A particular context 1702 is arrived at in which an item is being viewed for purchase on Amazon. The system can present an interface to George for giving a virtual card 1706 to somebody. The interface can include a widget 1708 to enable George to select a particular person as a recipient of a gift credit. George can identify in other fields a particular amount of money (i.e., a gift credit), a message field for the recipient, and/or other options relating to the gift credit. All of this information can be combined in a widget 1708 or a small window that the giver can use to give a particular gift card to a particular recipient. The fields in window 1708 can be prepopulated based on the current context of George's searching within Amazon.

Figure 17A:
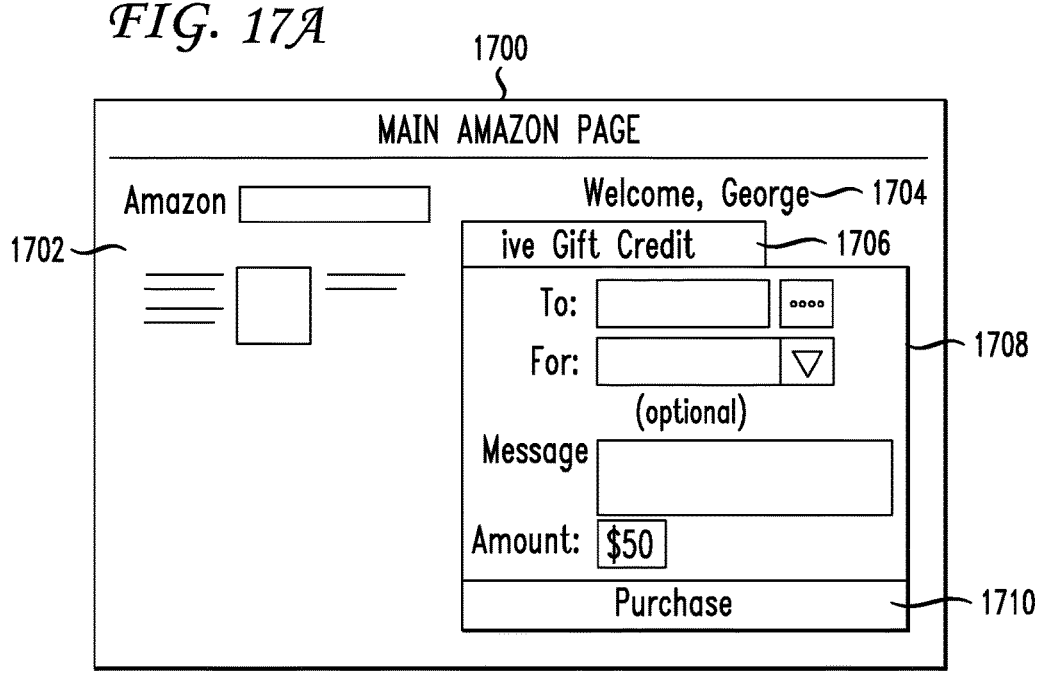
FIG. 17A illustrates a sample gift credit interface integrated at a main level of an online merchant.

FIG. 17A therefore illustrates an approach in which a gift credit interface can be presented that is dynamic based on a level of surfing an internet page. If FIG. 17A represents an initial beginning of a search at Amazon in which the giver has just logged in, then the presentation of a window 1708 can represent an opportunity for George to give a gift credit to somebody just for use on Amazon. This is because the context in this scenario is only based on being in the Amazon environment. Assume that George searches for the garden section and browses to the interface shown in FIG. 17B.

Figure 17B:
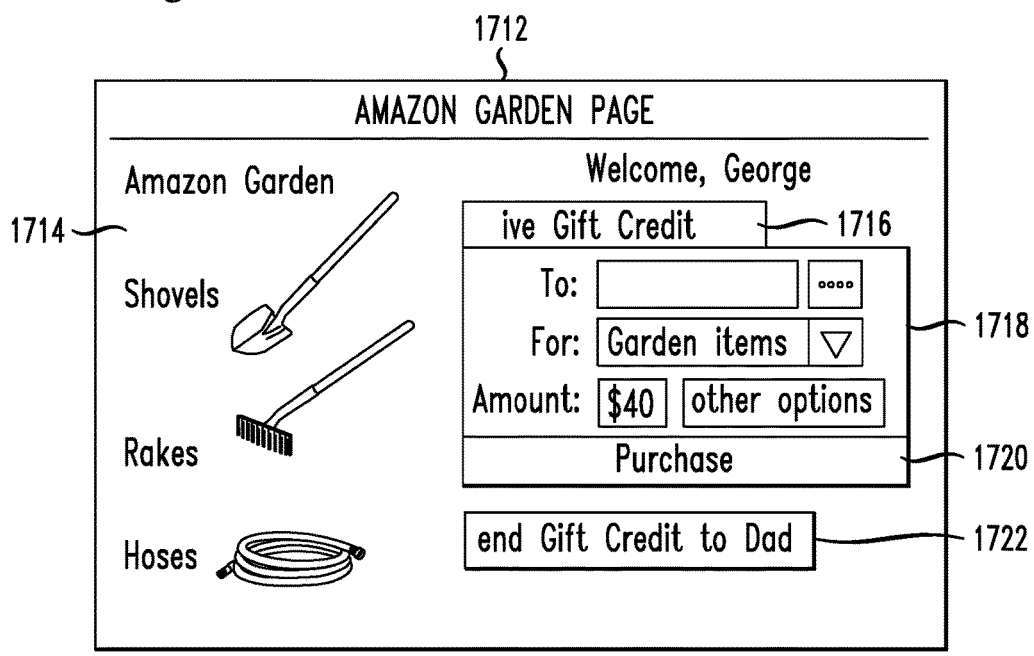
FIG. 17B illustrates a sample gift credit interface integrated at a general category level of an online merchant.
Figure 17C:
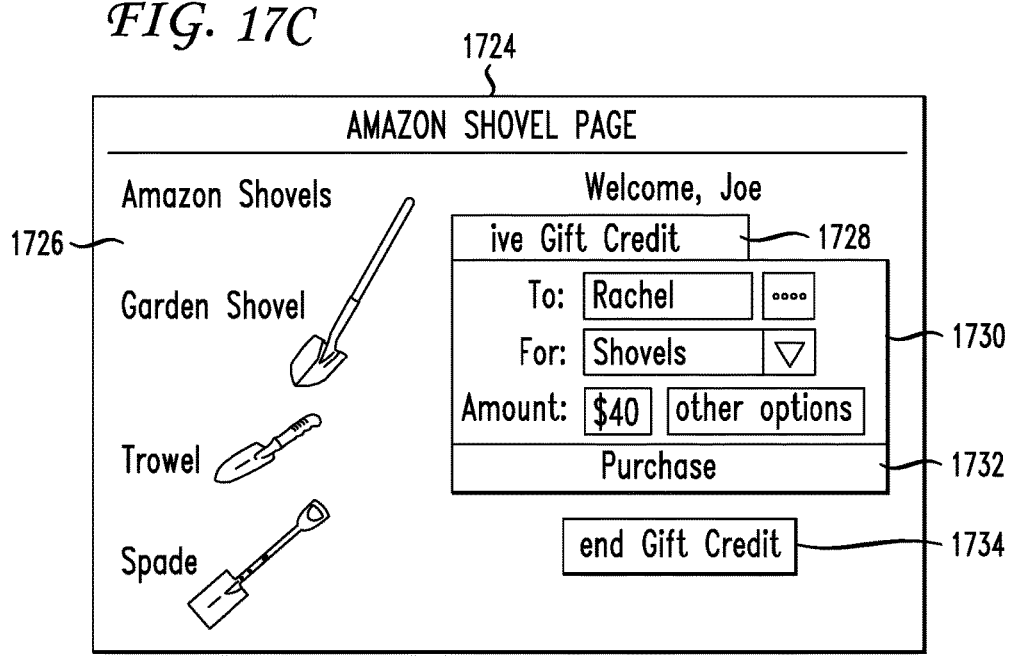
FIG. 17C illustrates a sample gift credit interface integrated at a specific category level of an online merchant.
Figure 17D:
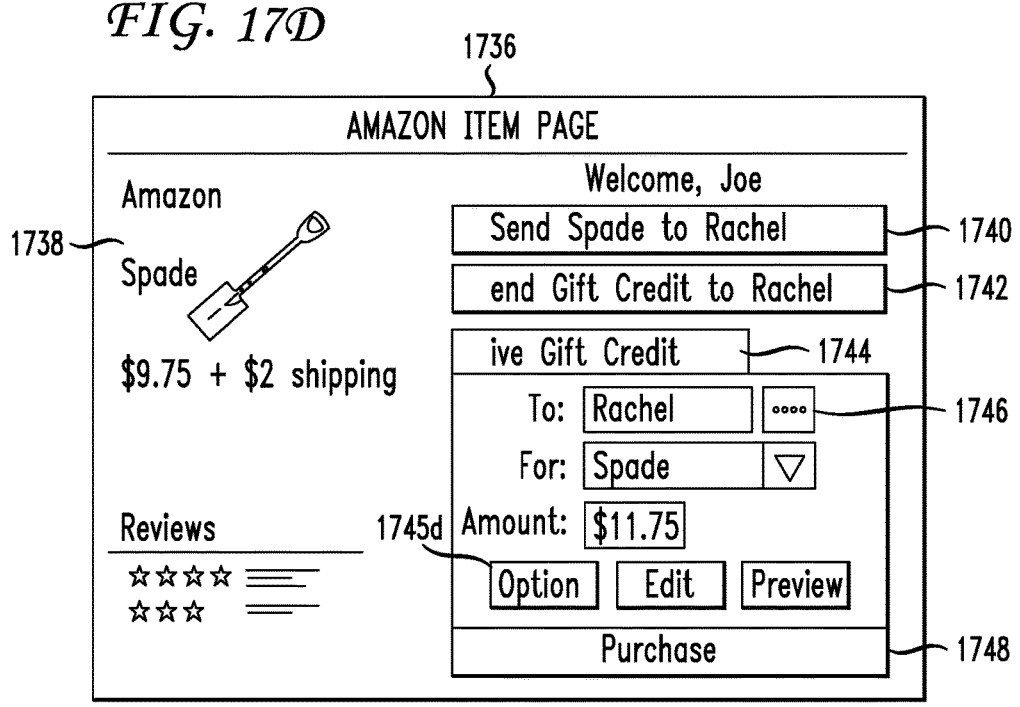
FIG. 17D illustrates a sample gift credit interface integrated at an item level of an online merchant.

FIG. 17B illustrates a dynamically modifiable gift credit interface at a lower level. Here, assume that window 1712 represents a search such that the giver is in the Amazon garden environment 1714. Here, various garden tools and supplies are available. The widget 1718 that can be presented to give a virtual card 1716 can adapt to this context. As can be seen in window 1712, shovels, rakes and hoses that are available in the window 1718 can adapt such that the giver can select as the scope of the gift credit and can be dynamically modified such that garden items defines the scope of the gift credit. Therefore, when the giver uses field to select a recipient for the gift credit, and the amount is entered in field, when George hits Purchase in field 1720, then the gift credit that is given can have a dividable scope of garden items within the Amazon environment. George clicks on the shovel portion of the garden section and browses to the interface shown in FIG. 17C. FIG. 17C illustrates yet another layer. Here, assume that George has navigated to a more detailed environment within Amazon just related to shovels 1726. Window 1724 illustrates this level in which the dynamic widget 1730 presents the option to give a gift credit 1728 with a particular person who populates the To: field and the For: field is pre-populated with shovels. George clicks on the space item of the shovel portion and browses to the interface shown in FIG. 17D. FIG. 17D illustrates yet a more specific context of searching within Amazon in which a specific item such as a spade is identified 1738. Window 1736 shows review information and specific cost of $9.75 plus $2 shipping. The giver can then purchase a gift credit for the recipient manually, via a "one click" purchase, or purchase the spade itself and send it to the recipient.

FIG. 18 illustrates an example method associated with the feature discussed above. In one variation, the system identifies a gift giver browsing a page of a merchant web site (1802). Then the system retrieves account information of the gift giver (1804) and analyzes content of the page (1806).

External data such as social networking data, the date, location, purchasing history, etc. of the gift giver and of potential recipients can also be retrieved and analyzed. The system can display a list of gift card options to the gift giver based on the content of the page. The gift card options can include a physical gift card for a recipient, purchasing an item for the recipient, and/or sending a gift card associated with a payment mode of the recipient such that when the recipient uses the payment mode to make a purchase, a gift card amount is applied to the purchase (1808). The system can optionally update the list of gift card options as the gift giver navigates to different pages of the merchant web site based on content of the different pages (1810).

Predictive Gift Credits

Figure 19:
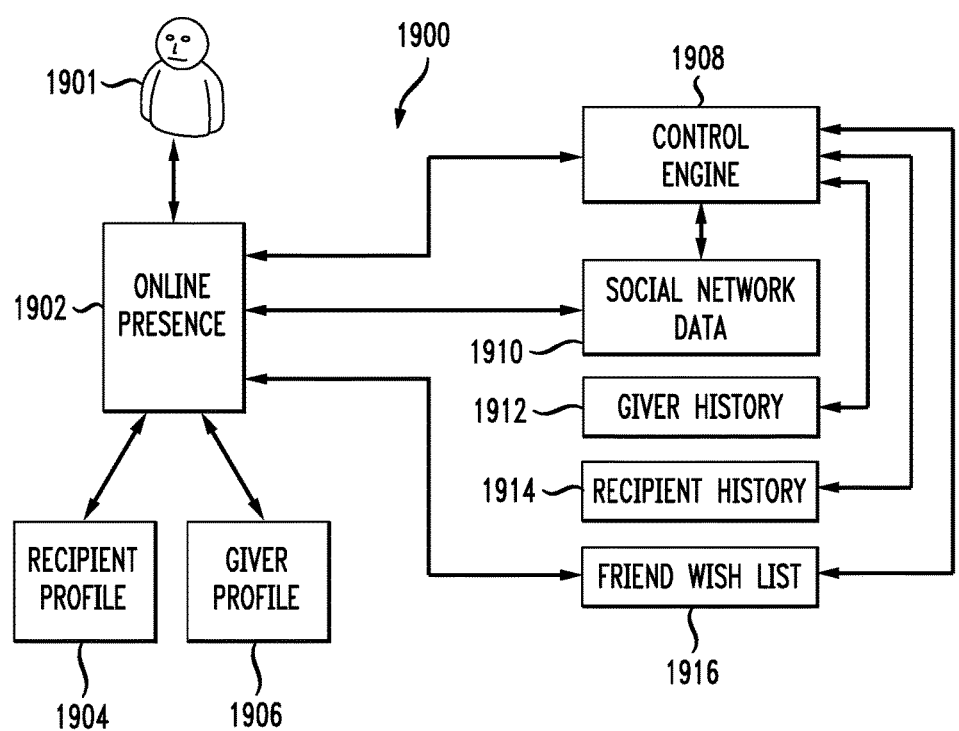
FIG. 19 illustrates an example system embodiment for providing a predictive list of gift credits and/or recipients.

With respect to predictive uses of gift credits, FIG. 19 illustrates a system 1900 that can be used for a predictive approach of presenting an interface for a gift giver of a gift credit. Online presence block 1902 represents an interface to the gift giver 1901 and what that interface presents to the gift giver. Specifically, with respect to predictive gift credits, the interface 1902 can present to the gift giver 1901 certain predictions about what types of gift credits the gift giver 1901 is likely to give. The system can tap in to and process various pieces of information in order to arrive at those predictions. For example, a recipient profile 1904 can be used for various recipients that are known to receive gift cards or gift credits from the gift giver 1901. A gift giver profile 1906 can include information about the giver's previous habits, own purchases, and so forth. The system can analyze social networking data 1910 or other personal data sources to identify such information as birthdays, habits, preferences, location-based information, and activities of the gift giver 1901 as well as various levels information about friends, family and associates. For example, through the social network data, the control engine 1908 and/or the online presence information 1902 can retrieve birthdays of the giver's closest friends and family. This social networking data can be very valuable when predicting what gift credits the gift giver desires to give. The giver history 1912, the recipient history 1914 and a friend wish list 1916 can also communicate with one or more of the online presence 1902 or the control engine 1908 to provide additional information that the control engine 1908 can use when predicting gift credit information. The control engine 1908 can utilize all or part of the various information, optionally assign weights to the various information, and combine it together to arrive at a prediction at any given time and based on any particular online presence information for the gift giver 1901 regarding what kinds of gift credits the gift giver desires to or should give.

Figure 20:
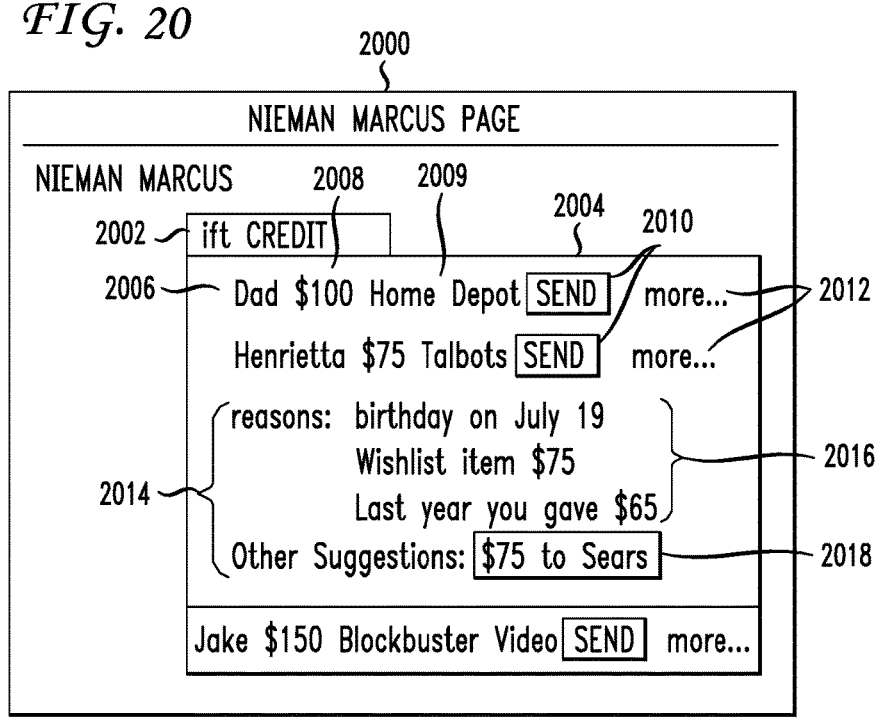
FIG. 20 illustrates an view of the example website with the predictive gift credit widget expanded.

FIG. 20 illustrates one example of how this approach works. Assume that window 2000 is the Neiman Marcus website and widget 2002 is presented that enables the gift giver to tap into and send a gift credit for Neiman Marcus or some other merchant. The widget 2002 can be a JavaScript or other popup, for example. For example, the website 2000 is Neiman Marcus and the widget 2002 is offering gift cards for other retailers. The system can present a predicted gift card summary after the giver clicks on the gift credit button. Given the context of information from one or more social networking data, online presence, giver history, recipient history and wish lists, and various profiles and so forth, FIG. 20 illustrates a predictive list of most likely recipients and that Dad 2006 should receive $100 2008 for Home Depot 2009. A Send button 2010 is presented such that if the gift giver decides to give the predicted gift card, a single click sends off that gift card to the right person with the right scope and for the right amount that Dad can redeem using his standard payment mechanism (Visa, American Express, MasterCard, etc.) at Home Depot. More information 2012 can be provided in case the gift giver desires to tailor the particular gift credit in a more detailed way.

Figure 21:
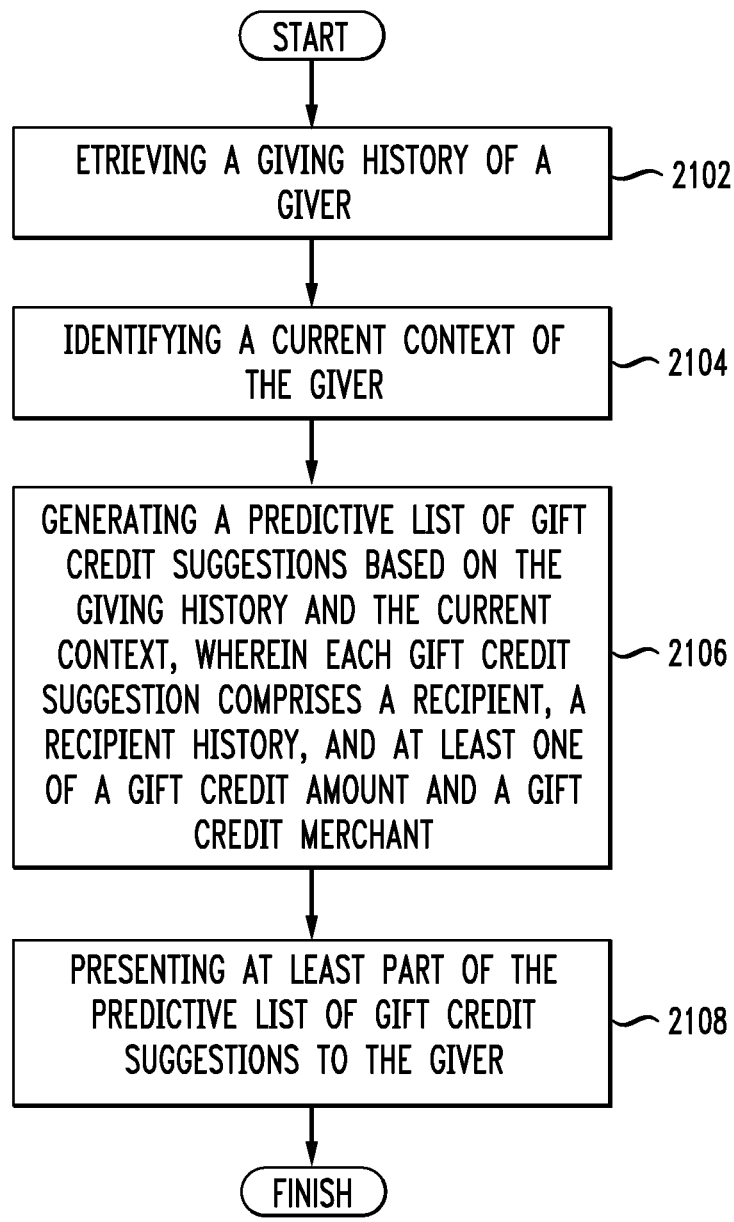
FIG. 21 illustrates a sample method embodiment for providing a predictive list of gift credits and/or recipients.

FIG. 21 illustrates an exemplary method associated with the predictive process for gift credits. In a first aspect, the system retrieves a giving history of a gift giver (2102) and identifies a current context of the gift giver (2104). The current context can include multiple information sources, such as a current web page view, a time, a day, recently purchased gifts, recently received gifts, a browsing history, recent communications, scheduled calendar events, debt owed, and so forth. The system then generates a predictive list of gift card suggestions based on at least one of the giving history, the current context, and other optional information (2106). A gift credit suggestion can include one or more of a gift recipient, a recipient history, a gift credit amount, and a gift card merchant, for example. Then the system presents at least part of the predictive list of gift credit suggestions to the gift giver (2108). The predictive list can be based on a current activity and presented in the context of the current activity.

Gift Credits with Loyalty Cards

Figure 22:
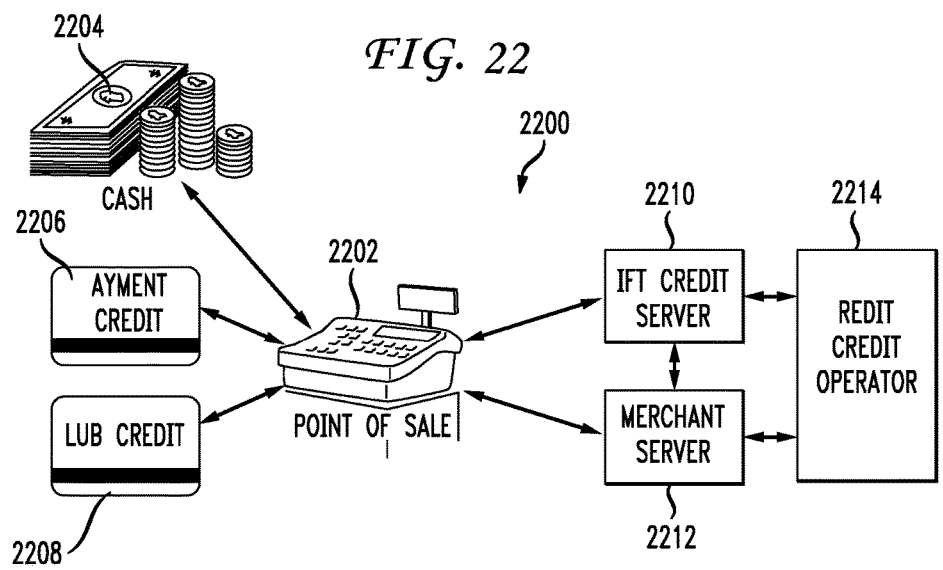
FIG. 22 illustrates an example system configuration for processing a gift credit in connection with a club card.

FIG. 22 illustrates another example use of the system 2200 at a point of sale 2202. A gift credit recipient pays for purchases using cash 2204, check, a payment card such as a Visa or debit card 2206 in conjunction with a club card 2208. The club card 2208 can make the recipient eligible for certain promotional discounts or savings. The gift credit can be tied to the club card 2208 to identify transactions to which the system applies the gift card. One example of such a club card or loyalty card is a Safeway club card in which the recipient receives discounts of items purchased at Safeway when they give the person at the register either the club card or a phone number which identifies them as a member of the club. In this example, the gift card server 2210 communicates with a credit card operator 2214 and a merchant server 2212 as well as hardware at a point of sale such that the gift credit can be applied to a particular purchase independent of whether the recipient used cash, a club card or a payment card in the normal fashion. For example, assume $10 in a gift credit has been presented to a recipient John. John goes to a point of sale but uses cash 2204 or a check to buy $10 worth of groceries. If the point of sale uses a club card information 2208 in order to process the transaction, the entry of the club card information can be communicated to a merchant server 2218 and/or a gift card server 2210 such that the gift credit amount can be applied to that purchase. The teller at the point of sale 2202 can simply inform the recipient that, as part of this transaction, a gift credit was used to pay $10 and thus the gift recipient does not have to pay anything for that transaction. This can be accomplished because usually the club card information is provided during the transaction to arrive at the final amount (since the club member gets discounts). Therefore, the final amount can include the application of the $10 in a gift credit.

Figure 23:
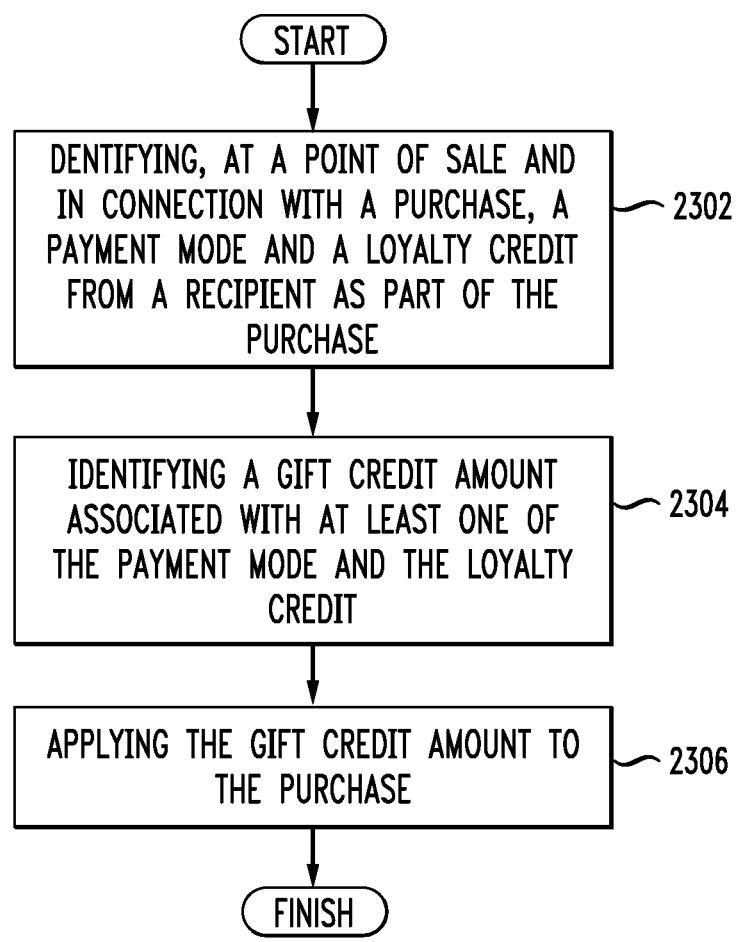
FIG. 23 illustrates an example method embodiment for processing a gift credit in connection with a club card.

FIG. 23 illustrates an example method embodiment for processing a gift credit in connection with a club card. In this example, the system identifies at a point of sale and in connection with a purchase, a payment mode and a loyalty credit from a gift recipient as part of the purchase (2302). The system identifies a gift credit amount associated with at least one of the payment mode and the loyalty card (2304). The system applies the gift credit amount to the purchase (2306). The gift recipient can use the loyalty credit with the merchant in the form of a separately scanned physical card, or a recipient-entered passcode, password, telephone number, or other information unique to the recipient.

Upselling with Gift Credits

Figure 24:
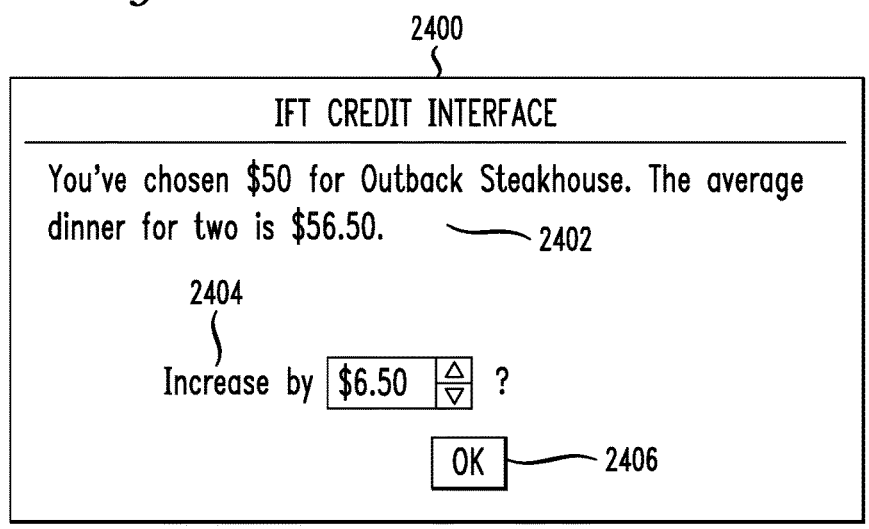
FIG. 24 illustrates an example user interface for dynamic suggestions for and adjustments to a gift credit by the gift giver.

FIG. 24 illustrates another opportunity for accessorizing, upselling, or otherwise modifying a gift credit based on various pieces of information that can be presented when the gift giver purchases the gift card, but which normally cannot be presented in a standard physical gift card scenario. The system presents exemplary window 2400 just following a giver's decision to purchase a $50 gift credit. The information 2402 can say something like "You Have Chosen $50 for an Outback Steakhouse gift credit". The system can deduce from information such as the merchant, the amount, the recipient, a recipient event, a message from the gift giver to the recipient, that the gift giver intends the gift card to be for dinner for two. The system can then determine that the average dinner for two at Outback Steakhouse is $56.50. The system can ask the gift giver if the gift giver wants to increase your gift credit by $6.50 2404 to meet the average dinner for two price. In another variation, the system can round the suggested increase amount, based on the actual average price, to a next round number, such as the next whole dollar or the next five dollar increment. Of course, the gift giver is free to adjust the increase amount up or down and can decrease the amount if the gift giver feels the amount is too high. Button 2406 receives the OK to increase the gift card for that amount. The window 2400 can also include additional information to guide the choice, such as average drink cost, dessert cost, tip amount, and so forth.

"Dinner and a Movie" Gift Credits

Figure 25A:
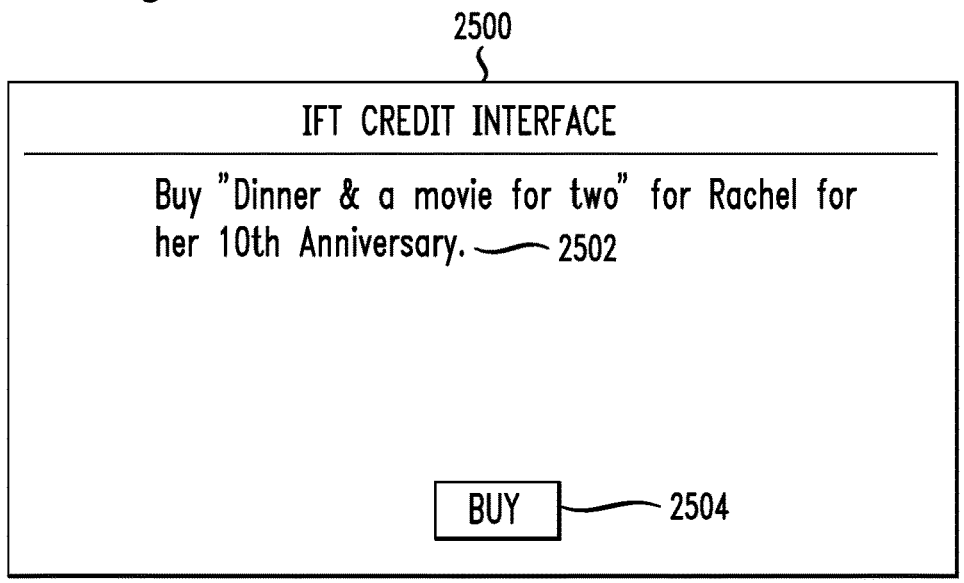
FIG. 25A illustrates a example user interface for a gift credit for an item of an as yet unknown value.

The disclosure now turns to a discussion of a "Dinner and a Movie" example embodiment. While the example presented herein is "Dinner and a Movie", the same principles apply to virtually any scenario where the exact dollar value of the gift credit is not known or indefinite until the time of the purchase. FIG. 25A illustrates another gift card interface 2500 that differs in that no particular dollar amount is presented. This example illustrates a gift card where the gift giver wants to buy dinner and a movie for two for Rachel for her 10th anniversary 2502 and a button 2504 to buy the gift card for dinner and a movie without a specific amount. The system can associate a number of restrictions with this gift card.

Figure 25B:
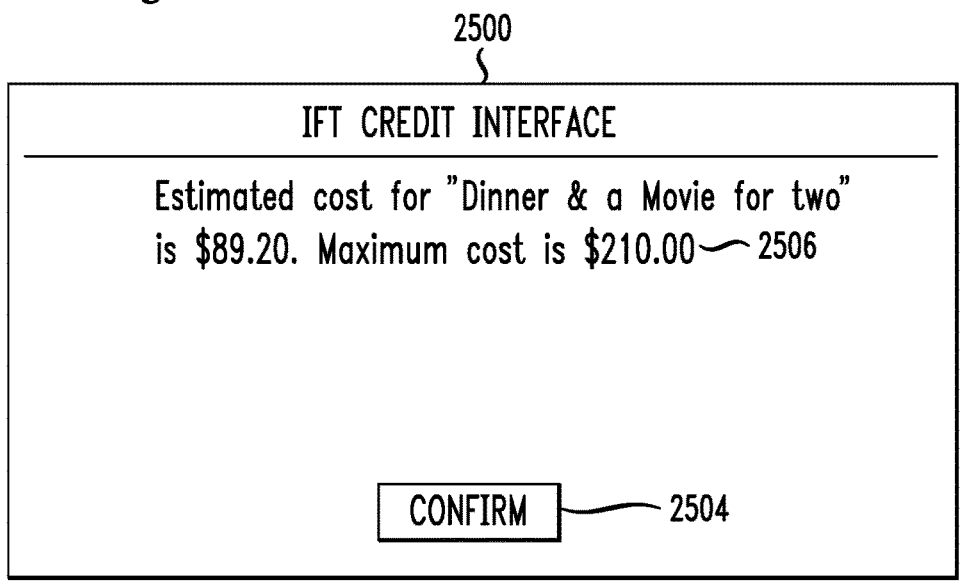
FIG. 25B illustrates an example confirmation user interface for a gift credit for an item of an as yet unknown value.

FIG. 26 illustrates a system 2600 for processing such a gift card request from item or service with no definite amount. Block 2604 represents a user interface that receives from gift giver 2602 a gift card request for such an item or service that has no definite amount at step 1. The request can be communicated to a server 2606. The server can then reach out and communicate with various vendors at steps 2 and 3, a first vendor 2608 and a second vendor 2610 as well as other vendors to receive estimated costs for the dinner, the movie, the bracelet, or any other item for purchase or service. Alternatively, the server 2604 performs a database lookup to estimate costs without communicating with the vendors 2606, 2608 directly. That maximum amount is communicated back to the gift giver 2606 in step 4. When the gift giver 2602 optionally confirms in step 5 that the gift card is approved, server 2606 then accesses at step 6 the giver account 2614 to either withdraw money or reserve the maximum amount for such a gift credit (which is $210 as shown in the example shown in FIG. 25B). Then, as is noted in the scenario above, when the recipient actually purchases the item or service, such as a dinner and a movie from the vendors 2606, 2608 via the recipient account 2612 at step 7, a final actual amount is identified is step 8 by the server. Step 8 also involves applying the actual amount from the held or reserved amounts from the giver account 2614 to the recipient's purchase. Step 9 involves releasing the remaining amount and step 10 optionally notifies the gift giver of the release.

FIG. 27 illustrates an example method embodiment associated with the indefinite gift credit. The system first receives, from a gift giver, a first identification of a recipient and a second identification of a gift object costing an indeterminate amount of money (or gift credit) at a first time (2702). The system optionally determines an estimated maximum amount of money of the gift object (2704). The system can also optionally confirm with the gift giver that the estimated maximum amount of money is acceptable as a gift credit (2706). The system reserves the estimated maximum amount of money from a giver account (2708). The system identifies a recipient payment mode (2710). Upon the recipient using the recipient payment mode to make a purchase of the gift object at a second time that is later than the first time (2712), the system identifies an actual cost of the gift object (2714) and applies the actual cost of the gift object from the estimated maximum amount of money to the purchase (2716). The system can optionally release the remaining portion of the estimated maximum amount of money to the gift giver (2718). In one aspect, the gift credit or amount can be maintained in the giver payment account until the recipient makes the qualified purchase.

Figure 29:
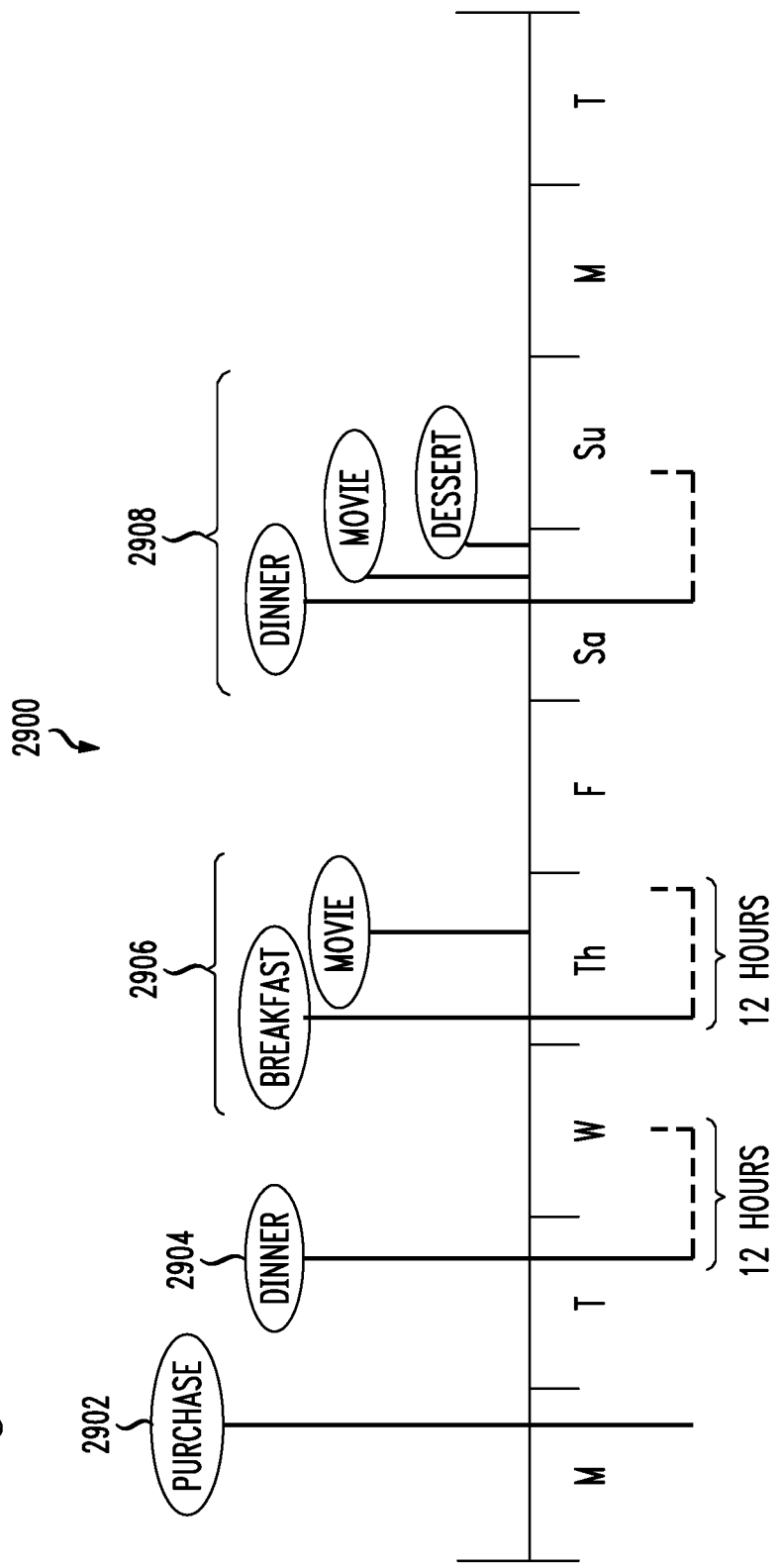
FIG. 29 illustrates a timeline for a "dinner and a movie" scenario.

FIG. 29 depicts an example timeline 2900 for a "dinner and a movie" gift credit scenario to further illustrate these principles. The timeline represents multiple days and events occurring in those days. On Monday, the giver purchases 2902 a gift credit for the recipient for "Dinner and a Movie for Two". The system establishes a policy or set of policies guiding the gift credit. The policies for this gift credit can include a dinner and two movie tickets purchased within 12 hours of each other. Other more detailed policies can include the two movie tickets must be purchased for the same showing of the same movie, the dinner must include at least two entrees, or the two movie tickets must be purchased within the same 12 hour window. On Tuesday night, the recipient purchases dinner for two 2904, which triggers a 12 hour window. If the system is monitoring the recipient purchases in real time (or substantially real time), the system can provide a notification to the recipient that a first part of the policy associated with the gift credit has been fulfilled. The notification can include some other suggestions and reminders of the remaining policy requirements for redeeming the gift credit for "Dinner and a Movie". However, the recipient does not purchase movie tickets for a movie within the twelve hour window, so the system resets that policy. The policy with respect to a business can identify the business through any mechanism such as through a network merchant category or a network merchant ID that identifies a category of merchants (clothing stores) or a specific merchant ID (Nordstroms).

The next set of exemplary transactions 2906 shows that the recipient purchased breakfast on Thursday morning and movie tickets within the twelve hour window, but the system may or may not recognize the breakfast as a qualifying "Dinner" based on the policies. If the system recognizes the breakfast as a qualifying transaction according to the policy, then this set of transactions 2906 triggers the redemption of the gift credit. However, if the policy indicates that the "Dinner" must be purchased between the hours of 4:00 pm and midnight, then this set of transactions 2906 does not trigger the redemption of the gift credit. Turning to the third set of exemplary transactions 2908, the recipient purchases dinner for two on Saturday and restarts the twelve hour window. The system can send a notification to the recipient, such as by email, text message, via a social network, or other communication, that the transaction has started the twelve hour window for completing qualifying transactions for redeeming the gift credit. In that twelve hour window, the recipient sees a movie with his spouse. This can satisfy the policies associated with the gift credit and trigger its redemption to cover the movie and dinner. At this point, the system can send a notification to the recipient of the transactions that satisfied the policies, details of the transactions, such as the time, location, amount, merchant, and so forth. The notification can also include a description of any optional transactions that can be associated with the gift credit.

Intercepting Gift Credit Transactions

Figure 28:
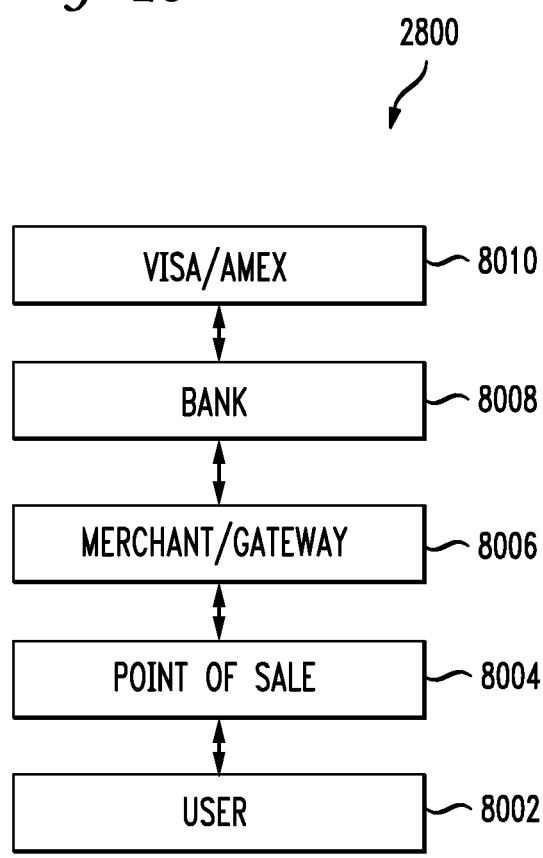
FIG. 28 illustrates an example payment processing chain.

FIG. 28 illustrates an example payment processing chain 2800. This chain 2800 is representative and can include more or less steps, including variations with multiple concurrent paths for different payment modes, such as a branch for processing credit cards and a branch for processing debit cards. The system for processing gift credits can intercept transactions at any of multiple locations in the chain 2800, depending on the type of gift credit, the type of underlying purchase or transaction, the issuer of the gift credit, and other factors. In this chain, a user 8002 presents a credit/debit card or other payment instrument at a point of sale 8004. The point of sale can be at a brick and mortar retailer, such as a checkout cash register at Target, or a virtual storefront, such as Amazon.com or a mobile device store for downloading applications. The point of sale 8004 must first verify that the payment instrument is valid and is backed by sufficient funds or credit to complete the transaction. To this end, the point of sale 8004 can communicate with a merchant/gateway 8006. The system can intercept payments at the point of sale 8004 level and/or the merchant/gateway 8006 level in order to process gift credits associated with club cards or loyalty cards, for example. The merchant/gateway 8006 can communicate with a bank 8008, and the bank 8008 can communicate with a credit card issuing bank 8010.

Either the bank 8008 or the credit card issuing bank 8010 confirms that credit is available and can reserve that credit for payment for the transaction or confirms that funds are available for the transaction and withdraws those funds from the user's account. Then the various entities communicate back through the chain to the point of sale 8004 to confirm that the user's payment device is valid and has sufficient funds or credit to complete the purchase. Then the point of sale can complete the purchase. The system can intercept these transactions at any stage in the chain and can intercept transactions at multiple stages. The system can intercept a transaction at a point of sale to apply part of the gift credit associated with a loyalty card. The system can intercept the transaction at a merchant/gateway 8006 level to apply a main portion of the gift credit amount, but can also intercept the same transaction at the credit card issuing bank 8010 level to apply a promotional bonus for using an American Express card.

Reverse Gift Credits

FIG. 30 illustrates an exemplary user interface 3000 for requesting a reverse gift credit. The scenario in which FIG. 30 will be discussed is a group of three friends who go out to dinner together, each order food and drinks, and at the end receive a bill or check for the combined amount, including a tip, of $53. The approach described and the user interface depicted in FIG. 30 provide a way to avoid the friends having to remember to bring cash, perform mathematical calculations to determine their share, or pay using three separate credit cards. One of the friends, Bob Jones, opens a reverse gift credit application on his smart phone or other mobile device, which displays the user interface 3000. The reverse gift card application provides an easy way for Bob to pay for the dinner and arrange for his friends to reimburse Bob for their portions.

Bob logs in and the device retrieves Bob's credentials 3002 associated with at least one payment account 3004, in this case a MasterCard credit card. Then Bob can select multiple givers 3006, 3008 and enter the amount that each owes for the dinner bill. The interface 3000 can also display the total remaining on the bill 3012 that may or may not correspond to Bob's share of the bill. Bob can then submit the reverse gift credit and the system notifies Giver 1 and Giver 2 of their proposed share of the bill, such as via text message or email, such as "You and Bob had dinner together at TGI Friday's. Bob is requesting that you pay $15 as your share of the bill." The givers can confirm the proposal, add more money to the total, or otherwise interact with the notification to revise the amount. Upon receiving the confirmations from the givers, the system debits the respective amounts of money from each giver and credits those amounts of money to Bob's account as a reimbursement for paying the entire dinner bill.

Given that each person is in the system, the various credit/debit card accounts are known. The system can then confirm a payment plan for the group. Rachel then simply pays with her credit/debit card. Everyone group member's payment mechanisms is available and the respective amounts are retrieved from each giver account and associated with the transaction made by Rachel such that she is reimbursed. Rachel does not even need to be identified in the application as the one who will be making the payment. A policy can apply under the application for each particular such that when the group is identified with the respective member amounts, the group activity is monitored. For example, after all the data is entered, Rachel may have left her credit card at home. The application knows the group, knows the amount, and if George then pays the bill (rather than Rachel), the system can automatically turn Rachel into a gift giver and George the recipient. Indeed, in one aspect, no person needs to be identified as the gift giver. Each person only needs to enter their respective amount and then one in the group will pay. One or more in the group could pay as well and the system could work out the appropriate payments to each payer such that the right reimbursement is made to the correct respective payer.

Figure 31:
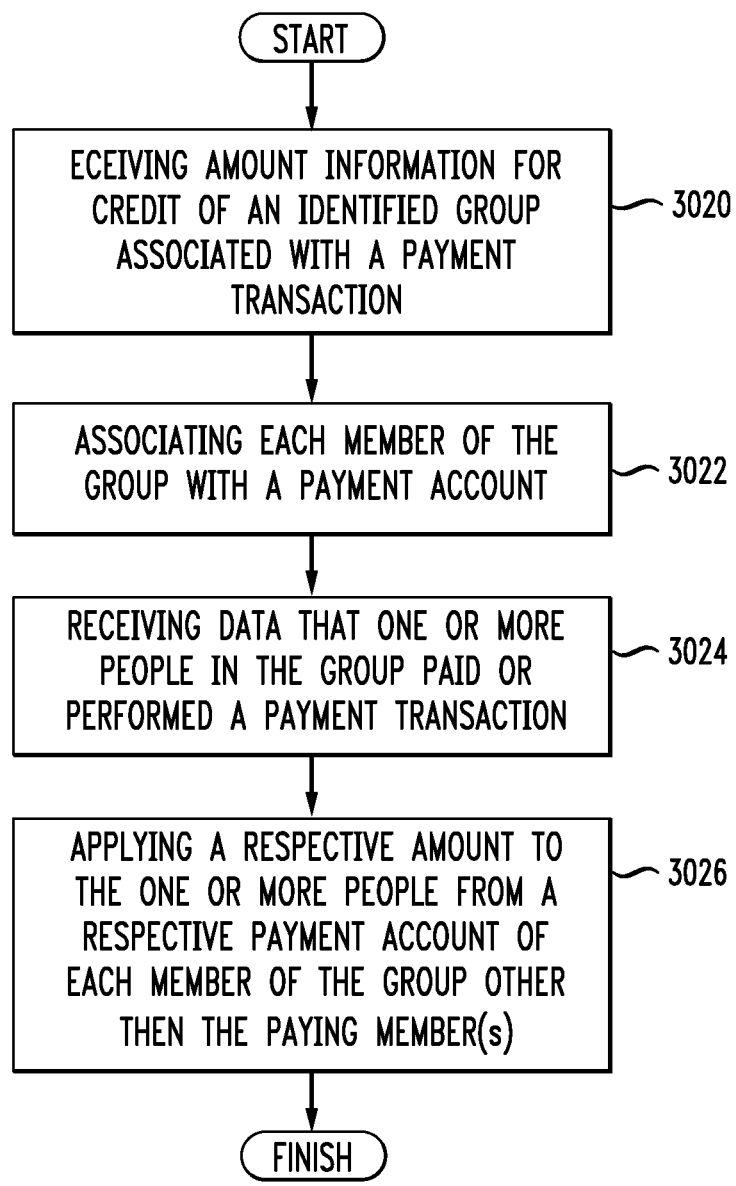
FIG. 31 illustrates a method embodiment of managing a group payment associated with a payment transaction.

FIG. 31 illustrates a method embodiment of this approach. The system receives amount information from each person in a group of people who are going to be associated with a payment transaction (3020). The system associates each member of the group with a respective payment account or payment mechanism (3022). The system receives data that one person in the group paid via their payment mechanism (3024). The system then applies a respective amount of money from each person's payment account in the group to the one person who paid (other than the paying member) (3026).

Rich, Social Thanking for Gifts

The disclosure turns now to retaining the social experience associated with giving and receiving a gift. When a recipient receives a gift, the recipient redeems the gift by making the purchase using his or her previously existing recipient payment account. For example, the recipient can purchase a book or can purchase dinner at the Olive Garden, where the money for that gift ultimately comes from a gift giver even though the recipient purchases it using their regular method of buying products. In association with making the purchase, the recipient can use a smartphone application or some other app to take a picture associated with the gift, whether a picture of the item itself, the recipient's happy face, the store where the gift was redeemed, the recipient enjoying the purchase, and so forth. The recipient can select or take a picture. In one variation, the merchant point of sale can prompt a store clerk to remind the recipient to take a picture to share, although a backend system can push a notification to the recipient's device to take a picture. In one variation, the picture is one of the requirements that must be satisfied in order to redeem the gift. The system can apply an image recognition algorithm to ensure that the photo contains a desired object or person prior to sending the photo to the gift giver. The requirements to complete the redemption of the gift can include one or more of any number of factors such as a taking of a picture of the gift, the inclusion of the recipient's face (as verified by facial recognition software), the reception of a note or feedback such as a rating of the gift and/or a comment, a location based feedback, and so forth.

Such requirements could also provide for partial redemption. For example, if the user performs 3 tasks then the gift giver pays for the full gift. If the recipient only performs one task and take the picture of the gift, then the gift giver pays for ½ of the gift. A backend system can track the recipient interactions through a device and/or an application to identify at what level the gift giver will contribute to the purchase of the gift. In a similar manner, a merchant, manufacturer, advertiser, agency, or any other entity who may have a stake in or can use the data obtained from one or more user interactions, can also provide a contribution to a portion of the gift or an added bonus or feature such as offering to pay for a dessert if the user performs three tasks associated with purchasing the gift.

The system can assign or identify tags for the photo such as the date, time, location, direction, facial recognition or orientation of the camera. The recipient and/or the gift giver can assign other manual tags, such as hashtags or other textual or category tags, such as #nightoutinNYC, #anniversary, or #thebigfour-oh. A face recognizer can identify people in the image and either tag faces or prompt the user to provide identities for or otherwise label the recognized faces. The recipient can establish privacy settings for the tags, so that only specific users or groups of users can view or edit the tags.

After the tags are assigned, the system can retrieve giver data, such as the ID of the gift giver, the giver phone number, gift ID number, or giver address. The system can send the photo and at least a portion of the tags to the gift giver, or to some other party indicated by the gift giver or recipient as a virtual "thank you" card. A gift app on a smartphone can prompt the user to customize the virtual "thank you" card as the gift is redeemed, or shortly thereafter. For example, when the recipient makes a qualifying purchase using the recipient payment account and triggers redemption of the gift, a gift server can detect the redemption and push a notification to the recipient's smart phone to launch the virtual "thank you" card portion of a gift app. The recipient can customize the text, audio, video, images, and other aspects associated with the virtual "thank you" card or with delivery of the virtual "thank you" card. Alternatively, the system can automatically post the photo and all or part of the tags to a social network on behalf of the recipient. The system can attach multiple pictures or videos to the virtual "thank you" card. For example, the recipient can send the gift giver a video showing a bit of the dinner that they received as the gift. The giver can indicate a preferred form to receive the virtual "thank you" card, such as email, a particular social media site, or SMS. The gift app can also receive the picture of the recipient that is associated with the redemption of the gift and enable the recipient to transmit that image to be used in any manner to thank the giver. For example, the image could be imprinted on a physical gift card and mailed to the giver as a thank you with a particular dollar amount identified by the recipient and paid for out of the recipient payment account, which is already in the system.

The system can incentivize gratitude and virtual "thank you" cards by including additional offers to either the recipient or the giver as part of creating a virtual "thank you" card. The additional offers can include their own respective policies governing their redemption. For example, if the recipient receives a $50 gift to Olive Garden, the virtual "thank you" card can include a picture of the recipient's dinner at Olive Garden and a $5 gift for the giver to use at Olive Garden. A physical "thank you" gift card could be send to the giver as well. Olive Garden can fund the virtual "thank you" card, or the original recipient who now becomes a gift giver in return. The amount of such an additional offer can be predetermined and paid for as a percentage of the gift or the recipient can manually select an additional offer type and amount. The recipient of the additional offer can, in turn, forward on a second virtual "thank you" card upon redemption of the additional offer, creating a chain or loop of gifts/offers and "thank you's."

The system can store a history of virtual "thank you" cards or the images or other media assets contained in the virtual "thank you" cards. In this way, the recipient and/or the gift giver can browse and reuse certain virtual "thank you" cards or media assets. For example, if five friends contributed to a gift for the recipient, the recipient can store a photo used for one virtual "thank you" card, and reuse that photo in sending virtual "thank you" cards to the remaining givers. In another variation, the system can create a virtual "corkboard" or collage of gifts sent and received between a group of people over time. For example, the system can collect information of gifts sent between a husband and wife, and present the images in a collage or slide show, allowing the husband and wife to reminisce over past gifts and the virtual "thank you" cards exchanged at special occasions. The virtual "thank you" cards may have a greater, more enduring sentimental value for the husband and wife than the actual gifts exchanged.

In a similar manner, the system can track which givers gave which items, and can provide a "gift log." The gift log can identify that the lamp came from Kevin, and the toaster came from Fran. In a more complex alternative, the system can perform image recognition or image matching to allow a user to take a picture of an item in his or her home, and the system can match the item to an item in the gift log. When a match is determined, the system can present available data, such as when the item was received as a gift, for what event the item was received, from whom the item was received, the approximate or actual price, and so forth. The system can link multiple recipients together as a household to determine whether a particular item was received as a gift.

Figure 32:
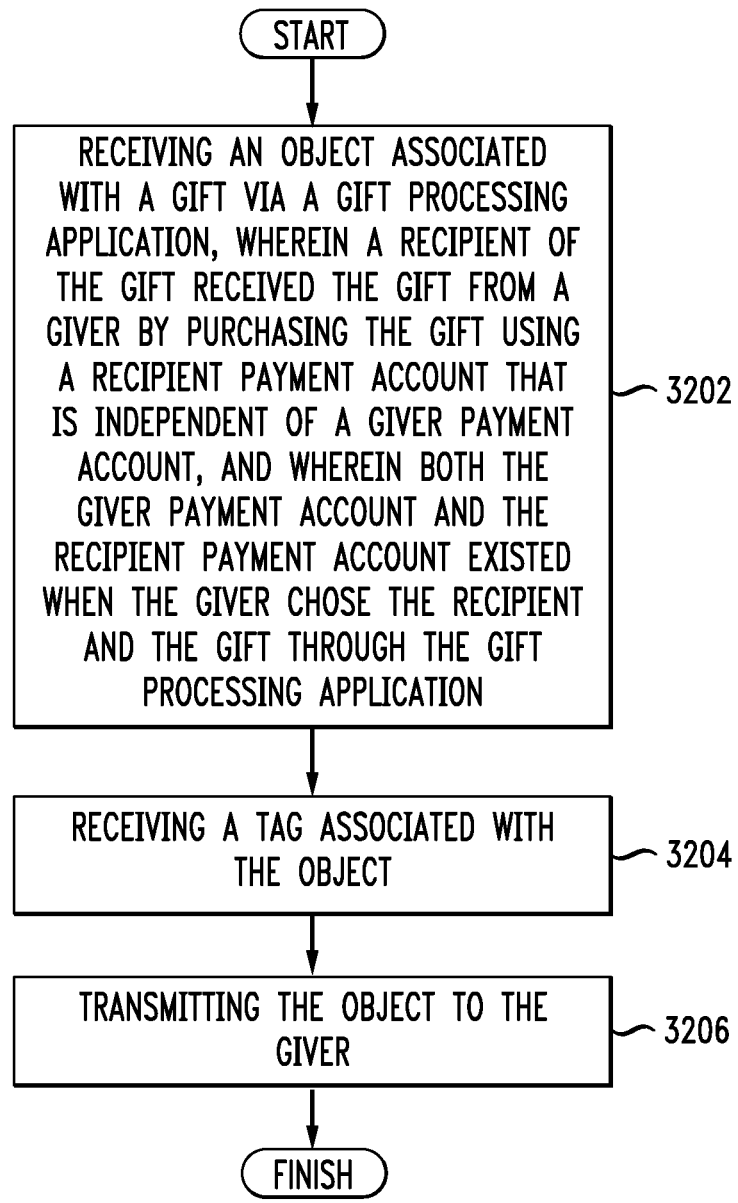
FIG. 32 illustrates an example method embodiment for sending an object associated with receiving a gift.
Figure 33:
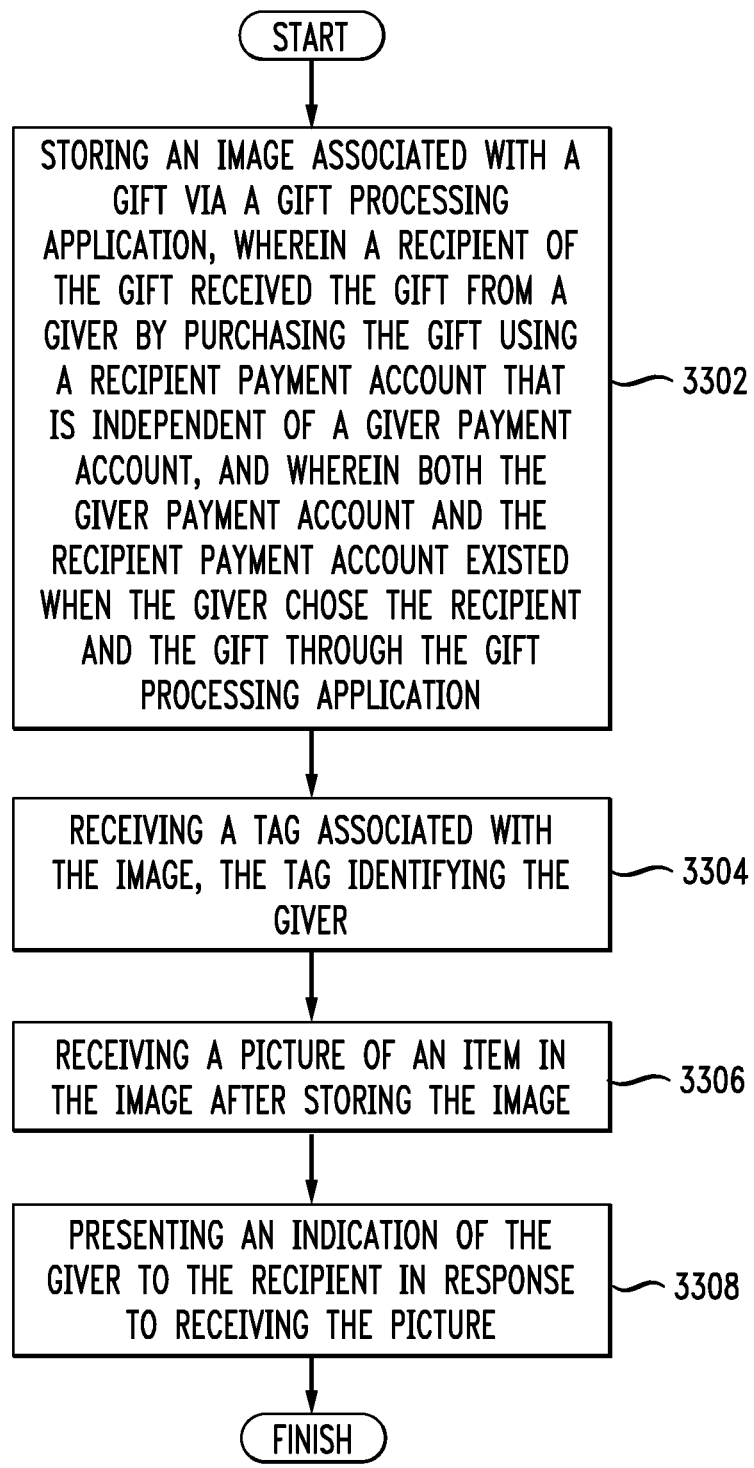
FIG. 33 illustrates an example method embodiment for sharing images associated with a gift.

A system configured to practice a first example method embodiment, as shown in FIG. 32, receives an object associated with a gift via a gift processing application, wherein a recipient of the gift received the gift from a gift giver by purchasing the gift using a recipient payment account that is independent of a giver payment account, and wherein both the giver payment account and the recipient payment account existed when the gift giver chose the recipient and the gift through the gift processing application (3202). Then the system receives a tag associated with the object (3204), and can transmit the object to the gift giver (3206). The optional tag can provide metadata information about the object. The tag can be a date, a time, a location, a manually entered tag from the recipient, a description of the gift, or a message, for example. The object can be, but is not limited to, an image, audio, a text-based message, or a video. The object can be any digitally storable object for presentation to the gift giver and/or receiver. In one variation, after the recipient receives the gift, the system can receive an identification of an amount of money and a merchant associated with the object, and present the amount of money and the merchant information to the gift giver such that the gift giver can make a purchase at the merchant using the giver payment account and have the amount of money applied to the purchase. The recipient payment account and/or a merchant payment account can provide the amount of money to be applied to the purchase. In a related method, as shown in FIG. 33, the system can store an image associated with a gift via a gift processing application, wherein a recipient of the gift received the gift from a gift giver by purchasing the gift using a recipient payment account that is independent of a giver payment account, and wherein both the giver payment account and the recipient payment account existed when the gift giver chose the recipient and the gift through the gift processing application (5402), receive a tag associated with the image, the tag identifying the gift giver (5404), and receive a picture of an item in the image after storing the image (5406). Then the system can present an indication of the gift giver to the recipient in response to receiving the picture (5408).

Face Recognition

The disclosure turns to a discussion of problems associated with monitoring a recipient of a gift in-store to provide reminders, suggestions, or notifications regarding suggestions or redemption of the gift. In a first example, a gift giver has given a recipient a gift governed by a policy indicating a merchant and a recipient payment account. The policy can include other data on how to manage redemption of the gift, such as a $50 gift to Olive Garden which the gift giver gives to the recipient and the recipient redeems by using the recipient payment account, such as a debit or credit account. Once the gift is in the gift administration system, the system can create a monitoring tag or object. The system can distribute or post the monitoring tag or object to the merchant, so that as the recipient enters the merchant's place of business (as identified, for example, by a network merchant ID or a network merchant category), surveillance cameras can capture images of the recipient's face, and match the recipient's face with the policy via face imaging or recognition technology. Face imaging or recognition technology can compare images or video of faces with stored facial characteristics to generate a positive match.

An on-site face detection system at the merchant can identify when the recipient enters the merchant place of business. Upon successful recognition of the recipient by the face recognition system, the system can perform an action. The gift policy can provide the actions to perform, or the actions can be specified by the merchant, the recipient, a type of recipient, available store clerks, available inventory in that location in the store, and so forth. If an outstanding gift policy for that merchant is active in the system for the recipient, then the system can send a notification to the recipient reminding him or her that about the gift, such as an automated telephone call, text message, a popup on a smartphone, and so forth. The notification can include a reminder of the relevant portions of the policy for redeeming the gift, such as reminding the recipient to use his Visa card to make the purchase, and reminding the user that the gift amount is $50. The system can poll the merchant to locate any additional offers or promotions from the merchant, such as "you have a $50 gift card to Olive Garden, we'll add $5 to the value if you buy dinner tonight," and include those additional offers or promotions in the notification. These additional offers or promotions can be widely available or can be tailored for the specific recipient.

The system can use face recognition to identify that a recipient having an active gift has entered the merchant location, and notify in-store workers regarding the recipient. Then the in-store workers can locate the recipient or spend special attention with the recipient if or when they encounter him or her. The face recognition system can be at a single point, such as at the entry, and generate a live list of customers in the store having active gifts. Alternatively, with face recognition placed throughout the merchant location, the system can generate a rich list of the locations within the store where such recipients are in real time. The system can tap in to other data sources to supplement or augment the rich list of recipients with valid gifts, such as cell phone geolocation data, RFID tags in shopping carts, social networking data, online public profile information, a customer history database, and so forth.

Figure 34:
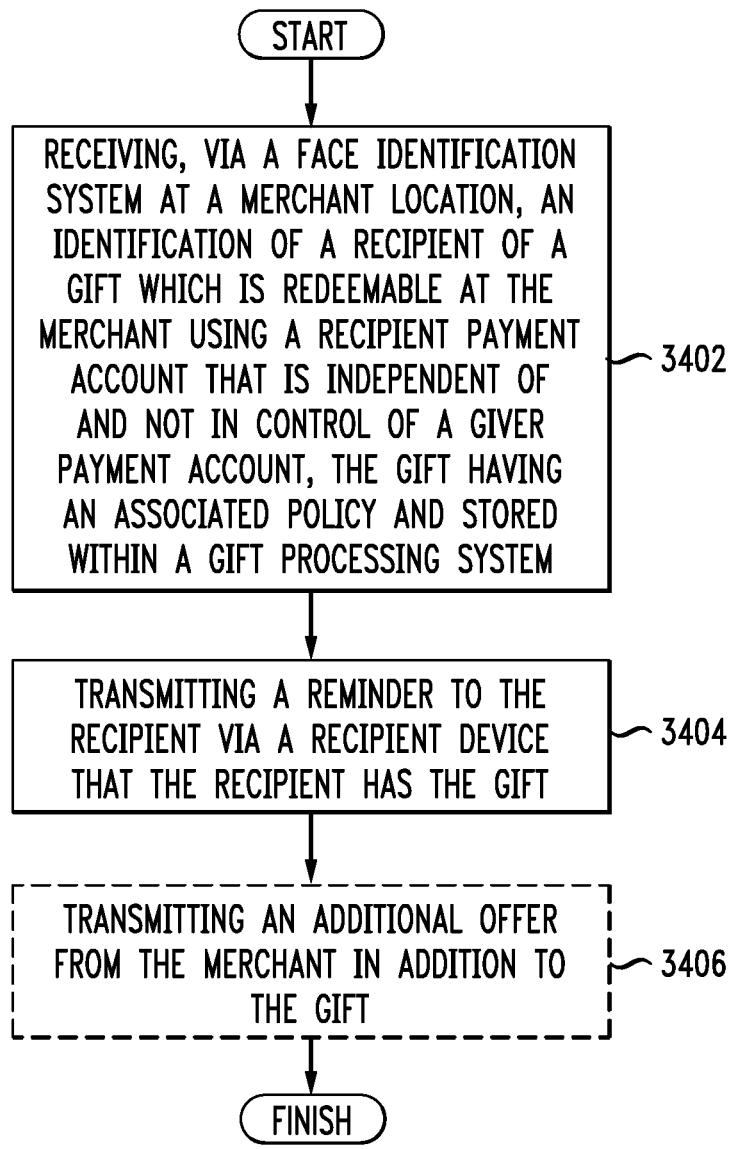
FIG. 34 illustrates an example method embodiment for face recognition with gifts.

FIG. 34 illustrates an example method embodiment for face recognition with gifts. An example system can receive, via a face identification system at a merchant location, an identification of a recipient of a gift which is redeemable at the merchant using a recipient payment account that is independent of and not in control of a giver payment account, the gift having an associated policy and stored within a gift processing system (3402). Then the system can transmit a reminder to the recipient via a recipient device that the recipient has the gift (3404). The system can further transmit an additional offer from the merchant in addition to the gift, such as a coupon, promotion, coupon code, discount voucher, and so forth. The additional offer from the merchant can be conditional upon one of the recipient making a redeeming purchase in a period of time and the recipient making a redeeming purchase prior to leaving the merchant location. The system can place other conditions on the additional offer as well. The system can further receive an indication of a purchase made by the recipient using the recipient payment account at the merchant location.

In another variation, a person is enrolled in the gift and face recognition system, such as through a previous gift that has been redeemed, but for whom no gifts are currently active. The system can recognize the person as he or she enters the merchant place of business. Based on previous sent or received gifts at the merchant or other merchants, the system can determine via social networking or gift history data that the person is likely to give a gift to a recipient. The system can generate and send a notification to the person, who would become then the gift giver, to send a prepackaged gift of $50 from to the recipient. The system can identify these relationships based on Facebook friendships, for example. An example notification could say "Tom, you know that your Facebook friend Ginny loves the Olive Garden. Why not give her a $50 gift credit to the Olive Garden for her birthday in two weeks? Click here for delivery by next Sunday." The system can apply an algorithm to match up a potential giver with the most likely recipient(s) in his or her social network based on the taste of the recipient, holiday timing, past patterns of giving, closeness of the relationship, closeness of the upcoming holiday, birthday, or event, and so forth.

With face recognition, the system can also track how many times a recipient having an active gift has entered one of the merchant's locations of business without making a purchase. For example, the recipient may stop by four different locations of Best Buy without making a purchase. At this point, the system can trigger a contact from a customer service agent or personal shopping assistant from Best Buy to call or otherwise contact the recipient to provide help. Perhaps the recipient is looking for a specific item and is willing to use the gift, but cannot find the desired item. The system can provide all or part of the gift data to the customer service agent, so that the customer service agent can provide more personalized assistance or make topic-appropriate small talk with the recipient.

Delaying Funds Transfer Until Time of Transaction

The disclosure turns now to managing money contributed to a gift that is ultimately not redeemed or that is under-redeemed so that no money is lost in the gift transaction. If the gift credit and corresponding policy are never used or activated by a qualifying purchase using the recipient payment account, then the system can do nothing and leave the gift funds in the giver payment account. For example, the giver buys the recipient a $50 gift for Joe's Pizza. The system sends the recipient a notification of the gift credit. For whatever reason, the recipient never goes to Joe's Pizza or never redeems the gift credit. In this case, the giver payment account is never charged for the gift, and no transaction occurs. This approach is basically a no-loss gift model because the gift is paid for post-purchase. If the gift is redeemed over multiple transactions, such as a gift having a value of $100, and redeemed in a first transaction of $40 and a second transaction of $60, the system can withdraw or transfer funds from the giver payment account as the transactions occur. Alternatively, a first transaction of less than the full gift amount can trigger a transfer of the entire gift amount from the giver payment account.

A system configured to practice a third example method embodiment can create a gift for a recipient, based on a request from a gift giver, and notify the recipient of the gift. The gift credit can be redeemable at the merchant using a recipient payment account that is independent of and not in control of a giver payment account, the gift credit having an associated policy and stored within a gift processing system.

If the recipient never redeems the gift credit using the recipient payment account, then the gift giver is not charged for the gift credit and no transaction occurs. Alternatively speaking, the giver payment account is charged only upon redemption of the gift credit using the recipient payment account. To avoid accumulation of such outstanding charges, the gift credit can expire after a certain period of time, such as after 2 years, after a certain number of notices to the recipient, and so forth. In the case of the gift giver closing the giver payment account, the organization administering the giver payment account can withhold sufficient funds to cover the eventual redemption of the gift credit for a certain period of time, after which the funds can revert to the gift giver, or can be applied to the recipient payment account.

Identifying Transactions Almost Satisfying a Gift Policy

In one variation, the recipient makes a transaction that almost satisfies the policy requirements to redeem the gift, but the transaction does not meet one or more of the policy's conditions. The system can notify the recipient that the policy was almost satisfied, and can either suggest to the recipient how to modify the transaction or what additional steps to take to satisfy the policy and redeem the gift. Alternatively, the recipient can instruct the system to amend the policy to make the transaction satisfy the policy and redeem the gift. The system can charge a percentage of the gift amount or some other amount in exchange for amending the policy to match the transaction. The system can notify the giver of the gift that the policy was almost met, and request authorization from the gift giver to modify the policy so that the transaction satisfies the policy. The request to the gift giver can provide an indication of which part of the policy would be modified, to what it would be modified, or details about the original transaction.

This approach can assist a recipient who may be struggling to remember the exact conditions or terms of the policy for the gift, but can also remind the recipient that the gift exists. Merchants or the gift processing system can analyze such instances of "almost" satisfying the gift policy as analytics data to determine customer trends or preferences. Then, based on the analytics data, the merchants can either modify default gift giving settings, suggest improved policy conditions for future gifts, rearrange a cost or incentive structure to drive givers and recipients to more profitable types of gifts and policies, and so forth. While an analytics engine may gather a large number of such "almost" redemptions of gifts under their corresponding policies, the system can provide notifications to the gift giver and/or recipient only for those transactions that are within a threshold difference from satisfying the policy, which threshold can be set by the gift giver, the recipient, or the system.

In a related variation, a recipient can ask the merchant to run a 'test transaction' prior to the actual transaction to determine whether the transaction would satisfy the policy. The result from such a test transaction can be a binary "yes" or "no," or can provide additional details regarding why the policy would not be satisfied, or what must change in the test transaction to satisfy the policy.

Coupons and Daily Deals

The system can also apply policies to promotions such as coupons or daily deals. In terms of a coupon or daily deal, the person purchasing the coupon or daily deal is typically also the recipient of the coupon or daily deal. Accordingly, this section refers to a purchaser, but can be substituted for a gift giver and recipient in the appropriate places. When a purchaser purchases a group-based daily deal, such as a promotion from Groupon™, the system can associate a policy with the purchaser payment account, so that when the purchaser makes a qualifying purchase according to the policy, the system automatically applies the corresponding discount or promotion. The purchaser can register his or her purchaser payment account with a coupon or daily deal website, and register for or purchase "deals." These deals are embodied as policies for monitoring transactions made using the purchaser payment account. The purchaser can, via a website or app through which the purchaser is enrolled and logged in, purchase or request a coupon or daily deal policy with one-click. In one variation, the user can enroll multiple purchaser payment accounts with the provider of the coupon or daily deal policy. The system can monitor purchases using any of the multiple purchaser payment accounts, and as soon as a qualify transaction is detected in one of the accounts, the policy is satisfied and deactivated for all the other accounts. One policy can apply to a group of users, such as a group who all purchased a group-based daily deal, or the system can create individual policies for each individual in the group.

Tagging

In one embodiment, the system can tag or annotate transactions. For example, the system can receive an indication that a person made a purchase using an existing payment account of the person to yield a transaction record.

The system can annotate the transaction record to yield an annotation associated with the transaction record. A payment transacting entity can perform the annotating, such as a credit card processor, a merchant, or a bank. Annotations can be created based on an instruction from one of a merchant associated with the purchase, the recipient, or the gift giver. Annotations can be based on an aggregation of tags from multiple users. Annotations can be created based on tags from the gift giver and/or the recipient. The aggregation of tags can be generated by multiple users providing tags associated with a merchant related to the purchase. For example, user can tag the transaction in a personal financial management application, or can create social media posts associated with, mentioning, or featuring the gift, and the system can extract or determine tags for the gift or purchase.

The system can implement a policy, based at least in part on the annotation, that governs at least how an amount of money from a gift giver to the person is to be applied to the payment account as a result of the purchase. The system can implement the policy by revising the policy as instructed by the annotation. The system can implement the policy, for example, by adding a second amount of money from a merchant associated with the purchase to the payment account, or by providing an offer to one of the person or the gift giver from a merchant associated with the purchase.

Simplified User Interface

Figure 35A:
FIG. 35A illustrates a first stage of an example user interface for giving a gift credit.
Figure 35B:
FIG. 35B illustrates a second stage of an example user interface for giving a gift credit.
Figure 35C:
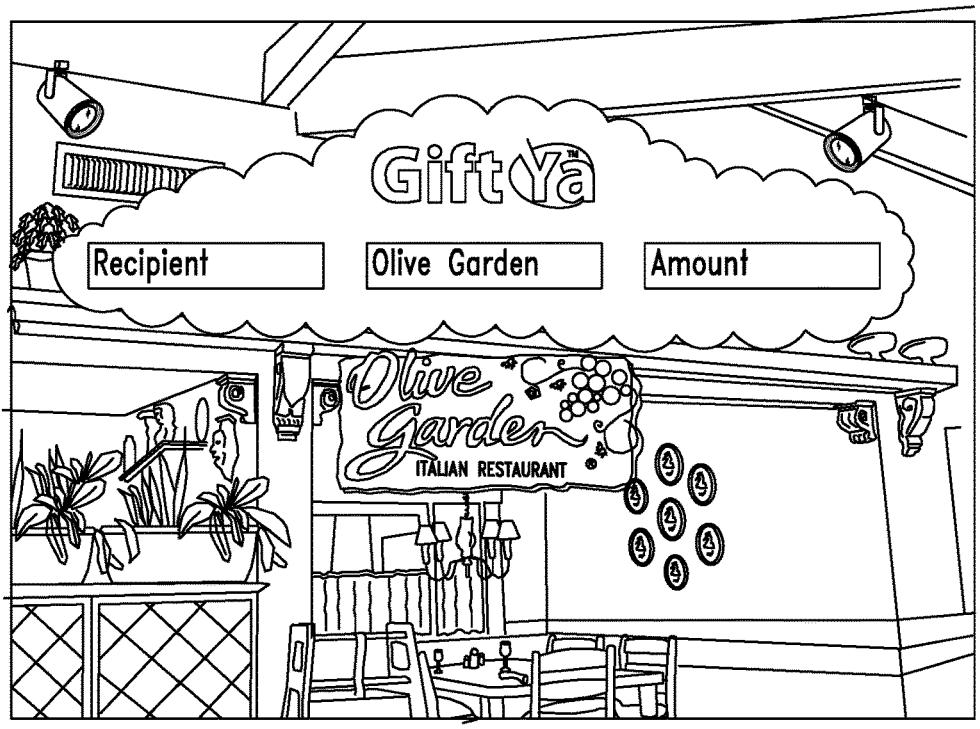
FIG. 35C illustrates a third stage of an example user interface for giving a gift credit.

In one embodiment, a gift portal provides a simplified user interface for giving a gift that adapts as the gift giver enters additional information. FIG. 35A illustrates an example user interface 3500 at an initial stage with blank fields for entering a recipient's name 3502, a merchant 3504, and an amount 3506. While this example is discussed in terms of a merchant and an amount, the merchant can be substituted for a category of good or service, any one of a set of merchants, multiple merchants, and so forth. Similarly, the amount can be substituted with a flexible amount defined by the type of object(s) purchased, for example. The gift giver enters information into these fields or selects from existing options to populate the fields. In this example, FIG. 35B shows that the gift giver entered "Olive Garden" into the merchant field 3504. As the user enters one or more of the fields, the system can automatically adapt the giving interface 3500 accordingly. FIG. 35C shows how the background 3508 of the user interface 3500 is adapted to match the user-entered information. This provides a customization and an instant feel of familiarity for the gift giver. Merchants can provide the data, images, audio, video, or other data to update or augment the user interface associated with their name, or the system can harvest such data from a search engine or from the merchant's website, for example. The system can provide multiple different levels of customization that fade in as the system is more and more certain of the merchant. For example, the system can fade the background image 3508 in more with each key press that increases a certainty or confidence that "Olive Garden" is the user's intended merchant.

Figure 35D:
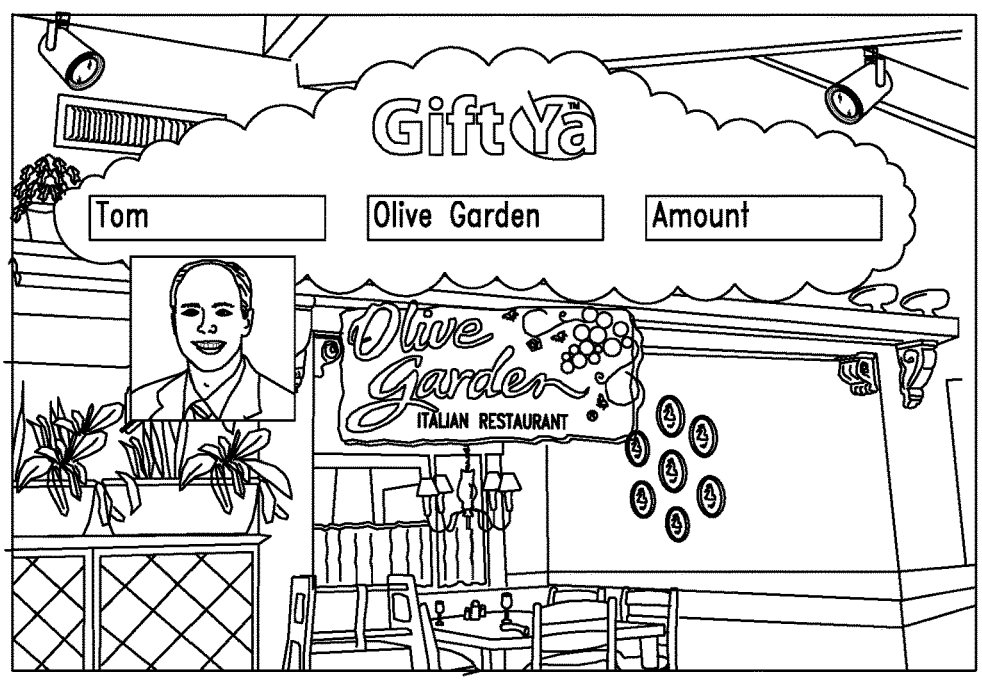
FIG. 35D illustrates a fourth stage of an example user interface for giving a gift credit.

In another example shown in FIG. 35D, as the gift giver enters a recipient name "Tom" in field 3502, the system can poll the giver's contacts on a social network or in an address book, for example. When the system finds a match, the system can display an image 35010 of the recipient. If the system identifies multiple candidate recipients, such as multiple contacts with the name "Tom," the system can display an image for each, and the user can simply click on the desired recipient. The system can also update the user interface based on synergies between the various fields 3502, 3504, 3506. For example, if the gift giver enters "Tom" and "Olive Garden," the system can automatically retrieve or deduce what Tom's favorite dish is at Olive Garden, and display an image or a description of that dish and suggest a gift amount that covers the cost of that dish, plus a beverage and a tip. The system can account for regional price differences so that the price is adjusted to reflect Olive Garden prices near Tom, or prices for Olive Gardens that Tom regularly visits.

One-Click Gift Offering

In another embodiment, a method of extending a gift offering including at least one product from a gift giver to a recipient for selection by the recipient using one-click purchasing at an on-line shopping environment is disclosed. The recipient can purchase the selected product using one-click on a merchant web site or via a mobile app, for example. The recipient can enable one-click actions in advance so that a one-click or equivalent action completes a purchase via her payment account and a server can transfer money from a giver payment account to a receiver payment account to reimburse at least a portion of the cost of the gift. The system 100 can use address delivery information stored in the recipient's account to deliver the product. The address delivery information can include physical addresses or electronic addresses, and can further include delivery preferences, such as delivering digital content to a particular email address, or delivering office supplies to a 'work' address. In one aspect, the gift giver can purchase the selected product using his payment account and the system can use address delivery information stored in the giver's account for delivery to the recipient.

FIG. 36 illustrates a method embodiment of a one-click gift offering utilizing a recipient payment and delivery account. A system 100 receives from a gift giver having a giver payment account, identification of a recipient and identification of a product associated with the recipient (3602). The product can be a gift associated with the recipient, either a tangible object such as a book, an intangible service such as a magazine subscription, or an electronic object such as a digital media download or streaming a video. The system 100 transmits to a recipient device such as a smartphone or other mobile device an offering including the product for selection by the recipient (3604). Prior to the transmission, the offering is associated with a recipient payment and delivery account that includes a recipient payment account and address delivery information for the recipient. Upon receiving a selection from the recipient of a selected product in the offering, the system 100 processes purchase and delivery of the selected product using the recipient payment and delivery account (3606). The system transfers money from the giver payment account to the recipient payment account to reimburse at least a portion of a cost of the selected product (3608). In alternate variations, the system can transfer money from the giver payment account to a holding account, and from the holding account to the recipient payment account or to the merchant directly. The system can transfer money between accounts upon detecting initiation of the purchase transaction. A direct payment from the giver account could occur as well by intercepting the transaction when the recipient makes the purchase.

Figure 37:
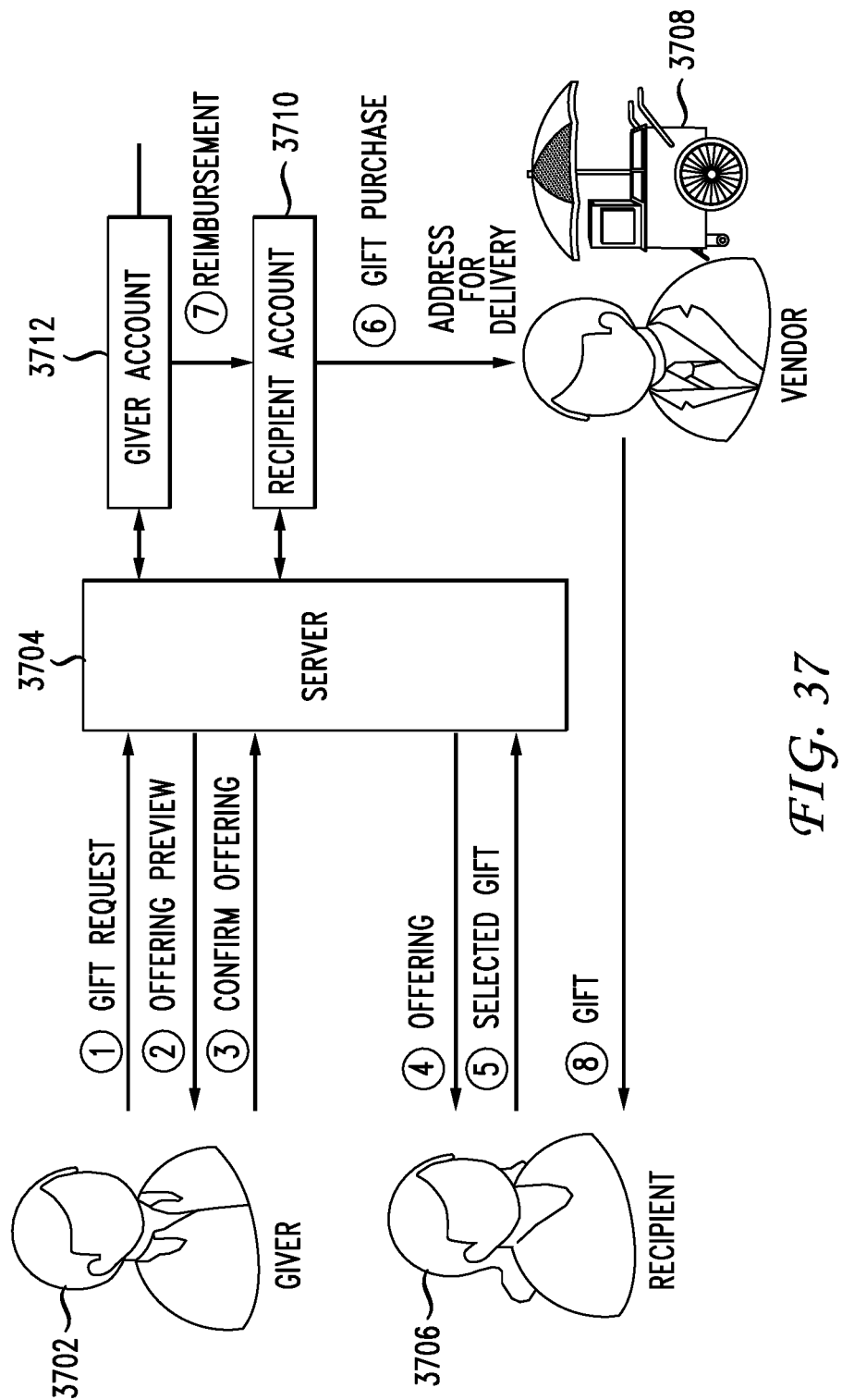
FIG. 37 illustrates a system embodiment of a one-click gift credit offering utilizing a recipient payment and delivery account.

FIG. 37 illustrates a system embodiment of a one-click gift offering utilizing a recipient payment and delivery account. A gift giver 3702 desiring to give a gift electronically using a one-click gift offering, can submit a gift request to a server 3704 at an on-line shopping environment. The server can process the gift request and generate an offering preview that includes at least one product for confirmation by the gift giver. The gift giver can confirm or modify the offering generated by the server before returning a confirmed offering to the server. The server can extend the confirmed offering to the recipient 3706 for selection of a gift within the offering. Once the recipient selects a gift, the system completes the purchase of the gift via a vendor 3708 using the recipient's payment and delivery account 3710. The system transfers at least a portion of the cost of the gift from the giver's payment and delivery account 3712 to the recipient's payment and delivery account to reimburse the recipient for the purchase of the gift. Lastly, the system arranges for delivery of the gift from the vendor to the recipient based on delivery address information stored in the recipient's account. Alternatively, the system can transfer at least a portion of the cost of the gift from the giver's payment and delivery account directly to the on-line shopping environment and/or to the vendor.

Figure 38:
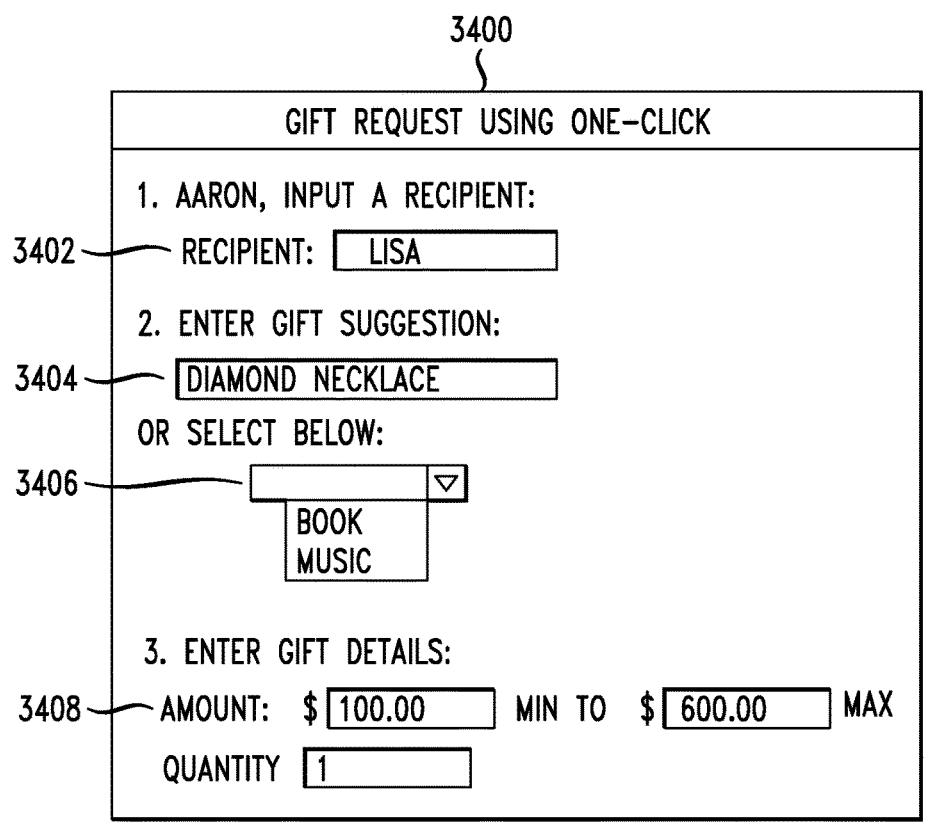
FIG. 38 illustrates an example gift credit request using a one-click gift offering utilizing a recipient payment and delivery account.

FIG. 38 illustrates an example gift request using a one-click gift offering utilizing a recipient payment and delivery account. The gift giver 3302 can submit a gift request 3800 to the server 3304 to send a gift credit to a recipient using a one-click gift offering. The gift request can include a field for a recipient 3802 that is associated with the gift giver. A recipient 3306 can be associated with a gift giver 3302 when information related to the recipient is stored in the giver's payment and delivery account 3312. For example, the giver can store address delivery information for the recipient in addition to other information such as preferences and dates of important events related to the recipient including birthday, anniversary, graduation dates, or dates of other important life events or holidays that the recipient is likely to observe or has observed in the past. Data from a social network can be linked to the giver's payment and delivery account manually or automatically, and can be based on the relationship in the social network. The gift giver can input a gift suggestion 3804 for example, a diamond necklace or the gift giver can select from a drop-down menu of gift suggestions 3806 for the recipient. Gift suggestions can include products such as recently released books and music or a service such as a magazine subscription. In some variations, as the recipient is browsing items to purchase online using the gift, an on-line shopping environment can display the gift suggestions to the user in an attempt to influence the recipient toward purchasing a suggested gift item. Alternately, the server can suggest one or more gifts for a specific recipient based on information stored in the recipient's account such as a wish list, preferences, browsing history and past gift information such as received gifts. The gift request 3800 can include gift amounts such as a minimum and maximum amount of money 3808 the gift giver is willing to spend on a gift for the recipient. Optionally, the gift request can include additional information such as quantity, greeting, manufacturer, color, availability, shipping cost, delivery date, number of products to include in the preview, etc. A message such as a birthday greeting, anniversary, holiday or congratulatory note can be included in the request as well as an amount allotted for shipping cost and a desired delivery date for the gift. For example, if a giver Aaron desires to gift his wife (the recipient) a diamond necklace for their upcoming anniversary using a one-click gift offering, he would input the desired gift, a diamond necklace, in the gift request 3804. Aaron would enter the amount of money he is willing to spend on the diamond necklace in the request, for example a minimum of $100 and a maximum of $600. Optionally, he can input an anniversary greeting and a delivery date for the diamond necklace so it arrives on or before their anniversary.

FIG. 39 illustrates an exemplary gift offering preview 3900 using a one-click gift offering utilizing a recipient payment and delivery account. The server 3304 receives a gift request 3800 from the gift giver 3302 and can automatically generate the offering preview 3900 based on the information provided by the gift giver 3302 in the gift request 3800. The offering preview can include products that meet the requirements set forth in the gift request such as description, price range, color, manufacturer, delivery date, cost, etc. For example, the giver Aaron requested one diamond necklace as a gift within the price range of $100-$600. The offering preview returned by the server includes up to ten results of suggested diamond necklaces that meet the requirements specified in the gift request. The giver Aaron can select desired diamond necklaces to include in the offering to the recipient Lisa from the offering preview supplied to him by the server. For example, Aaron can select items one, two, and four from the offering preview. Aaron can also select additional items not included in the offering preview. Additionally, the offering preview can suggest related products in addition to the requested product such as a diamond bracelet and diamond earrings 3902. Providing the gift giver with related products in the offering preview can help the gift giver give the best gift possible by gifting the recipient coordinating gifts, for example, such as matching clothes or electronics and compatible accessories. For example, if Aaron does not like any of the diamond necklaces in the offering preview, he can deselect all of the necklaces and choose instead to receive an offering preview of diamond bracelets. Alternately, Aaron can decide that offering a diamond bracelet in addition to a diamond necklace would be an especially thoughtful gift. In one aspect, the gift giver can manually select diamond necklaces for the offering preview after performing a search within an on-line shopping environment such as Amazon.com for necklaces that he thinks his wife would like and that meet his gift requirements. Additionally, the offering preview can include products both selected automatically by the server and manually by the gift giver. The system can recommend to Aaron items to include as suggested items for Lisa, based on what Aaron's social network contacts have selected in similar situations, or based on what other users with similar demographics and a similar gift situation have selected.

Figure 40:
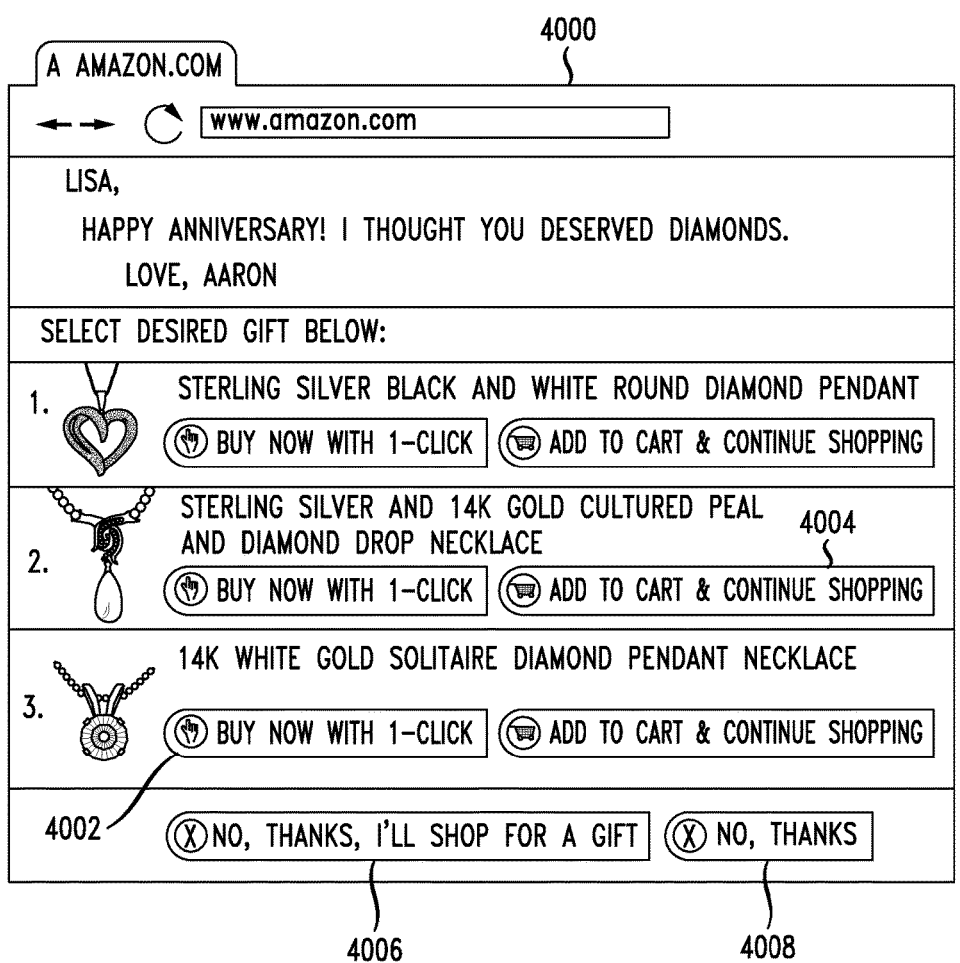
FIG. 40 illustrates an exemplary offering from a gift giver to a recipient.

FIG. 40 illustrates an exemplary offering from a gift giver to a recipient. The offering includes products approved by the gift giver, in this case the gift giver 3302 narrowed down gift options to three diamond necklaces. The recipient, Lisa, can receive the offer electronically for example through her email and with one-click she can purchase 4002 the diamond necklace she desires from the offering, such as clicking a link included as part of an HTML formatted email message or by replying to a specially formed email address indicating which of the three diamond necklaces she wishes to purchase. The email message can include an image, short description, audio, a video, other multimedia, or links to other multimedia resources describing the suggested items so that the recipient, Lisa, can have sufficient information upon which to base a purchase decision. In this way, Lisa can instantly purchase one of the suggested items with a single step. This approach reduces friction to redeeming a gift, but can still allow the recipient, Lisa, to browse beyond the suggested items if she so desires. The system 100 automatically transfers at least a portion of the cost of the gift from the giver's payment and delivery account to the recipient's payment and delivery account to cover the cost of the gift. Optionally, the recipient can choose to add one of the necklaces as her gift to her on-line shopping cart and continue shopping 4004 for other items at Amazon.com. When the recipient checks out from the on-line store, the system automatically transfers at least a portion of the cost of the gift from the giver's payment and delivery account to the recipient's payment and delivery account. Should the recipient be unsatisfied with the offering she can opt to not accept the offering and instead use the money allotted for a diamond necklace to purchase a gift of her choice at Amazon.com 4006 or reject the offering all together 4008. The recipient can decline the offering and the system can display a default gift suggestion webpage at the on-line shopping environment that includes a variety of typical gift ideas or a specific gift suggestion webpage based on the recipient's preferences, wish list, browsing history, received gifts, etc. Alternately, the recipient can decline the offering and the system can back out of the offering as if the recipient hit the "back" button on a browser and display more products related to the gift specified by the gift giver. For example, from the offering 4000, when the recipient selects "No thanks, I'll shop for a gift" 4006 the system displays a webpage having more options for diamond necklaces. The recipient can continue to browse for a desired gift from this webpage. From this point, the recipient can browse products in the on-line shopping environment and select her gift.

Additionally, should the recipient decline the offering and instead choose her own gift by browsing, she can select a gift that is either more or less than the amount of money the gift giver specified. For example, the recipient can select a gift that is significantly less than the amount of money the gift giver had allocated and the system can store the leftover funds in the recipient's payment and delivery account to apply to a future purchase at the on-line shopping environment. While the gift was intended for a diamond necklace, after the initial purchase of a diamond necklace satisfies that gift policy, the remainder amount can be freed from the gift policy to be applied to other, future purchases without restrictions or limitations or with reduced or relaxed restrictions or limitations. The recipient can select a gift that is more than the amount of money the gift giver allocated for the gift and the system can deduct the remaining cost of the product from the recipient's payment and delivery account after the giver's payment is applied. Any combination of the ideas set forth is possible and should not be limiting in any way.

In another embodiment, a one-click gift offering utilizing a giver payment and delivery account without the use of a recipient payment and delivery account is discussed. This embodiment differs from the one-click gift offering utilizing a recipient payment and delivery account discussed above in that the recipient does not purchase the gift using her payment and delivery account and receive reimbursement from the giver payment and delivery account, but rather the gift is purchased directly from the giver's account and delivery information for the recipient is stored in the giver's account. As an example of this arrangement using the above-discussed parties, Aaron provides a gift to Lisa of a diamond necklace. Lisa can browse diamond necklaces using her account, and when she makes a purchase of a diamond necklace, the on-line shopping environment does not charge her account and instead charges Aaron's account. The system continues to arrange for delivery to Lisa according to her account information. If any additional funds are needed beyond the gift, Lisa's account can be charged for those additional funds.

Figure 41:
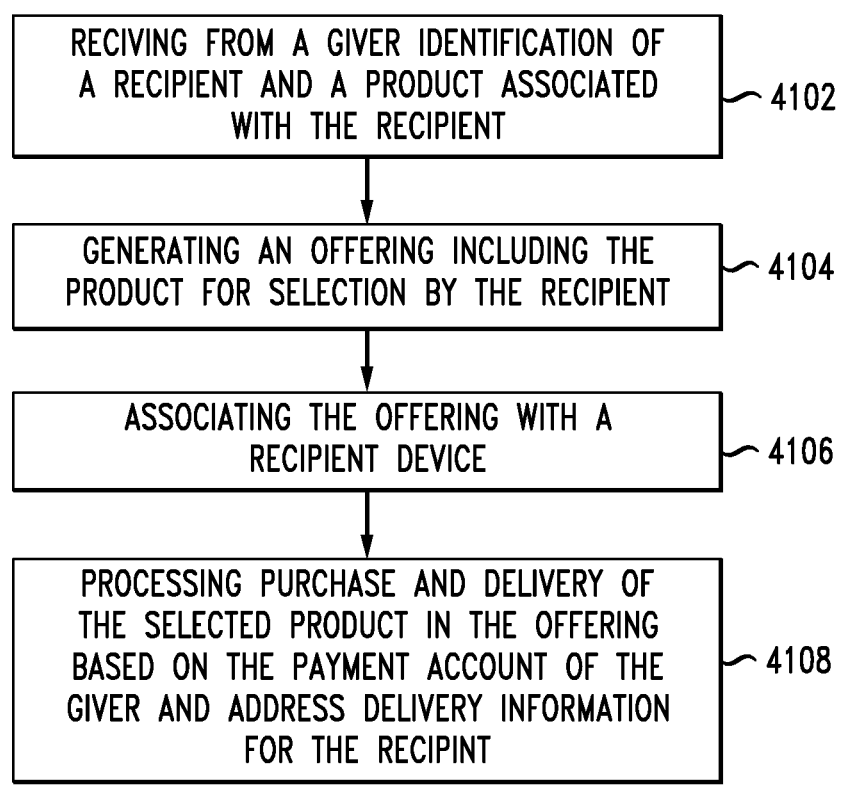
FIG. 41 illustrates a method embodiment of a one-click gift credit offering utilizing a giver payment and delivery account.

FIG. 41 illustrates a method embodiment of a one-click gift offering utilizing a giver payment and delivery account. A system 100 receives from a giver identification of a recipient and identification of a product associated with the recipient (4102). The product can be a gift associated with the recipient, either a tangible object such as a book or an intangible service such as a magazine subscription or streaming, downloading, or granting permissions to view digital content. The system generates an offering including at least one product for selection by the recipient (4104). Prior to generating an offering, the offering is associated with a giver payment and delivery account that includes a payment account of the gift giver and address delivery information for the recipient. The system associates the offering with a recipient device (4106) or with multiple recipient devices. Some example recipient devices include a smartphone or other mobile device. Then, upon receiving a selection from the recipient of a selected product in the offering via the recipient device, the system processes purchase and delivery of the selected product based on the payment account of the gift giver and address delivery information included in the giver payment and delivery account for the recipient (4108).

Figure 42:
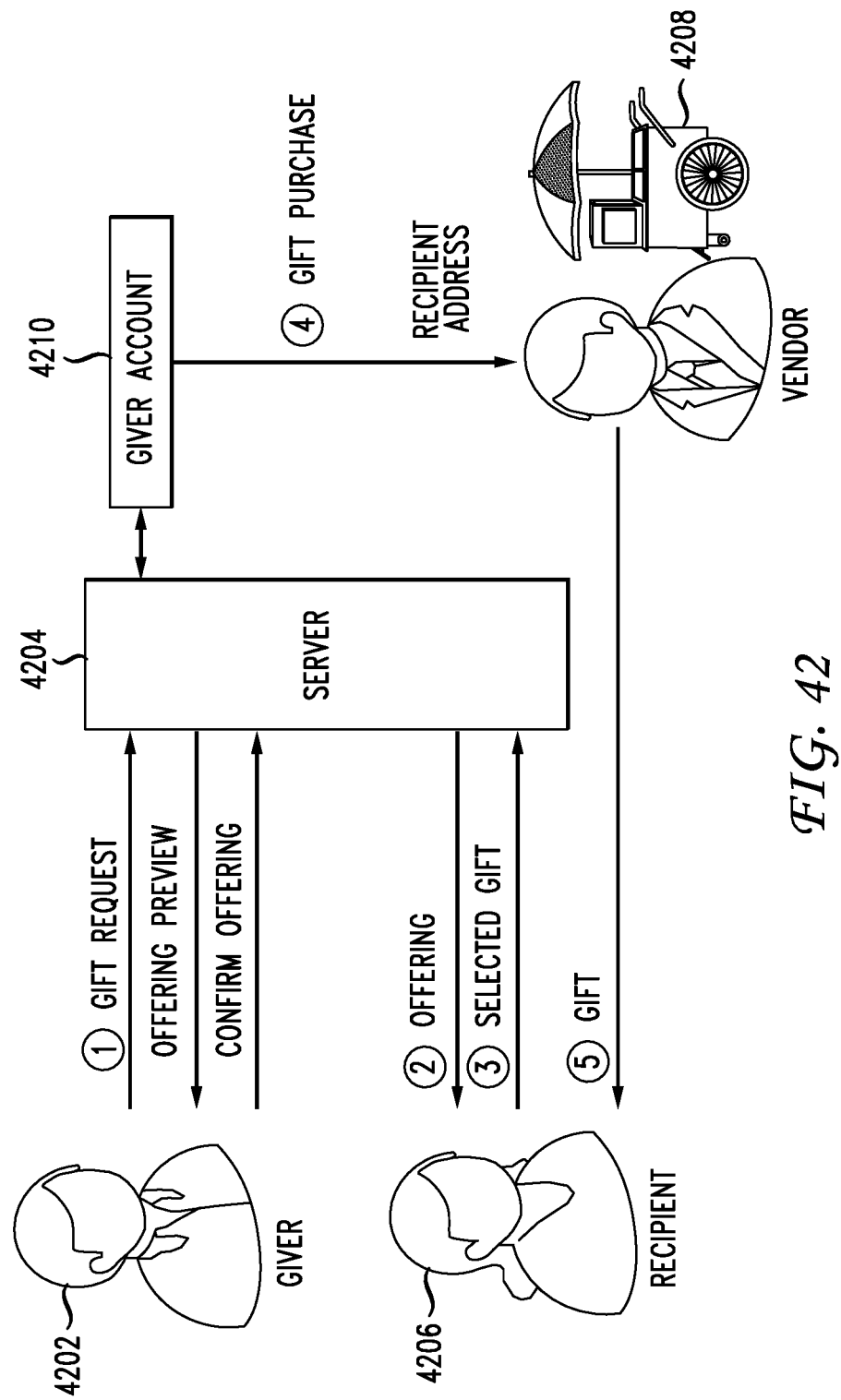
FIG. 42 illustrates a system embodiment of a one-click gift credit offering utilizing a giver payment and delivery account.

FIG. 42 illustrates a system embodiment of a one-click gift offering utilizing a giver payment and delivery account. A gift giver 4202 desiring to give a gift electronically using a one-click gift offering, can submit a gift request to a server 4204 at an on-line shopping environment. The server 4204 can process the gift request and generate an offering preview that includes at least one product for confirmation by the gift giver 4202. The gift giver 4202 can confirm or modify the offering preview generated by the server 4204 before returning a confirmed offering to the server 4204. The server 4204 can extend the confirmed offering to the recipient 4206 for selection of a gift within the offering. Once the recipient 4206 selects a gift, the system completes the purchase of the gift via a vendor 4208 using the giver's payment and delivery account 4210. Lastly, the system arranges for delivery of the gift from the vendor 3308 to the recipient 3306 based on delivery address information stored in the giver's account. For example, a giver 4202 Aaron desires to give a gift to his wife (the recipient 4206 Lisa) for their anniversary. Aaron can complete a gift request 3800 requesting a diamond necklace as a gift within the price range of $100-$600 and can submit it to the server 4204. The server 4204 can generate an offering preview 3900 including suggested diamond necklaces for Aaron 3902 to confirm. Aaron can accept or modify the offering preview 3900 before sending a confirmed offering to the server 4204. At this point, the server 4204 sends the offering 4000 to the recipient, Lisa 4206 for selection of a gift. The recipient 4206 can accept one of the offered gifts using one-click purchasing 4002 utilizing the giver's payment and delivery account, she can decline the offering 4008 or she can decline the offering and instead shop for a gift 4006 through the on-line shopping environment utilizing the giver's payment and delivery account. After the recipient selects her gift using one-click purchasing, the system utilizes the giver's payment and delivery account 4210 to purchase the gift from the vendor 4208. The system uses address delivery information for the recipient stored in the giver payment and delivery account. In addition to payment information and address delivery information for the recipient stored in the giver's payment and delivery account, other information such as email address, preferences, recipient wish list, recipient browsing history, etc. can be stored in the giver's payment and delivery account. Optionally, information related to potential recipients can be stored in the giver's payment and delivery account based on association through a social network. Information related to the recipient can be automatically transferred or manually added by the gift giver.

The concept of giving a gift using a one-click gift offering utilizing a recipient payment and delivery account or a giver payment and delivery account can be applied to multiple givers desiring to pool their resources to give one or more gifts to a recipient. In the first case, utilizing a recipient payment and delivery account, instead of the system 100 transferring money from one giver payment and delivery account to the recipient's account as reimbursement for the cost of the gift, the cost of the gift can be divided between multiple givers based on pledged amounts. The group can decide to divide the cost of a potential gift evenly among all of the members, or each member can pledge a certain amount of money or maximum amount of money toward the group gift. The system can transfer money from each of the group member's payment and delivery accounts to the recipient's payment and delivery account to cover the cost of the group gift. For example, if Ryan, Gary and Steve desire to give a group gift to Tom for his upcoming 50th birthday, they can decide to split the cost of his gift evenly up to $50 each. If Tom selects a gift from his offering that costs $120, each group member pays $40 toward the group gift. The system charges Tom's payment and delivery account and the system can automatically transfer $40 from each group member's payment and delivery account to Tom's payment and delivery account to cover the cost of the group gift.

Alternately, a group can give a gift using a one-click gift offering utilizing a giver payment and delivery account. A group can designate one group member as the "group giver" that initially purchases a gift for a recipient using the one-click gift offering. After the recipient selects his desired gift from an offering 4000, the system 100 completes the purchase using the payment and delivery account of the "group giver". The account of the "group giver" can store information related to the recipient such as email address, mailing address, preferences, browsing history, wish list, received gifts, etc. Then the system can transfer money from each of the group member's payment and delivery accounts to the "group giver" payment and delivery account to cover the cost of the group gift. For example, a group consisting of Ryan, Gary and Steve wishes to give a gift to Tom for his upcoming 50th birthday. The system designates Ryan as the "group giver" that will initially pay for the selected gift. After Tom selects a toaster using the one-click offering delivered to his smartphone, the system purchases the toaster using Ryan's payment and delivery account. Then the system transfers money from each of Gary's and Steve's payment and delivery accounts to reimburse Ryan for their portion of the cost of the gift to Tom. Utilizing group giving in the context of one-click gift offering utilizing a giver or recipient payment and delivery account allows for a group of friends to effortlessly and seamlessly give a group gift to a recipient.

Merchant Portal

Figure 43:
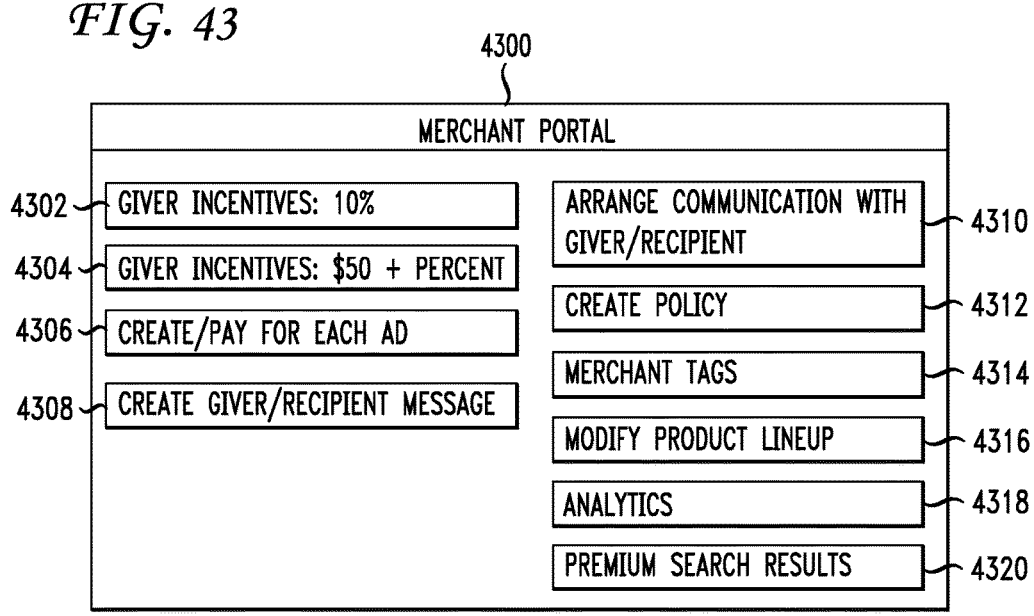
FIG. 43 illustrates an example user interface for a merchant portal.

FIG. 43 illustrates another embodiment of this disclosure that relates to a merchant portal for enabling a merchant to manage and enhance the purchasing experience at their store when a policy applies to any purchaser's activity. Every merchant in this system can have their own portal 4300 to manage how offers are processed to at least some degree. For example, Joe's Pizza may be a single shop owned by Joe in Dunkirk, Md. The system can provide a portal in which Joe can go in and affect the policies that are established when a giver gives a gift credit to a recipient. For example, Joe may want to reward the gift giver for choosing his store as a merchant. One such exemplary scenario for providing rewards is to map certain user behaviors to earning extra points in a loyalty or rewards system that are redeemable for discounts on gas, grocery, or other purchases. Joe can go in and for a period of time, or indefinitely, establish an offer for givers of a 44% reward of any gift credit amount given 4302. So if the giver selects Joe's for a $50 gift credit for a recipient, one policy is established to monitor the recipient's purchases. Another policy can automatically be established to monitor the giver's purchases such that when the giver goes to Joe's to eat, the giver gets a gift credit of $5 4304. Thus a second policy is established or triggered in which the merchant is the gift giver and the original giver is the recipient. After the gift giver purchases something at Joe's, and the transaction is processed, $5 will be transferred from Joe's payment account to the giver's payment account in the same fashion as disclosed herein.

Joe's could also enhance the original recipient's gift credit by adding a percentage to it or adding a free dessert, or any other kind of modification to the original gift credit. All of the regifting and monitoring principles apply here too. For example, if Joe offers the original giver 44% on his or her own gift credit, the original giver can regift that and add it to the original gift credit for the original recipient, thus generating a $55 gift credit for the original recipient.

The merchant portal can also enable the merchant to provide advertisements when their name is selected by a gift giver such that the gift giver is incentivized to select them for the gift credit 4306. Fees can be charged to the Merchant for placement in a particular position in the listing of merchants, size of the name, and presentation. The merchant can upload or link to a YouTube video. The merchant portal enables merchants to interact at a very unique circumstance on the network, which is when a gift giver has chosen them to give a gift to someone else. The system will provide any number of mechanisms for merchants to interact with the givers to enhance their experience in selecting the merchant for the gift credit. The merchant may simply want a "thank you!" message, or a multimedia message presented to the gift giver 4308. Offers, such as encouraging the gift giver to limit the time frame of the gift credit to a certain weekday, can be presented. The merchant may always have slow Wednesdays. The gift giver or recipient can receive an extra amount on a gift credit if the original gift credit is limited to Wednesdays.

The merchant portal can allow the merchant to tailor offers to specific categories of customers. For example, the merchant portal can tie in to customer loyalty data to determine which users are frequent customers that do not need incentivizing to return to Joe's Pizza, and can refrain from offering significant (and probably unnecessary) discounts to those customers, or can conversely offer 'loyalty' discounts to those users. Further, the merchant portal can present customer analytics data to the merchant, showing which customers are trending down in visits to Joe's Pizza or are trending down in overall money spent, for example. Then, Joe can offer additional incentives to nurture these customers back to frequent patronage, or can reach out to them with targeted individualized offers having a custom message like "Hey Mark, we missed you last Wednesday at lunch. Here's a coupon for $3 off next Wednesday between 11:30 am and 2:00 pm." The merchant portal can provide merchants with the ability to target specific customers with promotions or to target categories of customers.

The merchant portal can also enable a merchant to manage their coupons for purchasers of coupon books. For example, the merchant can determine how many coupons are left to be redeemed and receive business intelligence about the individuals who still have not come to the store. The merchant could add incentives like an offering of an additional 44% discount if the High School team wins the football game. Then the merchant, if the team wins the game, could click on a field in the merchant portal to apply that additional discount to all the coupon holders. Thus, the merchant portal can apply both to gift credits and to the coupon books disclosed herein.

Thus, the merchant portal enables a merchant to essentially effect and enhance any aspect of a policy associated with purchases at their store. For example, not only can they add gift credit options to the gift credit or other promotional offers to the giver and/or the recipient, merchants could even create their own Groupon using this approach, targeted to specific subsets of customers or to all customers. For example, a merchant may decide that if 20 users each give at least a $30 gift credit to their store, that each of the givers and/or recipients will receive a promotional offer such as an additional $3 on the gift credit or a $3 gift credit to the giver and so forth. The policy also does not have to be related to purchasing transactions. For example, the owner of a pizza parlor near a stadium may give an extra bonus to everybody that has gift credits if the Washington Redskins win their game on a certain night and those having gift credits come in. Any type of triggering event that could be entered into the system could be effected by the merchant portal. Holidays, individual birthdays of users, manually entered data, and so forth can trigger changes in the policy for one or more of the people involved in a gift credit.

A service could be associated with the merchant portal in which general business intelligence is provided, such as a likely demographic, such as ages 20-30, who will use their coupons on a Friday night. With that data, the merchant could couple such information with a promotional offering to a subgroup of those current coupon holders for that merchant. To therefore provide a targeted promotional offering, the system could charge the merchant a small fee, or not, to enable the merchant to send out promotional offerings to those holding coupons (or gift credits) for that merchant that are ages 20-30, for use on a Friday night, for an additional discount or other promotion. In this manner, an enhanced level of business analytics and intelligence aid to encourage the right demographic to use their coupons or gift credits at a likely time when they would anyway. Such a promotion can also be used to encourage their off-times usage to increase business at times when the demographic is not likely to patronize the merchant. Merchants can be identified as part of the policy governing the transactions via a network merchant category or a network merchant ID, or by any other means.

Indeed, yet another additional feature given this approach is the ability of merchants to provide their own offers even independent of a gift giver selecting the merchant as part of a gift credit to a recipient. For example, given that individual user's payment account information is already stored in the systems database, the owner of a pizza parlor may simply go to their portal and create their own policy such as providing or generating their own group coupon. In this case, they could simply enter data that if 440 people registered with the system come to dinner on a particular night, each person will receive a 44% off rebate. Alternatively, if 440 people registered with the system order Lobster for dinner, each person ordering Lobster that evening will receive a 25% discount off that dish. In that case, users of the system may receive emails or some type of notification of this group discount and, without needing to pre-purchase the offer, and with or without any need to accept or respond to the communication, the users may simply go and have dinner, they may or not know then whether they will receive the discount. However, if throughout the night, 440 of the users do go to dinner, then the policy can kick in and each of those 440 people can receive a 44% discount. In this regard, this can provide an improvement over the Groupon concept because users do not have to pre-purchase the Groupon prior to it becoming effective. It is a more dynamic approach where users may simply choose to go to that restaurant with the chance of the policy being fulfilled based on their purchase as well as other people's purchase such that they may receive the benefit of the group discount.

Accordingly, the merchant portal provides numerous mechanisms of merchants being able to implement or effect policies associated with gift credits, group purchases, or any kind of purchase at their establishment that can be effected by a trigger or any type of event. One benefit of this approach is that it does not require any complicated or staffing matter inasmuch as the merchant portal can provide all of the various options for triggering discounts to users who have their payment account information registered. The actual process of handling a transaction at the point of sale does not change, so no additional employee training or equipment is needed.

If the payment account is provided through a mobile device such as via Google wallet, then further information can be provided to the user given their location or data that they are about to use their Google wallet to make a purchase. For example, if a merchant has a 44% discount if 440 registered users of the system go to dinner that night, then if one of the users that has not yet gone to dinner that night happens to drive near the restaurant, an advertisement can be sent that says only 15 more registered users need to eat at the pizza parlor for the discount to apply. This may encourage one of the users to go to the restaurant and eat in the hopes that 14 others will also follow to trigger the group coupon according to the policy. If a user is using a mobile device to make a purchase at the restaurant and suppose that they are the 440th registered user to make a purchase, perhaps the policy could be to provide them with an extra discount because it is their purchase that has caused the group coupon to be implemented. This can be a form of a contest or game to determine which customer will 'win' the extra discount, which can be a complete discount, i.e. free dinner. While the example herein is 440 users to purchase at the restaurant, the promotion can be much smaller or larger, and can span a short, long, or indefinite amount of time. Thus, their mobile device may receive an extra notice or music or some other multimedia presentation that identifies them as the one who caused the group discount to be implemented for the previous 439 consumers that day.

As can be appreciated, the flexibility that is provided by such a merchant portal is wide ranging and can be any combination of purchasing and/or non-purchasing related events. Personal profile data can also be used when implementing these policies. Again, if it is a particular purchaser's birthday, that data can be implemented into the policy and can be a triggering event to add a free desert or some other offering for coming to the store on that day. In this regard, the merchant portal may enable the merchant to simply say that anybody that comes in on their birthday receives a $3 discount. Therefore, such a policy can easily be implemented by the disclosed system herein because such personal information can be obtained and as each registered user makes purchases at the store, the policy can be checked to see if it is their birthday, and if so, multimedia communication can occur if the purchase is on a mobile device, or some other mechanism can be provided for the merchant to be able to communicate birthday wishes to the user and enhance the relationship of that particular user with the merchant. The policy can also be flexible enough to provide that if the purchase is within one week of the user's birthday that it can also be implemented in that case even on a grading scale. For example, the farther away from their birthday, the less the discount is.

Because the system knows both the giver data and the recipient data when a transaction of generating a gift credit is performed, the merchant portal enables a social-networking type of ability to engage with people in a way not previously provided. The social network in this case involves the gift giver, merchant and recipient. Any communication (email, SMS, telephone call, multimedia presentation) can be triggered from one or more of the people in this small social network associated with a gift credit. Facebook pages can be created, Skype video conference calls can be scheduled and held. For example, the system may be able to receive the data that the gift giver is giving the gift credit to the recipient for a $25^{th}$ wedding anniversary gift. The merchant, owner, or manager of the store may wish to congratulate the couple including the gift giver. A Skype three-way video conference call could be automatically scheduled and everyone could then talk about the event before or after 4310. For example, a video conference or other communication can occur between the gift giver and the merchant, wherein the gift giver explains to the merchant specific details, requests, and/or suggestions to enhance the wedding anniversary gift. The merchant can then have an opportunity to develop a relationship with the people by personally thanking them for coming and asking if they had a great time. Thus, the portal in which the gift giver is selecting the merchant and the recipient can present offers for other social networking type of communications with the merchant and/or recipient. This provides a simple opportunity, without much work or cost on the part of the merchant, to greatly enhance the customer experience. The system can automatically flag, for the merchant, customers which are likely to respond positively to such personalized attention, and which are likely to be profitable or loyal customers. Because the merchant knows in advance that a particular type of merchandise or service is to be provided, the merchant can prepare in advance and suggest relevant accessories, add-ons, or enhancements to the gift. For example, if the wedding anniversary gift is a specifically styled ring, the merchant can arrange to offer a discount on a matching tennis bracelet or other accessory. The merchant portal can provide insight into the preferences and predilections of the customers in advance to help the merchant determine what types of 'upgrades' to offer and at what discounts, if any. A specific video presentation can be transmitted to an iPhone to welcome the user as they arrive at the store.

Merchants can also create unique policies. They may want to give an incentive just for having someone come into their store. The policy can be location based or activity based and not simply purchase based 4312. For example, a real-estate agency or a merchant selling time-shares in Fla. may want to reward users who simply come and peruse real-estate listings or listen to a time-share presentation.

In yet another aspect, the group coupon can be offered dynamically. For example, the merchant may be able to set out various parameters on how much the discount should be. The simple example above is that if 440 users come in and purchase dinner tonight, then each one receives a 44% discount. However, a variable component of this might be where each of the first 430 purchasers receives a 44% discount but a gradual scale will occur for the last 44 such that the $440^{th}$ purchaser receives their meal free. In a contest or promotion such as this, the order of customers becomes important. Thus, the system can determine ordering of the 440 purchasers based on arrival time, ordering time, and/or the time of the transaction. Notices can be provided to the users if desired to tell them where they might fall in the variable coupon offerings. Thus, the $431^{st}$ purchaser might receive a 15% discount, the next purchaser may receive a 20% discount and so on. In addition, the policy may be fluid to the extent such that the system can monitor the restaurants or stores overall performance that night. Thus, if the restaurant already has a lot of business that night then the offering may be reduced since additional business is not necessarily needed. Thus, the particular offering and the discount provided for purchasers can be more tied to real time business needs and activities. These promotions can roll over, such that every $440^{th}$ purchase on a Friday night is free, for example.

This provides another distinguishing feature from the Groupon approach inasmuch as Groupon typically provides one offering for an entire community per day. The approach disclosed herein can provide a single merchant based offering in which individual merchants can have simultaneous offerings in the community. The system can referee between various offerings such that users are not inundated. However, the merchant portal approach herein enables individual merchants to easily tailor their own offerings that can further be specifically tied to their actual business performance at any given moment.

The merchant portal principles set forth herein can be applied to gift, coupons, and/or coupon books. A unified merchant portal can allow merchants to manage all policy-based promotions, gifts, and offers in a single destination. The exact functionality and options provided to the merchant for managing gifts, Groupons, coupon books, etc. may vary. The same merchant portal can provide insight into customer analytics, purchasing patterns, and advertising campaigns associated with the policy-based transactions. Thus, a merchant could receive analytical data indicating that it is likely that the demographic of ages 20-30 who have coupons will likely spend them on a Saturday afternoon and evening. The merchant could then provide offerings to that demographic such that the use of those coupons by that demographic will include an additional 5% discount. Thus, the merchant offerings can be tailored to a particular subgroup of all owners of a coupon in the system.

User Interface

Figure 44:
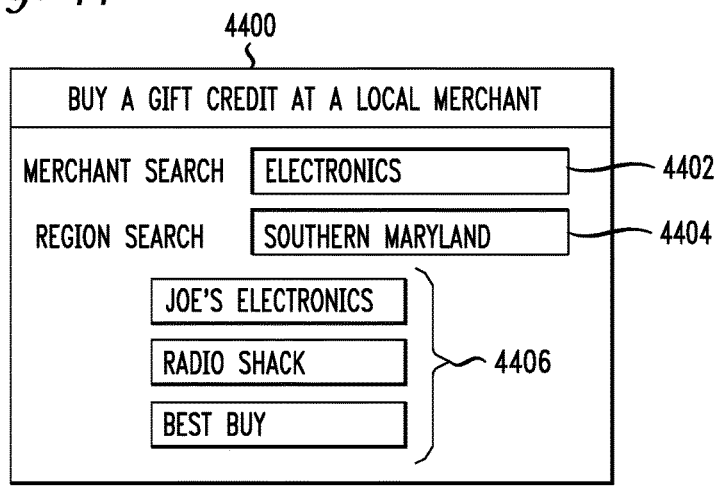
FIG. 44 illustrates a user purchasing portal.

FIG. 44 illustrates another example of user interface for givers to interact with for purchasing gift credits for recipients. The policy can be put in place to apply discounts, coupons, promotions, and/or other purchaser or giver benefits according to tags or categories of merchants. For example, a user can search in a browser 4400 for merchants by product category, such as 'consumer electronics' which may include merchants that specialize in consumer electronics such as Best Buy and RadioShack as well as other merchants that carry a limited selection of consumer electronics such as Target or Home Depot 4402. The system can access a database of merchants, nationwide and local, as well as corresponding merchant tags for specific product categories, target demographics, price range, and so forth. A merchant can be assigned multiple tags. The user can search merchants by tag, but select a specific subset of merchants for which the policy is active.

The system identifies a group of merchants that satisfy the category, then generates a policy for when the recipient makes a purchase at any one of that group of merchants. Merchants can tag their store with tags identifying part of the category 4314. For example, a merchant can log in to an interface 4300 or otherwise update the database to reflect changes or additions to their product line-up 4316. Further, users can add, remove, and update tags assigned to merchants. The tags can vary over time.

In addition to searching by tag or by specific merchant, users can search by region 4404. A user can search for merchants by category or tag in a local region or nationwide. For example, the user can search for and select a gift for any pizza place in downtown Salt Lake City, or can select a gift to any Godfathers Pizza nationwide. In this manner, users can tailor a search in any geographical area such as nationwide, regional, local or even in a neighborhood. The ability for merchants to be able to tag data about their store can enable users to have a localized search but is otherwise not possible. In addition to merchant-generated tags, users can generate and assign tags to specific stores. For example, a user can tag a restaurant as "fast service" or "friendly wait staff". Then other users can search for merchants by user-entered tags to ensure that the policy associated with a gift will be applied to stores having at least a simple majority of 'positive' tags or some other criteria.

The system can provide an interface for merchants 4300 to intercept and 'hijack' gifts or promotions intended for competitors. For example, if a user has a policy in place offering $5 off a purchase of $20 or more at Domino's Pizza, Godfathers Pizza can offer the user an improved offer to entice the user away from Domino's, such as $8 off a purchase of $20 or more. Godfathers Pizza can indicate which types of users or which user characteristics are worth how much. For example, Godfathers may consider a consumer that eats pizza twice a week as more valuable, and can offer that type of user a steeper discount in order to tempt him to try switching from a competitor. In a particularly intense rivalry, a merchant can offer a policy that offers to intercept competitor's promotion or coupon policies and offer to customers promotions that provide a larger discount, for example. In one aspect, 'hijacking' gifts or promotions is an option that is allowed or disallowed by the gift giver and/or by the recipient of a gift. For example, a gift giver may want the recipient to go to a particular store, and so may disallow 'hijacking'. In another example, the recipient of the gift is a starving college student who wants to maximize the return or value for money spent and is not loyal to any particular merchant. This recipient can subscribe to competitors offers to 'hijack' the gift to shop around and see which merchant will offer the steepest discount.

The system can provide an analytics portal 4318 for merchants to view acceptance rate for coupons or promotions associated with a policy, as well as follow through rates of using the coupons or promotions according to the policy. The analytics portal can provide detailed insights into virtually every aspect of customer purchases, types of policies in force, trends in purchases and redemption of policies, advertising, customer preferences, currently ongoing promotion campaigns, and so forth. Merchants can compare their analytics data to anonymized aggregated data from other merchants in similar industries, or even direct competitors.

In the analytics portal 4318, merchants can also manage specific giver and recipient offers for individual users, groups of users, and/or for all users. Merchants can manage and establish payments and guidelines for advertising to users. Merchants can also manage settings for sending automatic or manually triggered 'thank you' messages for users that have taken advantage of a policy. For instance, a store manager for a restaurant can receive a periodic notification of customers who have recently applied a policy to a purchase or other triggering event such as just being in a store. The system can generate automatic suggested 'thank you' messages for these customers, and the manager can customize the suggested messages for the specific customers. Merchants can include media such as video, audio, and images in their 'thank you' messages for branding or other purposes.

A merchant can manage the frequency of sending reminders to users having outstanding policies eligible for that merchant, and optional additional enhancements or promotions to those outstanding policies to encourage users to make purchases at the merchant that trigger the policy.

In one aspect, merchants can, through the merchant portal interface 4300, pay for priority placement in search results 4320. For example, a merchant can pay a premium to appear first in search results for all queries, for a particular query or keyword, for a particular demographic of searchers, for a particular region, at a particular time of day or time of year, and so forth.

FIG. 44 illustrates an example of a listing 4406 of search results. In this listing, Joe's electronics could have paid a premium to appear first for a search in the category of electronics in southern Maryland. The price for prime placement in search results can be based on the number of competitors bidding for placement, how much customers spend on average for the category in which the placement is desired, and so forth. Merchants can pay for placement for a specific duration, for a specific number of searches, or for a specific number of purchased gifts or promotions, for example.

The system can establish a persistent temporary social network involving the merchant before, during, and/or after the purchase. For example, the social network can enable communications, chat, comments, and other social interactions relating to the policy, the giver, the recipient, and/or the merchant. In one example, the merchant can enable a video chat at the point of purchase between the gift giver and the recipient, so that the three can participate in the moment of redeeming the gift enabled by the policy. Video chat on a mobile device can occur as well. Where the triggering event is location based, the system can enable these additional social networking capabilities.

The system can charge fees for providing each piece of these services available through the merchant portal as a package or on an a la carte basis.

Further, merchant portals 4300 can be regionalized. For example, Olive Garden can have a corporate level portal for managing nationwide policies, promotions, and merchant settings, in addition to regional and/or individual store owner portals. Thus, if a user browses to give a gift to another user for a specific Olive Garden, then the system can provide promotions and specials from the national corporate level layered on top of the region and/or the individual store level. In this way, specific stores or regions can offer layers of national, regional, and/or local incentives to users to give gifts or purchase coupons or discounts for a specific store or set of stores over other stores in the chain.

Figure 45:
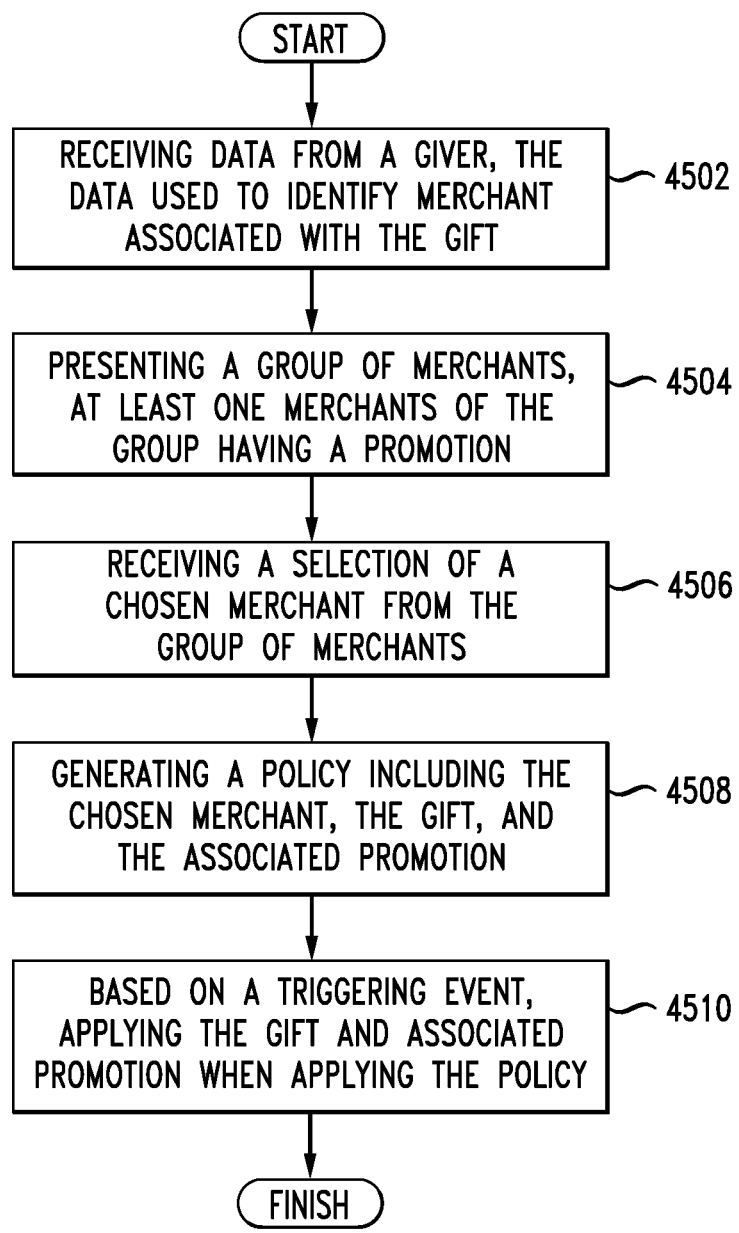
FIG. 45 illustrates a first method embodiment for group gifts.

FIG. 45 illustrates an example method embodiment for enabling merchants to provide promotions. The method includes receiving data from gift giver at a first-time, the data being used to identify a merchant at which a gift from the gift giver to recipient is redeemable (4502). The system presents a group of merchants associated with the data to the gift giver and each merchant of the group of merchants offers a promotion in connection with the gift (4504). The system receives from the gift giver a selection of a chosen merchant from the group of merchants with the chosen merchants having an associated promotion (4506). The system generates a policy including the gift, the chosen merchant and the associated promotion (4508). The policy in this case not only includes the standard gift amount, the chosen merchant data about the recipient, but it also includes the associated promotion. Upon receiving an indication of a triggering event caused by the recipient, the system applies the gift and the associated promotion to the purchase according to the policy (4510). In one aspect, the gift has an associated amount of money that is drawn from a giver payment account. The giver payment account can be independent of the recipient payment account. Further, the giver account and the recipient account both exist prior to the first time. Thus, two friends, each with existing payment accounts of some type, can participate in this process using those existing payment accounts.

One example of a triggering event is that the recipient made a purchase at the chosen merchant using a recipient payment account. When the system presents the group of merchants, it can pre-sort to group by at least one of location, price, promotional offerings and similarity to the data. The group of merchants can include a competitor to a particular merchant. The placement of one merchant in the group of merchants can be determined based in part on a payment from the at least one merchant. In another aspect, the chosen merchant includes a category of merchants and in another aspect the category merchants can share common characteristics. Examples of common characteristics include at least one of the price range, a product or product category, a specific product, a location, a franchise, and the manual selection by the gift giver. The triggering events can be purchases made by a recipient account using a debit or credit card, a Google wallet, and a location of mobile devices. Other trigger events can be location-based or non-purchasing events such as news information, political information, weather data, sports data and so forth. Any source of external data can be utilized as a triggering event. The policy can be broad enough and flexible enough to encompass any triggering event.

Merchant Promotions for Interactions

Figure 46:
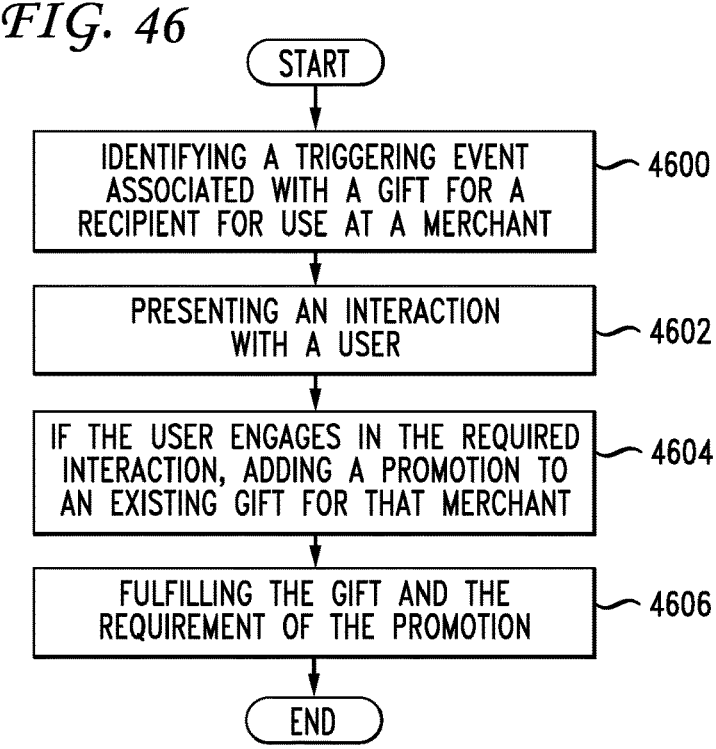
FIG. 46 illustrates a second method embodiment for group gifts.

FIG. 46 illustrates yet another method embodiment. Assume that Mary has a gift credit purchased for $50 at Olive Garden, and thus a policy exists which is monitoring a triggering event such as her being at an Olive Garden restaurant, or making a purchase using her existing payment account at the Olive Garden. One triggering event (4600), such as an identification that Mary is at the Olive Garden through a location-based service which tracks her iPhone, independent of any purchase, can cause the system to engage in a dialog with the user (4602). Questions can be transmitted to her iPhone. These can be of any type and could include suggestions for purchasing lunch or dinner. An additional offering can be provided if they answer the questions. For example, the system and/or the merchant could offer an additional $5 to the gift credit if they answer three questions. Any type of interaction is contemplated here. Perhaps if the user views a short video, then the boost to the gift is offered. The recipient Mary of the gift, could be asked if they want to receive additional promotions when they are at the merchant location (the merchant associated with the gift credit). The recipient could also opt in to receive notifications if they are at a competitor's location or at any location. The system could ask for additional information to enable this interaction. For example, the system can ask for the user's telephone number or other identifying data if necessary such that when their location triggers the process, the system can text, or call, or utilize that identification data to ask the questions or present the interaction. Then, if the recipient engages in the required interaction, then the system will add the promotion to their existing gift for that merchant (4604).

Thus, in one example, assume that Mary gets a gift credit from John for the Olive Garden and included in that gift is an invitation to potentially receive additional promotions when she is at the restaurant. She then goes to the restaurant with her mobile device. The system detects that she is at the right location and engages in an interaction such as asking questions, running a brief promotional ad for their specials that night, or otherwise presents an interaction with her. It can even be an interaction on a device at a restaurant table or other device at the restaurant besides Mary's mobile device. Such a merchant device can be any device at the merchant which can present an interaction to the user. The recipient device is typically a mobile device carried by the gift recipient that can also be used to present interactions. The recipient could even order their meal on their mobile device or a device at the table or elsewhere. Mary fulfills the requirement of the interaction and thus the system presents her with a promotion such as a free desert, an extra $3 on her gift for the purchase, and so forth. The interactions can be inter-personal interactions with a waiter, for example, which the waiter enters into a point of sale device or other merchant device on behalf of the customer. In another variation, the interactions are interactions on a paper receipt, such as survey questions or other questions, which the user fills out with pen and paper, and which are reported or recorded by the merchant.

Then, assume that Mary's meal is $55. When Mary purchases the meal using her existing payment account, then the system not only processes the $50 gift credit from John, but also one or more promotions from the system and/or the merchant (4606). If it is an additional $3 promotion, then $3 would be transferred from a merchant account to Mary's payment account. Any type of promotion is contemplated. Implementing the promotion can involve modifying the policy over the gift for the Olive Garden to add money from another account, or in any other fashion modify that policy to implement the promotion. It can also include a hybrid of money offerings, later coupons, free deserts or a free second meal, and so forth. A system separate from the merchant can offer this service and then charge a merchant a fee for the service. The promotion can be a $10 discount from their next meal at the Olive Garden. In this case, the policy that governs Mary's gift for the Olive Garden can simply be modified such that $10 is added to her gift for purchases at the Olive Garden. These provide an incentive and an opportunity for merchants to engage in a personal interaction with their customers while at the store using their mobile devices or a merchant device and can greatly enhance the customer experience and loyalty.

The promotions and associated required interactions can be targeted to all users, specific users, or randomly selected users. For example, the merchant can indicate that every 1,000$^{th}$ customer should receive a 50% discount in exchange for providing feedback on the merchant experience as well as some level of demographic information. The merchant can target interactions at new customers, at users who are in a social graph of at least two other regular customers, at customers who spend at least a minimum amount of money or who have a minimum number of people in their party, and so forth. Further, the system can vary the type and quantity of the interactions requested from the user based on transaction information, a user profile, analytics goals, social networking data, and so forth.

The customer can provide all or part of the requested feedback as part of the interaction, and the completeness of the feedback can determine the extent of the promotion. For example, if the customer answers ⅔ of the questions associated with the interaction, the system can apply ⅔ of the promotion. The user could engage in answering questions or playing a game, such that their success in the game is tied proportionally to the amount of additional discount or benefit they receive. The user can play all or part of these games on a smartphone or other mobile device. The game can offer rewards that enhance a gift or a promotion associated with a coupon by simply modifying the policy. For example, each user can spin a wheel on a virtual screen, which is unlocked based on location (i.e. the mobile device indicating a location within or near to the merchant). When the wheel stops spinning at a particular 'slot' or region, that slot or region indicates a bonus, such as an extra $5 off, or free breadsticks, or $10 off your next visit. Then the system can modify the existing policy to implement the wheel spinning prize or can create a new policy. The games can span multiple users and mobile devices. For example, a merchant establishes a trivia test game for a particular day. All users with coupons (or all users with capable mobile devices) can take the trivia test on that particular day, either on their mobile device or on a merchant-provided device, such as a kiosk or other device at tables in a restaurant (which can be separate or integrated into a table, for example). At the end of the day, the user(s) with the highest score in the trivia test receive a discount or promotion either on their previous purchase, via a policy, or on a future purchase. This approach can be applied to any kind of single-player or multi-player game. This approach enhances the sense of community and camaraderie of customers, and makes the user experience at the merchant more 'sticky' so users have positive feelings, and a desire to return and patronize the merchant.

Tying in to Customer Loyalty Programs

Many merchants, such as grocery stores, offer loyalty or rewards programs. For example, a grocery store can offer a 5 cent discount per gallon on gas purchases to customers that spend at least $100 at the grocery store. Customers may earn points via making purchases at the grocery store which can then be redeemed for groceries or gas. The grocery store can have its own gas pump nearby or can partner with a separate gas station company to provide such benefits. In some cases, extra points are offered in the rewards program for specific purchases. For example, one grocery store offers a multiplier to reward points (such as 4× the normal amount) for purchases of physical gift credits for participating gift credits. For example, for every $10 gift credit purchase at the store, the purchaser gets 40 points. For every $25 gift credit purchase, the user gets 440 points and one 44 cent per gallon fuel reward. This arrangement provides one way for a merchant to make their establishment more attractive to consumers by allowing them to accomplish two tasks, i.e. grocery shopping and filling up with gas, in one destination.

A problem with the existing rewards program for buying gift cards is that one must go to the store and buy a physical gift card. This method requires the expense of printing and generating the separate gift cards that are just thrown away after they are used or they can be lost and thus the value not redeemed. One way to enhance the existing arrangement is to offer policy-based gift credits of the type disclosed herein to consumers while they are at the pump. Many grocery stores already offer traditional gift cards for sale, so the target audience is already familiar with gift cards and is susceptible to purchasing gift cards. One way to provide loyalty rewards or discounts at the gas pump is to track 'points' earned by purchases that a customer can use for discounts on gas or on future grocery purchases. The grocery stores can offer additional points for buying gift cards through the grocery store. The concept of policy-based gift credits can be applied to this scenario, with the grocery stores being 'resellers' of policy-based gift credits. While merchants can 'resell' physical gift cards, they do not need to purchase and stock inventory of policy-based gift credits and are thus not 'resellers' in the strictest sense.

In one example, a user purchases a policy-based gift credit at a gas pump point of sale associated with a grocery store, and the gas pump point of sale can serve dual purpose of facilitating the purchase of gas as well as the purchase of the gift credit. The user can enter their loyalty or rewards information as part of the transaction, such as by entering their phone number or by swiping or scanning a loyalty card. The user also pays with their credit card, debit card or other mechanism. Therefore, the system can utilize the reward program data, with the giver's payment account data, in addition to receiving the gift credit recipient data, to establish the policy for fulfilling the gift credit and rewarding the giver via the rewards program. The gift credit can be associated with purchases at one or more merchants, such as selected merchants that pay for inclusion. In exchange for the user purchasing the gift credit, the system can adjust the price of the gas down in real time. For example, the grocery store and gas pump can run a promotion where for every $25 worth of gift credits purchased, the customer receives an additional 44-cent discount off the current gas purchase.

In one example, assume the user buys a $100 Home Depot gift credit at the gas pump. At the pump, the user can interact with the point of sale display and inputs on the gas pump, or can interact with a mobile device such as a smart phone or tablet to see a list of participating merchants for gift credits. The system receives the payment account data of the purchaser, reward program data for a rebate on gas, and the recipient data. Upon making the purchase, the gas pump point of sale can automatically apply a discount to the price per gallon for gas. If the user makes the purchase in the grocery store, the system can automatically apply or deposit points in the user's loyalty rewards program account that are eligible for use at the gas pump or for other discounts or promotions. Since the gift credits as disclosed herein are not separate physical gift cards, a purchase in the grocery store can be accomplished via a grocery store display such as at the self-checkout point of sale or at the manned checkout isle. A display can present an inquiry asking "do you want any gift credits today?" The user may have already entered in their rewards number and swiped a card associated with their payment account. The user can then electronically pick a gift credit for the Olive Garden, or Home Depot, and quickly identify the amount and the recipient as well. The display can be connected to a back end server that provides the ability to tailor the filtering and focusing of potential recipients. For example, when the user slides their card or enters their rewards data, the system can then know who the user is and have data that can narrow the likely recipients of gift credits. The user can then simply enter the basic data, pick a recipient, and commit to the gift credit. The grocery store can then process the purchase and add the $50 gift credit to the grocery purchase, plus any other fees, and add the enhancement to the rewards program accordingly. Thus, electronically, all of the goals of the purchase are met without the need for a physical gift card. Further, all of the benefits of the gift credit as set forth herein are met.

Figure 47:
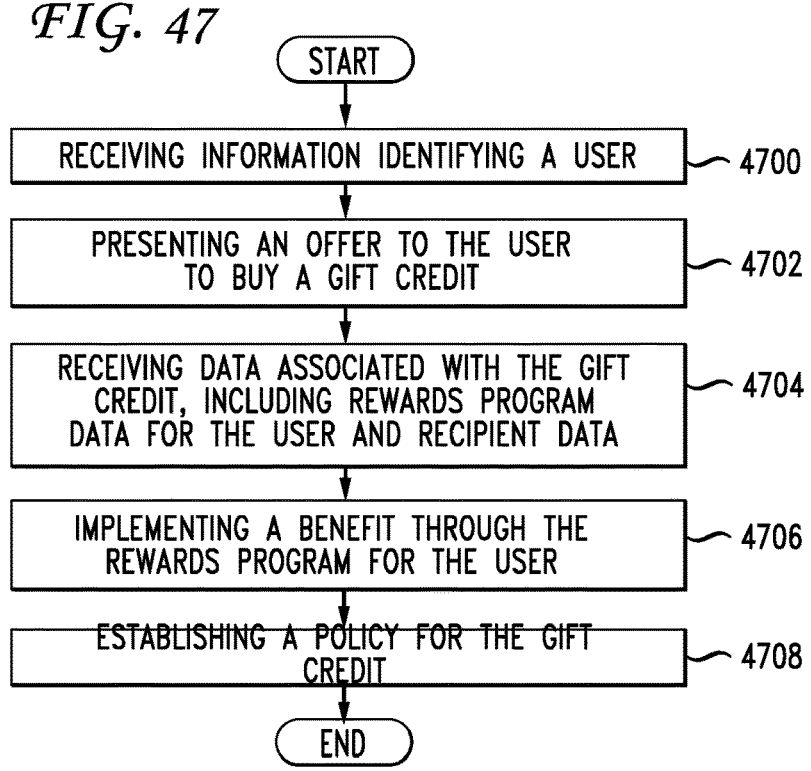
FIG. 47 illustrates a third method embodiment related to rewards programs.

FIG. 47 illustrates a method embodiment according to the description above. At a point of sale device which includes a display that the purchaser can interact with, the system will receive information identifying the user (4700). This information can be a reward program number, a payment account information such as a credit card or debit card and PIN, a fingerprint, or any other identifying data. The system then knows the person and can provide a personalized interaction for purchasing a gift credit through the display. The interactive display in one embodiment can be the purchaser's home computer or a mobile device and not a point of sale device. The system presents an offer to the purchaser to buy a gift credit (4702). The display can say "John Doe, welcome to Safeway. Would you like to buy a gift card for your Mother's Birthday next week?" The system then receives data via the display associated with the gift credit (4704). The user can provide the amount (say $50), the merchant (Olive Garden, Home Depot) and the recipient. Since the system knows the purchaser, the identification of the recipient can be accomplished through a narrowed search. For example, since the system knows the person at the point of sale, their personalized contact list can be presented. Predictive data such as friends and/or family in their social network that have birthdays or anniversaries in the next two months could be presented. The system will know of the user's purchasing history as well. The offer can say "John, do you want to buy an Olive Garden $50 gift credit for your mother's birthday next week? Last year you bought her an Olive Garden Gift Card and her feedback said she loved it. Click here to accept, and you will also get 4× your rewards points for a gas purchase at the grocery store." The user will provide information in one several different ways to identify the recipient of the gift credit as part of the data. If a predetermined set of data for a gift credit is provided as in the example above, the user can in one click accept the offer. For example, in one click, John could purchase a $50 gift credit for the Olive Garden for his mother, and optionally also receive rewards on John's reward program. The display can also present other personal data such as a picture of his mother redeeming the previously given gift credit or the message his mother gave as feedback for the card. The display could also tap into wish lists of friend or others in a social network, and receive data on other suggested gift credits which have additional offers or provide a variety when compared with previous purchases. Users could also get extra bonuses for buying the gift credits in bulk. The display can present an offer from a merchant to buy two gift credits for Bed Bath and Beyond as the holidays are approaching. Because of the bulk purchase, extra rewards or discounts are provided to the gift giver. A grandmother may have presented to her, on the display, to buy the same gift credit for Toys R Us for each of her twelve grandchildren. This can be presented in a compact format such as "Joan, here is a picture of your grandchildren, would you like to buy a $20 Toys R Us gift credit for each of them?" The grouping of recipients can be a list, a characterization ("your three best friends" or "your four children"), a picture of a group of people, or a suggested list of recipients. This can simplify and speed up the process of purchasing the gift credit at a merchant point of sale or on another computing device, such as a gas pump, an ATM, in your car at a stoplight, a smartphone, and so forth. Just as set forth above, it is assumed that the recipient has a payment account in the system such that they can redeem the gift credit via a purchase or other triggering mechanism, independent of a physical gift instrument. The system then implements a benefit through the rewards program for the purchaser (4706) and establishes the policy for the gift credit in the normal fashion (4708).

The system will then have all of the necessary data to accomplish the following: (1) providing rewards to the purchaser for the purchase of the gift credit at the particular merchant; (2) establishing a policy for the gift credit as disclosed herein; and (3) enabling the purchaser to receive additional discounts such as on gas or other purchases through the rewards program of the merchant. The point of sale with an interactive display can be at a gas station pump, check out station, self-checkout station, in an isle of the grocery store, or in any location. If the purchase is at a gas pump, the need for a rewards number can be eliminated. Thus, the "reward" or the discount could simply apply to a current purchase of a separate item or service that is associated with the gift credit. This approach can simplify the process where while the user has 3 minutes of time while pumping gas, the interactive display can present the options of buying gift credits for recipients. If the user purchases a gift credit at that time, a discount will be provided for the gas being currently pumped. Thus, in any of the scenarios disclosed herein, the need for the rewards program can be optional. Indeed, the rewards program can be tied to the giver's credit card. For example, if the purchaser buys a gift credit at the grocery store, without being a member of a rewards program for that grocery store, the system could provide a discount on gas if the giver purchases gas later using that same payment account. In this manner, a "policy" could be established for that credit card which monitors those purchases and when a gas purchase is made, the discount is provided. The benefit of this approach is that when the user buys gas they do not need to provide a telephone number or other identifying information for their rewards program. In this way, the system can engage users right at the pump to enable users to buy a policy-based gift credit for another person or for themselves and get the discount instantaneously.

The user could even make purchases in this manner on their own computer or mobile device. In this scenario, the user may simply be at home and be able to make a purchase of a gift credit while also having an opportunity to enter in their grocery store club card data to receive reward points for an additional discount on gas or discount on further grocery purchases. This enables participating stores to provide increased incentives to encourage purchasers to come to their brick and mortar store when making on-line gift credit purchases as disclosed herein.

Commercial Payments Through Gift Credits

In another example, people can opt to be paid through the use of a gift credit having an associated policy as disclosed herein. For example, if a person performs a job and desires to be paid for that job, the principles disclosed herein can be utilized as a method to enable them to be paid in a novel manner. As an example, consider John who has earned $800 as a contractor for completing a project for the ACME company. John, rather than receiving a check, desires to maximize the potential ease and benefit of receiving money by being paid through a gift credit connected to his debit or credit card. In this scenario, John could either request a direct payment to his payment account or as a reimbursement for a purchase that he is going to make. For example, John could essentially make himself of a gift credit of the type disclosed herein. If John is to be paid $800, John may know that he desires to make an $800 purchase of a pair of skis. He may be able to seek a promotion or identify a discount at a merchant and be able to create his own gift credit. In this case, he could request from the ACME company that they reimburse him for a purchase of the pair of skis at REI. A graphical user interface can be presented such that the ACME company is able to present the recipient with a mechanism of opting to be paid via the use of a gift credit. In this case, John could request that a gift credit be given to him from the company for $800 to be used at REI. Then, to "be paid" by the ACME company, John would simply go and make his $800 purchase of the skis at REI at which point, the system as disclosed herein would monitor the John's purchases such that after the purchase is made, he would be reimbursed for $800 of the purchase.

A benefit of this approach could be that John may make himself for eligible for promotions or other offers or discounts by choosing to be a recipient of the gift credit in this manner. Plus, it gives the recipient flexibility in being able to choose the entity, item or basis policy parameters of a gift credit that is going to be given to them. Thus, all of the associated benefits that can be offered through a gift credit program can enable John to not only receive the $800 for being paid for the work of the ACME company, but he may be able to receive an additional $50 in promotions or discounts which me otherwise may not be able to receive if he were simply making the purchase of the skis independent of the context of using the gift credit. In this respect, being able to make commercial payments like expense credits provides an additional functionality and opportunity for additional promotions and branding that otherwise may not be available through a standard approach to making a commercial payment from a company to a contractor or an employee.

In addition, companies may be able to easily offer benefits to their employees by enabling them to have their payment accounts available to a system that enables them to receive and create their own gift credits as recipients for bonuses and other offers from their companies. Such an approach could become a standard way for additional gift credits to be able to be processed in the system which easily enables recipients and giver individuals or companies alike to be eligible for other promotions and discounts. As with other disclosures set forth above, the entity giving such a gift credit, such as the ACME company in this case, would also be available to receive promotions in which the giving entity could have a policy associated with purchases that they may make which also constitute a secondary gift credit for the giver as part of the transaction of generating a gift credit for the recipient.

Figure 48:
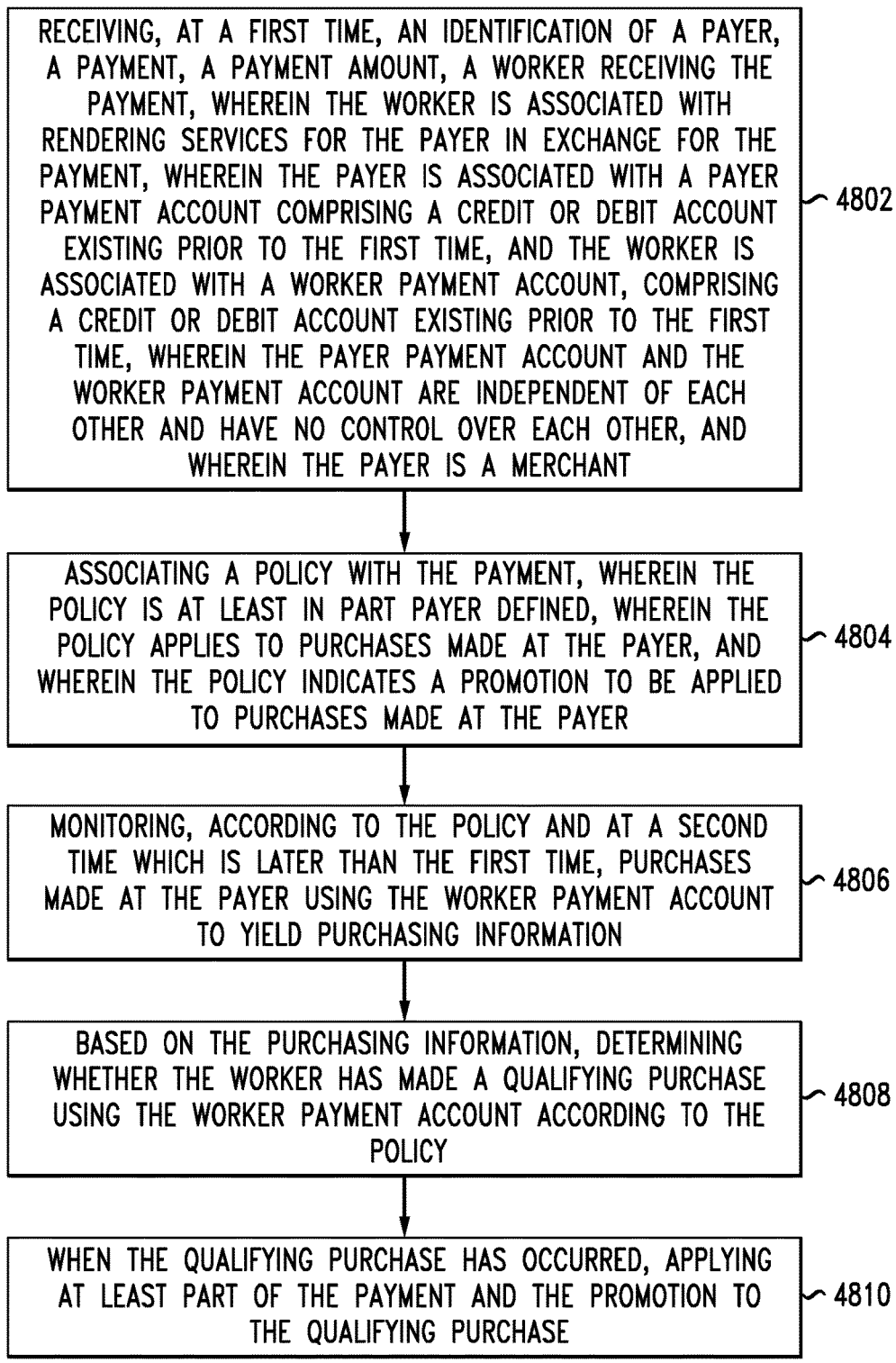
FIG. 48 illustrates a fourth method embodiment related to giver promotions.

FIG. 48 illustrates a fourth example method embodiment related to giver promotions. In this example, the policy governing a gift from a gift giver to a recipient further includes an associated promotion which can be applied to the qualifying purchase. Thus, the policy governs not only recognition of a qualifying transaction, but also identifies a promotion, or which promotion, can apply to the transaction. The promotion can be applied directly at the merchant point of sale such as a price discount, or can be applied completely independently of the transaction at the merchant, such as an additional amount of money applied to the gift. The promotion can be governed by the same policy rules as the qualifying transaction, or the promotions can have different policy rules which may be in addition to the policy rules governing the qualifying transaction. For example, the primary policy can provide $50 to be applied to purchases at Target, and the promotion policy can further indicate that if the transaction is over $100 and contains at least $40 of groceries that an additional $20 will be applied to the purchase. In these examples, the giver promotion is enabled because the giver either has some preferred relationship with the merchant associated with the policy, or because the giver is the merchant associated with the policy. While this method embodiment is discussed in terms of a worker and a payer, the same principles can be applied to any transaction in which the giver is either a merchant or associated with a merchant. Further, in another variation, the payer is a merchant of a family of merchants such as a restaurant chain, a corporation that owns several different store brands, or a loosely affiliated group of stores such as a guild of stores in a shopping mall. Then, the policy can cover purchases made in these groups of merchants.

The system receives, at a first time, an identification of a payer, a payment, a payment amount, a worker receiving the payment, wherein the worker is associated with rendering services for the payer in exchange for the payment, wherein the payer is associated with a payer payment account including a credit or debit account existing prior to the first time, and the worker is associated with a worker payment account, including a credit or debit account existing prior to the first time, wherein the payer payment account and the worker payment account are independent of each other and have no control over each other, and wherein the payer is a merchant (4802). The system associates a policy with the payment, wherein the policy is at least in part payer defined, wherein the policy applies to purchases made at the payer, and wherein the policy indicates a promotion to be applied to purchases made at the payer (4804). The system monitors, according to the policy and at a second time which is later than the first time, purchases made at the payer using the worker payment account to yield purchasing information (4806). Based on the purchasing information, the system determines whether the worker has made a qualifying purchase using the worker payment account according to the policy (4808). When the qualifying purchase has occurred, the system applies at least part of the payment and the promotion to the qualifying purchase (4810). As an example, Mario contracts to do plumbing work for a grocery store. The grocery pays Mario for the plumbing work with $300 subject to a policy limited to purchases made at the grocery store, but providing an additional promotion on top of the $300 dollars. The promotion can even be dynamic, changing over time or based on some other circumstances or information. Thus, to receive the payment, Mario simply shops at the grocery store, and the system automatically applies the promotion to the purchases, if applicable. In other scenarios, the gifts are not considered payments for services rendered, and are simply gifts, such as gift certificates, rewards, or various other promotions provided by the merchant.

Figure 49:
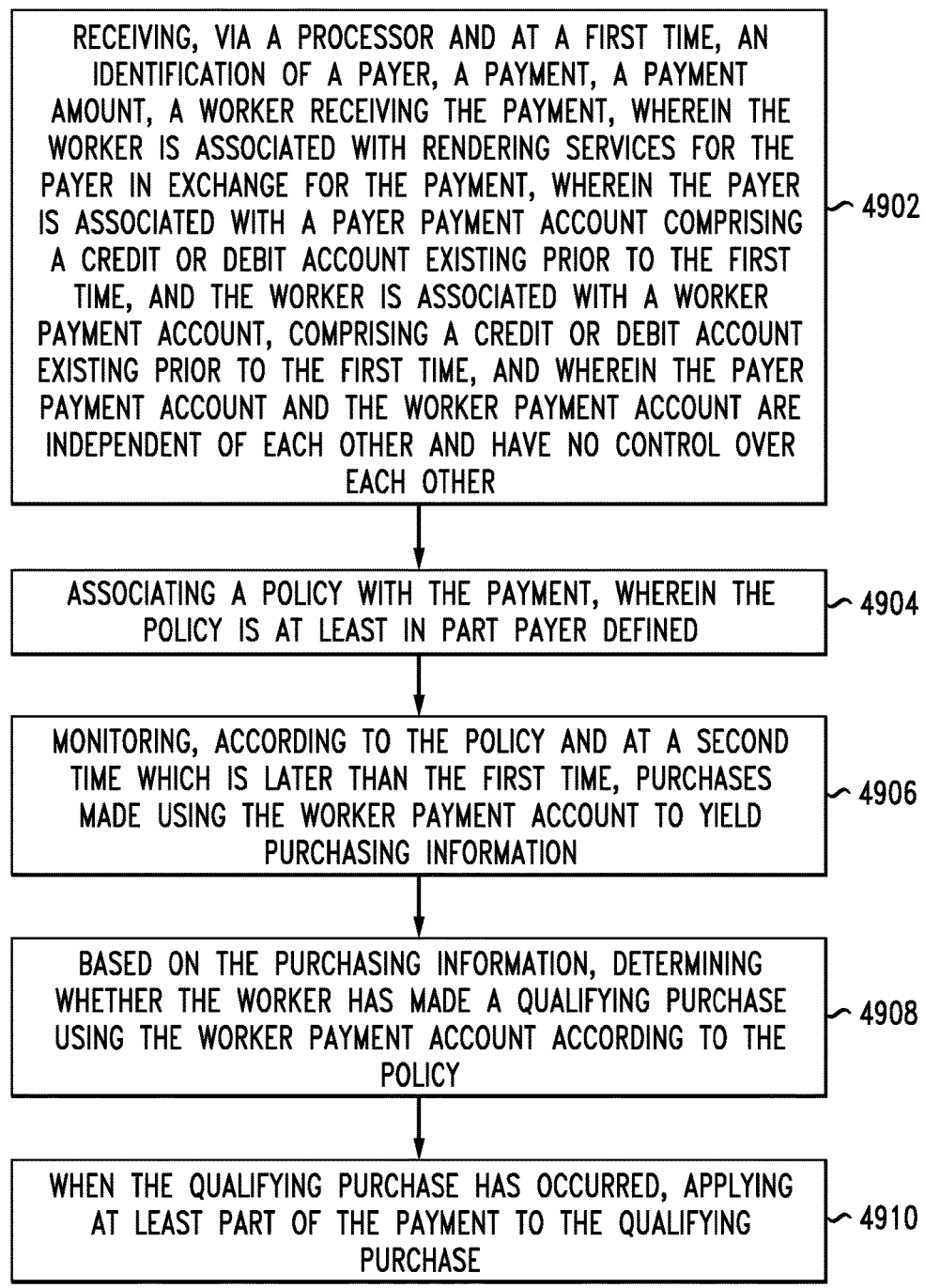
FIG. 49 illustrates a fifth method embodiment related to commercial payments.

FIG. 49 illustrates a fifth example method embodiment related to commercial payments. This is an example where a worker receives payment for a service rendered from a payer subject to a policy. As set forth above, this can be advantageous because it is automatically applied to an existing account and is simpler than receiving a paper check, signing the check, and driving to the bank to cash or deposit the check. The system receives, at a first time, an identification of a payer, a payment, a payment amount, a worker receiving the payment, wherein the worker is associated with rendering services for the payer in exchange for the payment, wherein the payer is associated with a payer payment account including a credit or debit account existing prior to the first time, and the worker is associated with a worker payment account, including a credit or debit account existing prior to the first time, and wherein the payer payment account and the worker payment account are independent of each other and have no control over each other (4902). The system associates a policy with the payment, wherein the policy is at least in part payer defined (4904). The system monitors, according to the policy and at a second time which is later than the first time, purchases made using the worker payment account to yield purchasing information (4906). Based on the purchasing information, the system determines whether the worker has made a qualifying purchase using the worker payment account according to the policy (4908). When the qualifying purchase has occurred, the system applies at least part of the payment to the qualifying purchase (4910). As an example, Mario contracts to do plumbing work for a grocery store. The grocery store can pay Mario for the plumbing work with a gift of $300 that applies to purchases made at the grocery store. Thus, Mario does not have to make any additional effort to be receive payment, such as cashing a check or processing a credit card, and simply makes his regular purchases at the grocery store. Additionally, the grocery store receives a benefit because it only pays for the cost of the goods purchased, but receives benefit equal to the retail price of those goods. Because of this difference, the grocery store can potentially offer Mario a larger payment than if the payment were made via cash, check, or credit/debit card.

Figure 50:
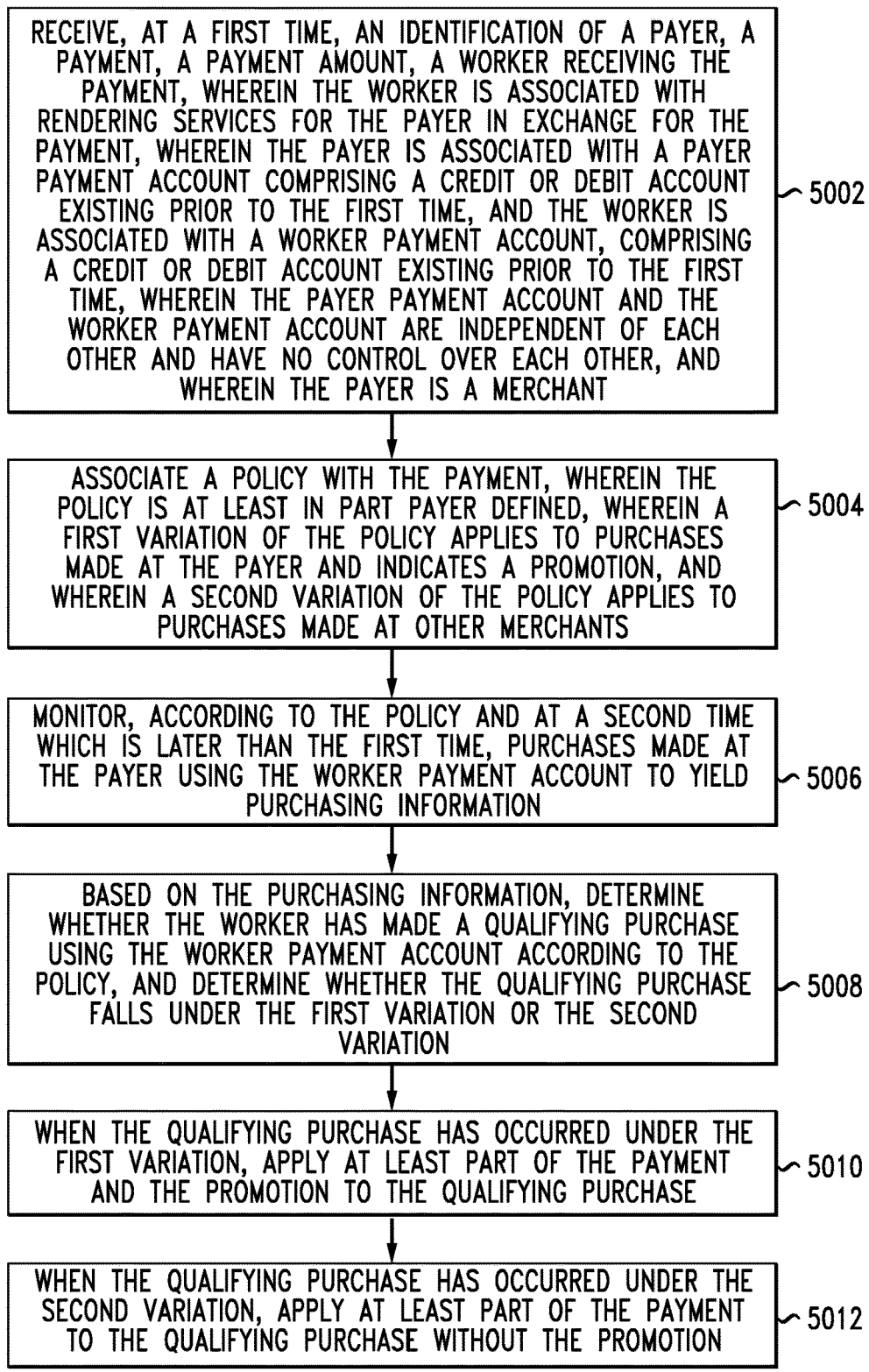
FIG. 50 illustrates a sixth method embodiment related to a policy with multiple redemption options.

FIG. 50 illustrates a sixth example method embodiment related to a policy with multiple redemption options. In this example, the system receives, at a first time, an identification of a payer, a payment, a payment amount, a worker receiving the payment, wherein the worker is associated with rendering services for the payer in exchange for the payment, wherein the payer is associated with a payer payment account including a credit or debit account existing prior to the first time, and the worker is associated with a worker payment account, including a credit or debit account existing prior to the first time, wherein the payer payment account and the worker payment account are independent of each other and have no control over each other, and wherein the payer is a merchant (5002). The system associates a policy with the payment, wherein the policy is at least in part payer defined, wherein a first variation of the policy applies to purchases made at the payer and indicates a promotion, and wherein a second variation of the policy applies to purchases made at other merchants (5004). The system monitors, according to the policy and at a second time which is later than the first time, purchases made at the payer using the worker payment account to yield purchasing information (5006). Based on the purchasing information, the system determines whether the worker has made a qualifying purchase using the worker payment account according to the policy, and determine whether the qualifying purchase falls under the first variation or the second variation (5008). When the qualifying purchase has occurred under the first variation, the system can apply at least part of the payment and the promotion to the qualifying purchase (5010), and when the qualifying purchase has occurred under the second variation, the system can apply at least part of the payment to the qualifying purchase without the promotion (5012). As another example, Mario contracts to do plumbing work for a grocery store. The grocery store pays Mario for the plumbing work with a gift of $300 that applies to purchases made at any grocery store, but the gift is valued at $350 at the grocery store where Mario did the work. Thus, the grocery store can incentivize Mario's repeat business by offering him additional money to shop at the grocery store over others, and Mario receives a perceived additional benefit or bonus pay for the work performed. This embodiment can also be applied to scenarios in which the gift is a gift and not payment for services rendered.

In another aspect, the method can include receiving, via the Internet, a registration of a recipient payment account at a service provider, the recipient payment account being associated with a recipient and receiving, from an entity, an identification of the recipient and a spending category, the recipient payment account being registered with the service provider prior to the receiving of the identification. The entity can be a person, a business, or any entity. The method can include generating, via the service provider, a policy comprising a gift credit and the spending category, wherein the policy is at least in part defined by the entity and wherein the policy can be linked to the recipient payment account, and transmitting, via a processor of a computing device and via a communication channel, an electronic notice to a recipient device, the electronic notice referencing the policy and can be linked to the recipient payment account. The method includes monitoring, via a processor of a computing device, purchasing transactions made using the recipient payment account via a payment processing system for a qualified purchase according to the policy and, based on the qualified purchase, applying, via a processor of a computing device, the gift credit. The spending category can be at least one of a network merchant identification or a network merchant category.

The method can further include receiving an initial amount of money from an entity account associated with the entity into a service provider account, wherein the gift credit can be drawn from the initial amount of money. The gift credit can be transferred to the recipient payment account and can be determined by comparing an initial amount of money received from the entity to a purchase amount associated with the qualified purchase. If the purchase amount is less than the initial amount of money, then the gift credit transferred to the recipient payment account can be a full amount of the qualified purchase. If the purchase amount is more than the initial amount of money, then the gift credit transferred is the initial amount of money.

The method can further include charging the recipient payment account for the qualified purchase and reimbursing the recipient payment account when the qualified purchase appears on a transaction history of the recipient payment account. In another aspect, the method can include charging a percentage of an initial amount of money provided by the entity as a service fee for using the service provider. One of the entity, the recipient and a third party can be charged the percentage of the initial amount of money. In another aspect, the spending category can include one of an individual point of sale, a chain of stores, and a plurality of businesses in a same industry. A third party can also pays at least a portion of an initial amount of money which funds the gift credit.]

Local Product Enhancement

Figure 51:
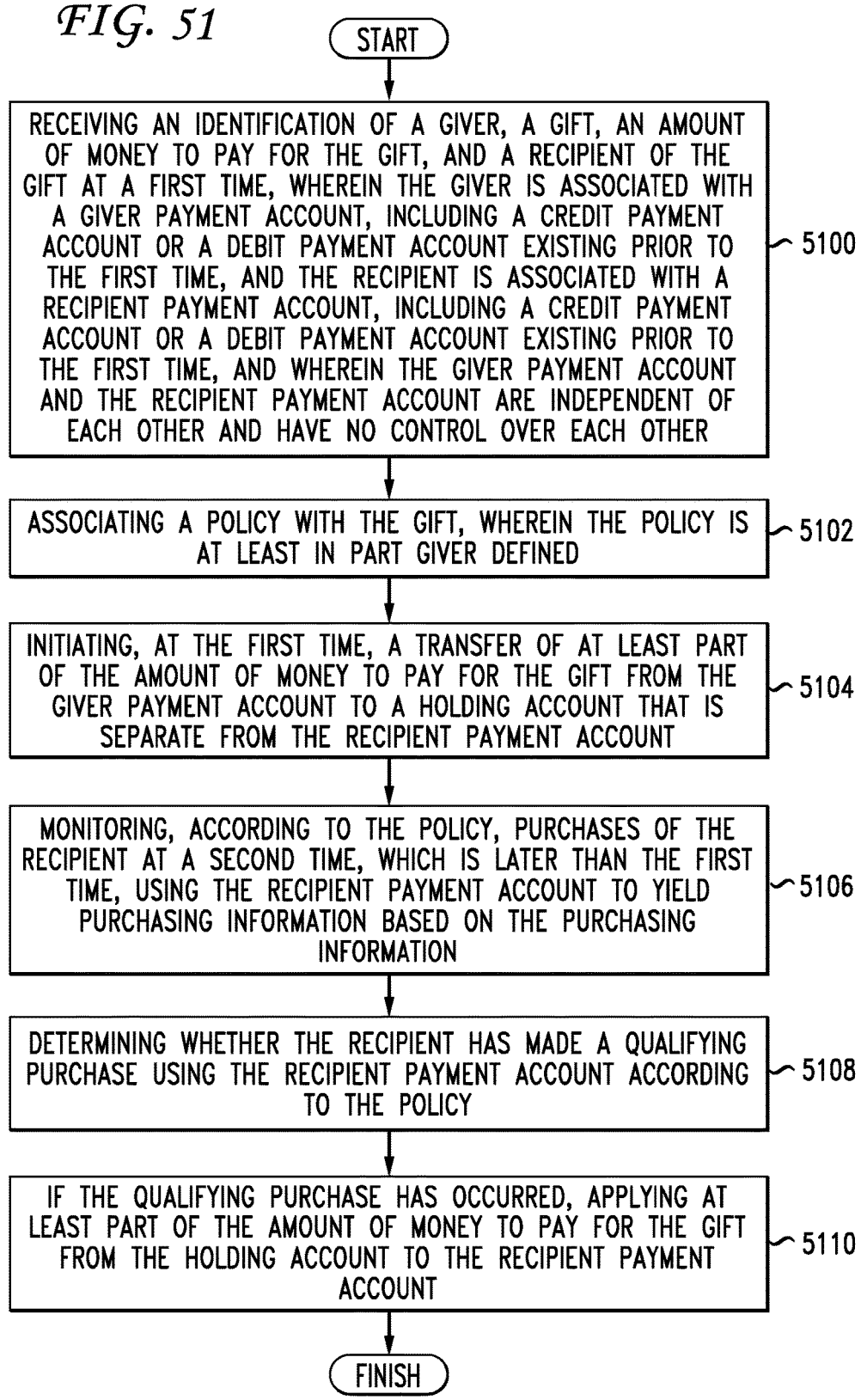
FIG. 51 illustrates an example method embodiment for local product enhancements.

FIG. 51 illustrates an example method embodiment for local product enhancements. Local product enhancements can be based around a single payment account, such as an account tied to a credit or debit account, that is accepted as payment at multiple local merchants that are part of a gift network. The gift administering system can reward consumers for frequenting merchants in the network. For example, the system can email special offers to consumers. The system can track buying habits of consumers and can tailor offers or promotions or advertising targeted to merchants the consumers frequent most or that the system determines would be of interest to the consumer. For example, if similar consumers frequently visit merchant X, then this consumer may also like merchant X. The network can extend to or cooperate with networks in other cities. For example, if a consumer purchases a reloadable card, the consumer can use that card multiple cities. This approach is convenient for consumers who travel between locations with participating merchants, because the consumer can use the same card. The system can also provide games, badges, accomplishments, or achievements for the users to earn or play. Earning a particular achievement or status can unlock additional benefits, discounts, promotions, etc.

A system configured to practice the example method embodiment receives an identification of a gift giver, a gift, an amount of money to pay for the gift, and a recipient of the gift at a first time, wherein the giver is associated with a giver payment account, including a credit payment account or a debit payment account existing prior to the first time, and the recipient is associated with a recipient payment account, including a credit payment account or a debit payment account existing prior to the first time, and wherein the giver payment account and the recipient payment account are independent of each other and have no control over each other (5100). The system can associate a policy with the gift, wherein the policy is at least in part giver defined (5102). The system can initiate, at the first time, a transfer of at least part of the amount of money to pay for the gift from the giver payment account to a holding account that is separate from the recipient payment account (5104). The system can monitor, according to the policy, purchases of the recipient at a second time, which is later than the first time, using the recipient payment account to yield purchasing information based on the purchasing information (5106). The system can determine whether the recipient has made a qualifying purchase using the recipient payment account according to the policy (5108). If the qualifying purchase has occurred, the system can apply at least part of the amount of money to pay for the gift from the holding account to the recipient payment account (5110).

In another variation, the system can generate a policy that governs the application of a discount at a merchant, and present an electronic gift credit to a consumer at a first time, the electronic gift credit being associated with a policy. Upon receipt of a purchase of the electronic gift credit from the consumer, the system can activate the policy, wherein the consumer is associated with a consumer payment account including a credit payment account or a debit payment account existing prior to the first time. The system can monitor, according to the policy, purchases at a second time, which is later than the first time, using the consumer payment account to yield purchasing information. Based on the purchasing information, the system can determine whether the consumer has made a qualifying purchase using the recipient payment account at the merchant according to the policy, and if the qualifying purchase has occurred, apply a benefit associated with the qualifying purchase to the consumer.

The benefit can be a discount, a reimbursement of at least part of a purchase price, points, or a free item at the merchant, for example. The policy can govern application of a respective discount for various merchants. The policy can be based on a purchasing history of the consumer or on a scoring of points based on consumer activity. The merchants associated with the policy can be chosen based on a purchasing history of the consumer. If the benefit is points, the system can further activate a second policy based at least in part on the points, the second policy being associated with a second merchant, and monitor, according to the second policy, purchases at a third time, which is later than the second time, using the consumer payment account to yield second purchasing information. Then the system can, based on the second purchasing information, determine whether the consumer has made a second qualifying purchase using the consumer payment account at the second merchant according to the second policy, and, if the second qualifying purchase has occurred, apply a second benefit associated with the second qualifying purchase to the consumer. The second benefit can be a discount or a reimbursement for the second qualifying purchase.

Network Fees for Processing Gifts

Payment processing networks, such as a merchant payment processing system, a payment aggregator, a credit card network, or a bank or collection of banks, can process gifts and intercept transactions to detect qualifying transactions for a gift. These entities can process such transactions in exchange for a fee. For example, the additional processing power and cost associated with transferring funds for a gift may have an associated cost. Thus, the payment processing network may refuse to process such gifts without receiving a fee or some compensation. The fees can be paid in advance of processing the gift, can be paid on a one-time basis, on a per-monitored-transaction basis, on a recurring basis as long as transactions are being monitored in association with the policy, and so forth. The exact amount of the fee, timing of payment of the fee, as well as which parties pay the fee can vary, as shown in the examples below.

In one example, a gift giver is creating a gift for a recipient. After selecting the recipient, amount, and other information for the policy, such as at a checkout stage in an online purchasing environment, the system can present the recipient with the amount of the processing fee. The processing fee can be a flat fee, based on the amount of the gift, or based on some other factors. The exact processing fee may not be known, so the system can present a range of fees or an estimated or average fee. The giver can pay the fee up front as the gift and policy are created. Alternatively, the giver can indicate that the fee be paid out of the gift amount itself. The giver can pay the processing fee before the gift is created, or afterwards such as upon detecting a qualifying transaction triggering application of the gift.

The processing fee can be split between multiple parties, so that the giver pays a portion, the merchant pays a portion, the recipient pays a portion, and so forth. Particular merchants or payment processing networks can offer promotions or incentives to attract or drive business into particular patterns, such as one payment network offering reduced or eliminated fees to lure away customers from other payment networks. These promotions may include various conditions which must be triggered to receive the reduced fee rate. Thus, in these cases, the entire fee may be withheld, reserved, or paid in advance, and when the conditions are satisfied a portion is refunded. Alternatively, the system can detect the conditions and charge a reduced rate fee or nothing at all.

Figure 52:
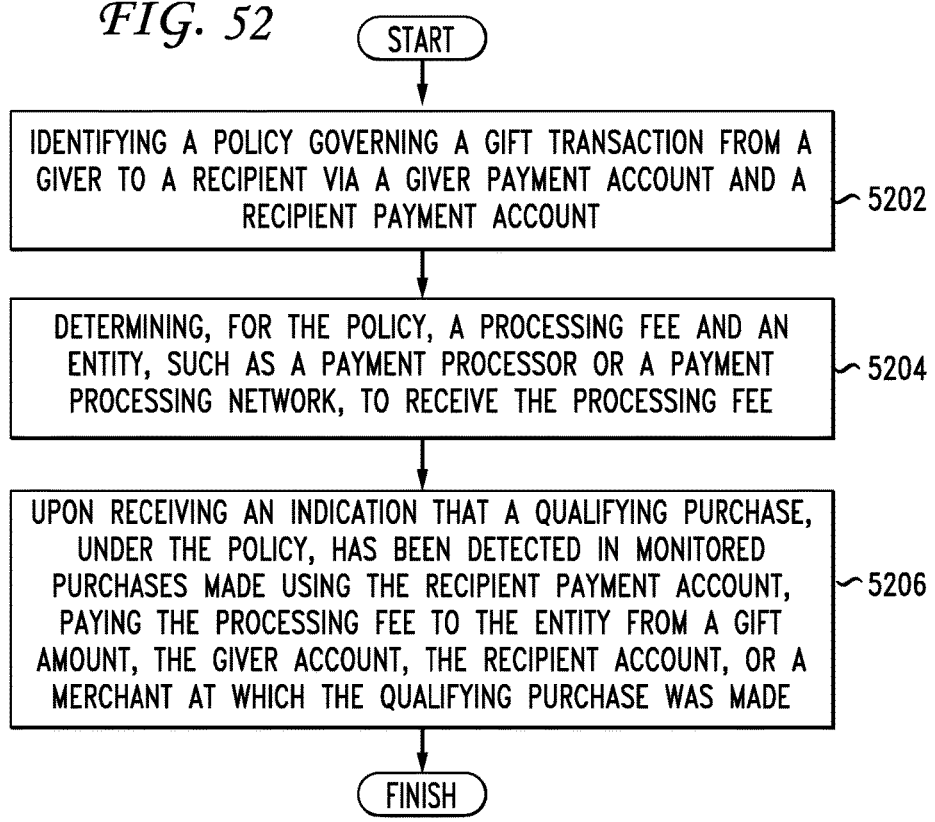
FIG. 52 illustrates an example method embodiment for handling network based fees or charges for processing a gift credit.

FIG. 52 illustrates a method embodiment for processing gift transactions according to a policy. A system configured to practice this method identifies a policy governing a gift transaction from a gift giver to a recipient via a giver payment account and a recipient payment account (5202), and determines, for the policy, a processing fee and an entity, such as a payment processor or a payment processing network, to receive the processing fee (5204). Then, upon receiving an indication that a qualifying purchase, under the policy, has been detected in monitored purchases made using the recipient payment account, the system can pay the processing fee to the entity from a gift amount, the giver account, the recipient account, or a merchant at which the qualifying purchase was made (5206). When the entity is a payment processor, the entity can monitor the purchases.

The processing fee can be fixed and established prior to the policy and can optionally be incorporated in the policy itself, so that the system can extract parameters of the policy, and read the processing fee from those parameters. Alternatively, the amount of the processing fee can vary based on a set of rules, such as rules for changing the processing fee amount based on a merchant at which the qualifying purchase is made, a purchase amount of the qualifying purchase, a time of day, an amount of time elapsed since creation of the policy, a type of good or service purchased via the qualifying purchase, or status of at least one of the giver or the recipient. In another variation, the system can present to the giver creating a gift and an associated policy an indication of the processing fee. The giver can either provide approval of the processing fee in advance, pay the processing fee in advance, or indicate that the processing fee will be deducted from the gift amount.

In certain conditions, a merchant or other party can create promotional conditions for reducing the processing fees of the payment processing network. The system can identify those promotional conditions associated with the processing fee, and upon determining that the qualifying purchase satisfies the promotional conditions, refund or simply not charge the processing fee.

Merchant Identification of the Transaction Using an Algorithm

When a recipient receives a gift for a giver-selected merchant, the system can identify when the recipient goes to a location of that merchant and makes a qualifying purchase under the policy to receive the gift via the recipient's payment account used to make the qualifying purchase. The transaction information received by the recipient's payment account may only include limited information about the specific store location where the purchase is made. This may make detection of qualifying purchases under the policy difficult with certainty that this the merchant is indeed the merchant the giver intended.

The system can use an algorithm that includes selected data available about the purchase to increase the confidence that the transaction is for the intended giver-selected merchant. This algorithm may include data that is weighted differently and can include other available data to determine an accuracy store score for the transaction, or a certainty score that the merchant is what the giver intended and thus satisfies the gift policy. The system can collect and evaluate data such as transaction store data passed by the credit card processor including complete or partial store names, address, zip or other information, transaction store data passed by the store merchant processor including complete or partial cardholder names, address, zip or other information, geo tracking information about where the purchase was made, information provided by the recipient when using the gift, or any other available information. Other sources of information can include social networks, financial tracking tools, communications between the giver and recipient, and so forth. The system can weight each of these available data elements via an algorithm that determines the level of certainty about the transaction being for the merchant. If the certainty level exceeds a threshold, then the system applies the gift amount to the recipient payment account to implement the gift.

Child Based Application

The disclosure next turns to the subject of the present claims. The claims in this application primarily cover the "child" based application of the principles disclosed herein. There are several aspects of the principles herein in which a child or other person who does not have a debit/credit account can give or receive a gift credit. In some cases, the person may have a debit/credit account, but wishes to keep that account separate from the gift for privacy, security, accounting, or other reasons. Assume that a 10-year-old child, Mason, does not have a debit/credit account. His grandmother wants to give him a $20 gift credit for the Lego® store but has no means to accomplish that through a "recipient" payment account since Mason has no such account with which to associate a gift policy. There are several possible solutions to this dilemma. The first solution is to associate Mason with a third party such as a parent who has a payment account that can be used to process the gift. Communications can exist between all parties to the transaction to facilitate notices and information throughout the process.

Figure 53:
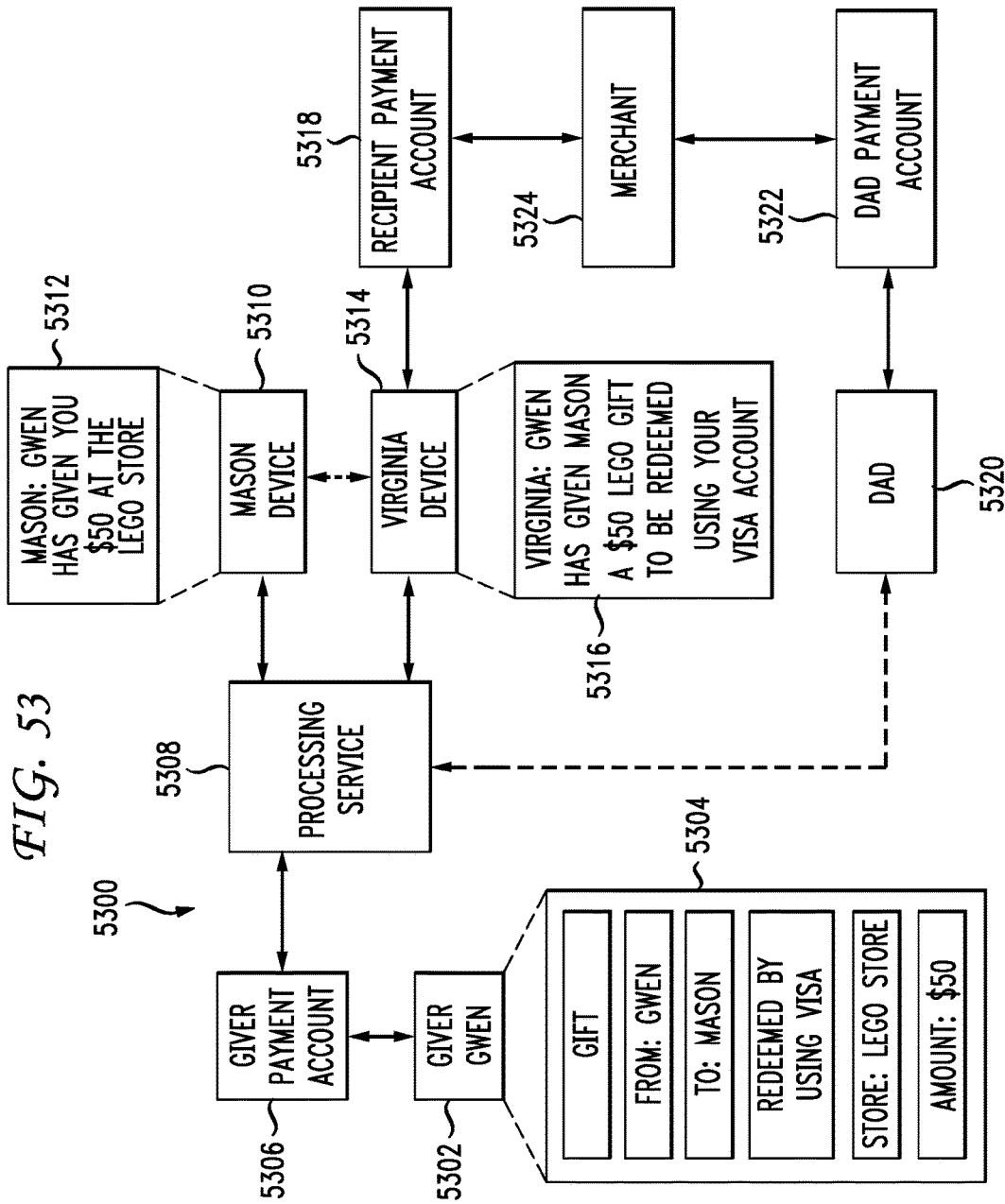
FIG. 53 illustrates an example system for providing a "child" based gift credit.

Mason in this example does not have a debit/credit card account but has access to devices, such as smart phones, tablet computing devices, or desktop or laptop computers, through which Mason can receive emails, instagrams or other electronic communication. FIG. 53 illustrates the overall system. FIG. 53 illustrates an example system embodiment of a "child" based application. A general system 5300 enables the giving of a gift credit to a recipient who does not have a recipient payment account. In this example, a giver Gwen has giver device 5302 which is used to initiate the process of giving the gift. The giver has a giver payment account 5306 as is typically disclosed herein.

A giver interface 5304 provides the ability of Gwen to be able to provide the basic information to process the gift. In this case, the gift is from Gwen, the recipient is Mason and the mechanism by which the gift is going to be redeemed is through Virginia's Visa account. The store at which the gift if given is a Lego® store and the amount is $50. Interface 5304 can be a general interface which of course can be utilized through an application on a hand-held device or a laptop or desktop computer or any electronic device which enables a connection to the processing service 5308 in the network. In one variation, interface 5304 is a web interface which can be accessed on virtually any web-enabled device from any location. The structure of this gift therefore has several implications. First, three people are involved: the giver Gwen, the recipient Mason, and a third party Virginia that has a recipient payment account that will be used to redeem the gift. The system may utilize social networking or family relationships or other mechanisms to interconnect recipients such as Mason with other third party individuals that have recipient payment accounts. For example, if Virginia is Mason's mother, then it makes sense for Mason to receive the information about the gift credit but that its redemption is through a payment account that is utilized by a separate individual. In one variation, the giver indicates the third party. In another variation, the giver provides the gift to the recipient, after which the recipient selects the third party. In yet another variation, the giver selects the recipient, and the system analyzes the recipient's social network, familial, or other connections, or a gift redemption history for the recipient, to suggest a group of possible third parties to the giver. Then the giver can select one from the group of possible third parties.

Once the processing service 5308 has the necessary information, the various notices and policies can be set up in order to affect the transfer of the gift. For example, Mason's device 5310 can receive a notification of the gift through an email, a text, a social networking communication, or other notification. The notification can be something like what is shown in window 5312 which states Mason: "Gwen has given you $50 at the Lego store." Other instructions of course could be provided such as: "this gift if redeemable through your mom's Visa account. Accordingly, let your mom know that when she spends $50 at the Lego store that that money will be paid or reimbursed by Gwen."

On a third party device, Virginia's device 5314, a notification could be provided in a window 5316 which can provide such information as the following: "Virginia: Gwen has given Mason a $50 Lego gift credit to be redeemed using your Visa account." The recipient payment account 5318 of course is associated with Virginia. In one variation, the system notifies the third party of the gift prior to notifying the recipient, and requests confirmation or acceptance from the third party. For example, if the third party is unwilling or unable to serve in that role for the recipient, the third party can reject the request, forcing the giver, system, or recipient to select an alternate third party. The system can wait to send the recipient a notification of the gift until the third party has been approved, or can notify the recipient of the selected third party and indicate that the third party has not yet been confirmed and may change. The recipient or the third party can establish preferences or settings in advance for automatically confirming gifts for particular recipient/third party combinations, such as a mother establishing a setting to always approve requests to be a third party for any of her children.

Accordingly, in this case, the policy that the system establishes (for enabling the processing of this gift credit) would be similar to what is disclosed herein with the addition of other notifications of communications to Mason. For example, the policy would involve initiating the monitoring of uses of the recipient payment account 5318 to track for a purchase at a Lego store according to the policy. Once a purchase is made at the Lego store, then $50 is applied from a giver payment account, a holding account, or some other mechanism to handle the contribution from Gwen for that gift. Notifications of course can be timed or coordinated between Mason's device 5310, Virginia's device 5314 and Gwen's device 5302 in order to make the gift giving experience more enjoyable. For example, once a purchase is initiated at a Lego store according to the recipient payment account 5318, a FaceTime™ or visual communication session could be established between Gwen's device 5302 and Mason's device 5310 such that Gwen can personally view Mason at the Lego store while a purchase is being made. Any type of communication such as text, email, teleconference (such as between any of the 3 devices) and so forth could be initiated based on the qualifying purchase from the recipient payment account 5318. Furthermore, in connection with the policy, location-based services could also be used to initiate a social networking communication between the parties in this case. For example, the policy could not only affect monitoring purchases made by the recipient payment account but also monitor the location of at least one of the parties to initiate communications. In this case, if Mason and Virginia were to go into a Lego store and the location based tracking of Mason's device indicated that he was in the vicinity or within a Lego store, then the processing service 5318 could initiate a communication between Gwen's device 5302 and Mason's device 5310 such that they could communicate (in any manner) and talk or text about Legos even before the initiation of a purchase made by the recipient payment account. In this case, since this particular embodiment may typically focus on giving gifts to children, the giver or other parties could also participate in the choosing of which Lego set Mason desires prior to its purchase.

In addition, any party to this transaction could also add other parties so that other people can join in to the discussion and the social experience, for example, if other cousins or brothers or sisters or aunts or uncles need to be part of the conversation, the system could include a group of individuals that are associated with this gift such that a triggering event, such as a location position of a device, the initiation of a purchase by the recipient payment account, and so forth, could initiate a multi-person video conferencing call or audio conference or group text or email to initiate communication by a number of people. Therefore, as Mason enters a Lego store, it is possible within this system to initiate a call in which Mason answers his phone 5310 and 5 people are on the call congratulating him on redeeming the gift and having a Happy Birthday. Thus, the system disclosed in FIG. 53 can be utilized for not only enabling a financial transaction between three people but could also be utilized to initiate social networking experiences. The social networking experience can be extended into a game or treasure hunt, as well. The giver, Gwen, can record audio, text, or video messages for Mason, and tag them to specific locations, so that when Mason and Virginia are both in those locations in the store, Mason's device or Virginia's device can automatically play the recorded audio, text, or video message. For example, Gwen can make a video recording and associate it with a particular location, store, or item within a store, such as a Lego Death Star. Then, when Mason comes within 10 feet of the Lego Death Star, or lingers for more than 30 seconds within a certain distance of the Lego Death Star, or meets some other location or proximity criteria, Mason's device can automatically play the video recording, in which Gwen may comment on the particular item or give advice to Mason.

In another social aspect of shopping online to redeem a gift, Mason and Virginia may be browsing a merchant website, and the system can broadcast screen captures of their device to Gwen or to other parties. The system can also record audio or video of Mason and Virginia as they browse the merchant website, so Gwen or the other parties can see the facial expressions and hear the discussions of Mason and Virginia as they are shopping online.

As with the other policies disclosed herein, if the purchase made is less than $50 and an unused portion of the gift, or unused money, remains on the account, then the system could provide reminders, additional bonuses, added value, and so forth via emails or notifications to Mason's device 5310, Virginia's device 5314 and/or Gwen's device 5302. These can also be tailored to be individual notifications as might be desired. For example, within a month after the purchase which left $15 on the gift, Mason may only receive a reminder of that amount with information about a new Lego set that is now available for that amount or slightly more with the offer that the Lego store will pitch in the extra $5 to buy a $20 set and to simply let his mom know that if she uses her payment account to make the purchase, then the additional $5 will be offered.

Figure 54:
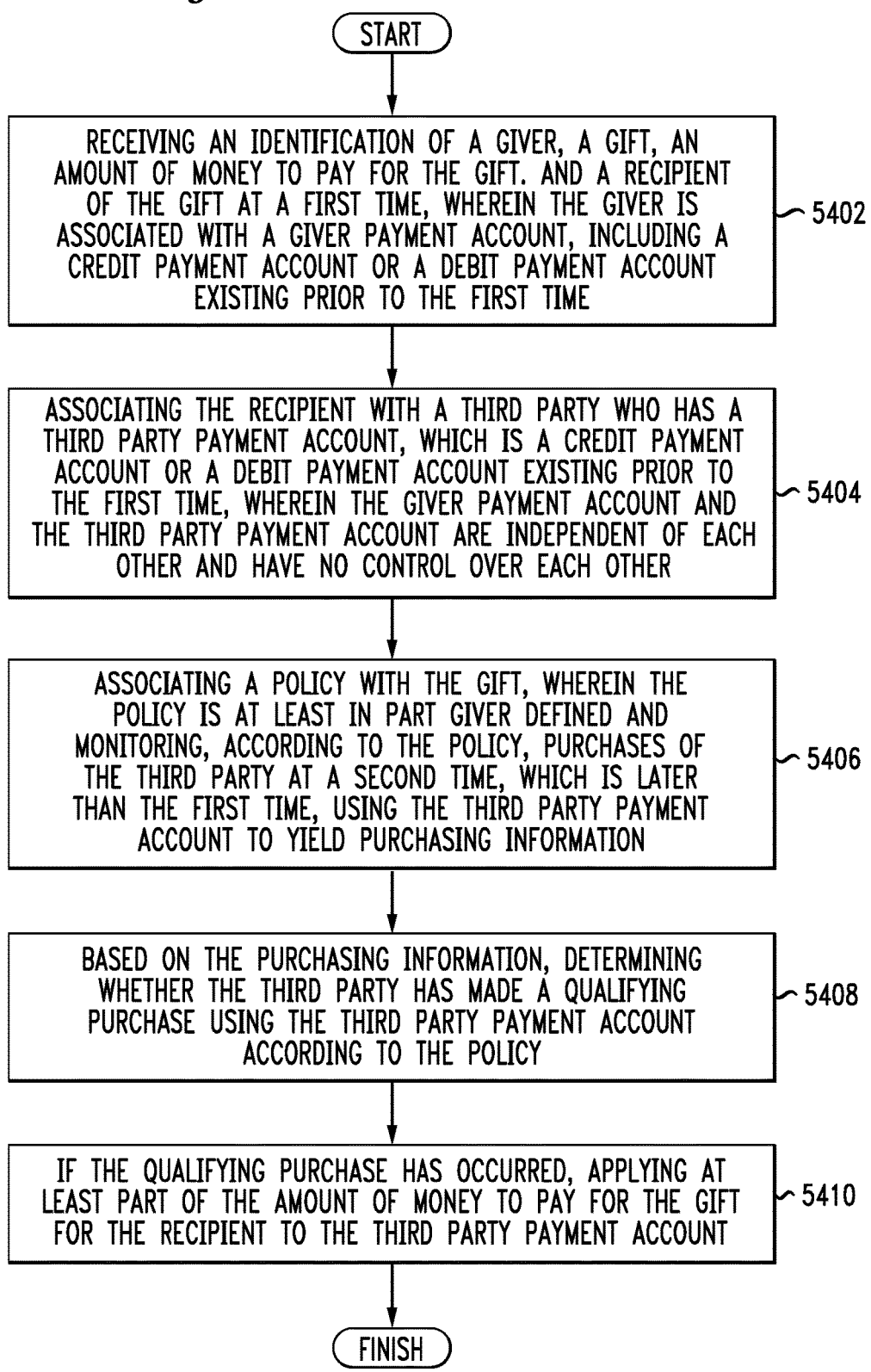
FIG. 54 illustrates an example method embodiment of a "child" based gift credit.

An example method is shown in FIG. 54 which includes receiving an identification of a gift giver, a gift, an amount of money to pay for the gift, and a recipient of the gift at a first time, wherein the giver is associated with a giver payment account, including a credit payment account or a debit payment account existing prior to the first time (5402). The recipient is associated with a third party who has a third party payment account, which is a credit payment account or a debit payment account existing prior to the first time. The giver payment account and the third party payment account are independent of each other and have no control over each other (5404). The system associates a policy with the gift, wherein the policy is at least in part giver defined and monitors, according to the policy, purchases of the third party at a second time, which is later than the first time, using the third party payment account to yield purchasing information (5406). Based on the purchasing information, the system determines whether the third party has made a qualifying purchase using the third party payment account according to the policy (5408) and, if the qualifying purchase has occurred, applies at least part of the amount of money to pay for the gift for the recipient to the third party payment account (5410).

In one aspect, the method includes initiating, at the first time, a transfer of at least part of the amount of money to pay for the gift from the giver payment account to a holding account that is separate from the third party payment account, wherein applying at least part of the amount of money to pay for the gift for the recipient to the third party payment account includes transferring the at least part of the amount of money from the holding account to the third party payment account. The gift can be associated with a group of third party payment accounts. In the example of a child recipient, the group of third party payment accounts can include a mother's payment account, a father's payment account, and an older brother's payment account, optionally subject to approval by one of the mother or the father so that the older brother does not accidentally or unintentionally redeem the gift without the recipient being present. In another aspect, the money for the gift remains in the giver account until a triggering even such as a location-based event or a purchase is initiated, or a purchase is completed. Various communications can also be initiated by virtue of triggering events associated with the policy. In other words, the policy in this case can include people and various triggers (like a location based trigger for the recipient device which causes the initiation of a social networking or conference communication).

In connection with the processing of a gift to a recipient that does not have a recipient payment account, another aspect of this disclosure is that ability of such a recipient to be able to trade or make modifications to their gift. As disclosed herein, there are a number of mechanisms by which recipients can re-gift, add to, top up, chop up, and so forth their gifts. All of these capabilities would be available to a recipient 5310 of a gift in which that recipient does not have a particular payment account. In each case, that recipient would be able to have those gifts redeemed using a separate recipient payment account 5318. In addition, however, the recipient 5310 or the third party 5314 might also be able to further modify the policy and processing of the gift.

For example, shown in FIG. 53 is another person, Dad 5320 that has a dad payment account 5322. Assume that Mason happens to be shopping with his dad at the mall and they see the Lego store and desire to redeem the account. A mechanism could be provided in which Mason is associated with a number of recipient accounts which are modifiable according to guidelines or restrictions. For example, Mason may receive a gift credit that is redeemable through Virginia's payment account 5318 but he may have the opportunity or ability to also redeem all or part of the gift through dad's payment account 5322. In this case, Mason could use his device 5310 to communicate with the processing service 5318 and utilize a gift management application to select a different recipient payment account for use in redeeming his gift. Restrictions could be placed on this such as only a part of the gift can be redeemed through payment account 5322. For example, Mason may only be able to have half of that gift redeemed through his dad's payment account 5322 or no restrictions may apply at all. Of course, the system can also send notifications to the various devices if such changes occur and perhaps need to be approved by Virginia.

In such a case, the appropriate modifications could be made such that the policy now monitors purchases using the dad payment account 5322 at which point if Mason and his dad are at the Lego store, and the dad makes a purchase using the dad payment account 5322, that the appropriate amount of money is applied to that gift and it is thus in part or fully redeemed. Such changes can be made retroactively to apply to already completed purchases as well as processing and monitoring current purchases.

In addition, as noted above, Mason could engage in an application in which he could trade his gift money from one account to another. For example, he could change his $50 Lego gift credit to an iTunes $50 gift credit if that is authorized by the system. Furthermore, he may want to trade his $50 gift credit with a friend or a sibling who has a $60 iTunes card from Gwen. Such trades could also be envisioned through this system between children in which they enter into an environment in which they can make offers and counteroffers and trade their gift credits amongst others at which point the various changes would be made once deals are established. For example, if Mason trades a $50 Lego gift credit for a $60 iTunes card, then the policy associated with Mason's gift would therefore change such that the policy then would involve $60 and the merchant would be the iTunes store and purchases at the iTunes store would be monitored through the recipient payment account 5318. As can be seen, this mechanism enables children or anybody without a recipient payment account to be associated with people who have payment accounts and enable them to receive, manage, trade, modify and so forth gifts received in a way that is fun and easy and in a way that encourages social interaction and increases purchases made at participating merchants.

A secondary aspect of the "child" based gift credit is to have a credit waiting at a store once the child receives a notification of the gift credit electronically. When the child identifies themselves at the store, the credit can be applied. For example, returning to FIG. 53, if Gwen 5302 gives Mason a $50 gift credit at the Lego store, then there may be a number of different mechanisms for Mason to be able to identify himself at the store. One example is that Mason's device 5310 has a location-based system in which when he walks into the store, an application is initiated, or a notification is sent such that the identification can be made. For example, a merchant system can notify a clerk at the store that Mason is in the store and has a $50 gift credit. This ability to provide such a notification can be done through a mobile device such that it becomes easy and enjoyable for Mason to be in the store. In other words, Mason can walk in the store, the clerk can receive the notification and then simply say "Hi Mason, are you here to redeem your $50 gift credit?" Then, the credit can be essentially already applied for the purchase. The $50 amount could have been withdrawn from the giver's payment account 5306 and kept in a holding account or already applied to the store such that no credit or debit card or cash needs to be even processed as part of a financial transaction. Further, if a $55 dollar Lego set is purchased, then the remaining amount only need to be paid to complete the entire transaction. The notification from the processing service 5308 to Mason's device 5310 of course can be modified to simply say "Gwen has given you a $50 gift credit to the Lego store. Simply bring your iPhone to the store and the store will be notified that you are there and help you redeem your gift. Enjoy!" This can provide a simple mechanism for a child to redeem the gift independent of a third party payment account. This approach can include some additional identity verification, such as a photo of the recipient, a secret password, or PIN transmitted to Mason, so that the store can attempt to confirm that Mason is bearing the iPhone. This approach can prevent a malicious sibling or other party from bringing Mason's iPhone to the store to redeem a gift intended for Mason.

In one aspect, the giver 5302 can choose the method of redemption, i.e., the giver can establish the policy which is going to cover the redemption of that gift. The policy could be to redeem the gift at the store by the recipient. The policy could include redeeming the gift by use of one or more recipient payment accounts. The processing service 5308 can have that various information already pre-established for the particular recipient. Therefore, when Gwen chooses Mason as the recipient, then the system can already have configured the various possible ways in which Mason can be given the opportunity to redeem that gift. Therefore, Gwen can choose amongst those possibilities in formulating and structuring the gift for the recipient. In this way too, the giver, who likely know the recipient very well, could tailor the redemption of the gift in a manner which is most beneficial perhaps to the recipient. For example, if Gwen knows that Mason needs to spend some time with his dad, then she can structure the giving of the gift such that it has to be done through dad's payment account 5322 without the ability or the flexibility of changing which payment account is to be utilized for the redemption of that gift. Therefore, such a structure can be used to improve a family interaction and enable enjoyable family interactions. In another variation, Gwen can impose other limitations on the gift, such as a multiple transaction requirement, so that Mason and his dad must make at least two separate trips to the Lego store on two separate days prior to making the purchase to redeem the entire amount of the gift credit.

A third aspect is to have the credit loaded associated with a gift credit onto an application or an account that is released when a mobile device is within a Geo fence of a retail location associated with the policy. The mobile device or an application can be interacted with by the retailer such as via a scan or another means and the credit is used for a purchase according to the policy. Thus, for example, in this third aspect, the mobile device 5310, when it enters into the geo fence of the retail location, could automatically generate a QR code or a barcode that a retail clerk could scan or receive via other means which can be used to purchase the product. In other words, the money that is associated with the gift could be loaded into a separate gift credit account which is then associated with that QR code or symbol at which point at the retail store. The recipient, Mason in this example, utilizes the device 5310 to actually make the purchase as though he had a physical gift card. Once that purchase is made, it would be processed in a similar way to having received a closed loop physical gift card for that Lego store.

Of course in this process, the giver Gwen could also structure a gift to the recipient in such a way as to make the gift specific to a kind of purchase rather than a particular store. For example, Gwen may give Mason a $100 gift credit to go toward a bicycle at which point further interactions may involve triggering an application when he enters into a geo fence of a retail location that sells bicycles and furthermore initiating a social interaction in which if a bicycle is actually purchased at that store (many other products are likely available as well), then Gwen could approve of unlocking the gift credit at which point the QR code or other code could be presented which is capable of being used by the retail location in order to make the purchaser apply the gift credit to the purchase.

Similarly, the gift to Mason could include a $50 gift credit for groceries at which point the geo location could be considered as any grocery store at which point the system triggers or releases the money in the account and enables the recipient to utilize their mobile phone in order to actually accomplish a financial transaction in which that money is available.

Accordingly, in this aspect of the disclosure, a holding account or a gift credit account can be established but held and not released and available for use until a triggering event occurs in some manner associated with the recipient or recipient device. The triggering event may be multiple events such as the recipient going to several geo locations in a particular order that then would trigger the release and availability of the funds. The funds may be held in the giver account. The release and availability of the funds in these cases occurs electronically such that an actual purchase can be made either in a closed-loop or partial closed-loop case or even in an open-loop case. For example, the gift might be $100 once Mason spends 10 hours in the library during the week studying. The system could then monitor using location based services of the device to see if the conditions of the policy are established at which point the gift credit can be released and the money becomes available for use utilizing the mobile device 5310. In another aspect, the processing service 5308 could monitor the triggering events associated with the recipient device 5310 at which point a physical gift card could be mailed out to the recipient so that they actually have a standard physical closed-loop or open-loop gift card for use as they desire. For example, Gwen may desire to give Mason a $100 gift credit for use at Disney Land if Mason is in class every day at school for the month of April. If the geo location indicates that Mason has achieved the terms of the policy, then the system automatically mails out a Disney Land gift credit to Mason for use on his trip during the summer. Gwen can set up a hierarchy of gifts so that when the criteria for a first gift are met and the gift card is mailed out to Mason, the system automatically engages a second gift and notifies Mason of the next requirements. In this way, the incentives can be chained together so that earning one gift unlocks a next gift.

Accordingly, in this aspect, where the recipient does not have a recipient payment account that is to be used to redeem the gift card, a blending of an "in the cloud" solution with a physical solution can be implemented to increase the enjoyment and benefits of gift cards is disclosed herein.

Transactions Without Coordination of Credit Issuing Company

Figure 55:
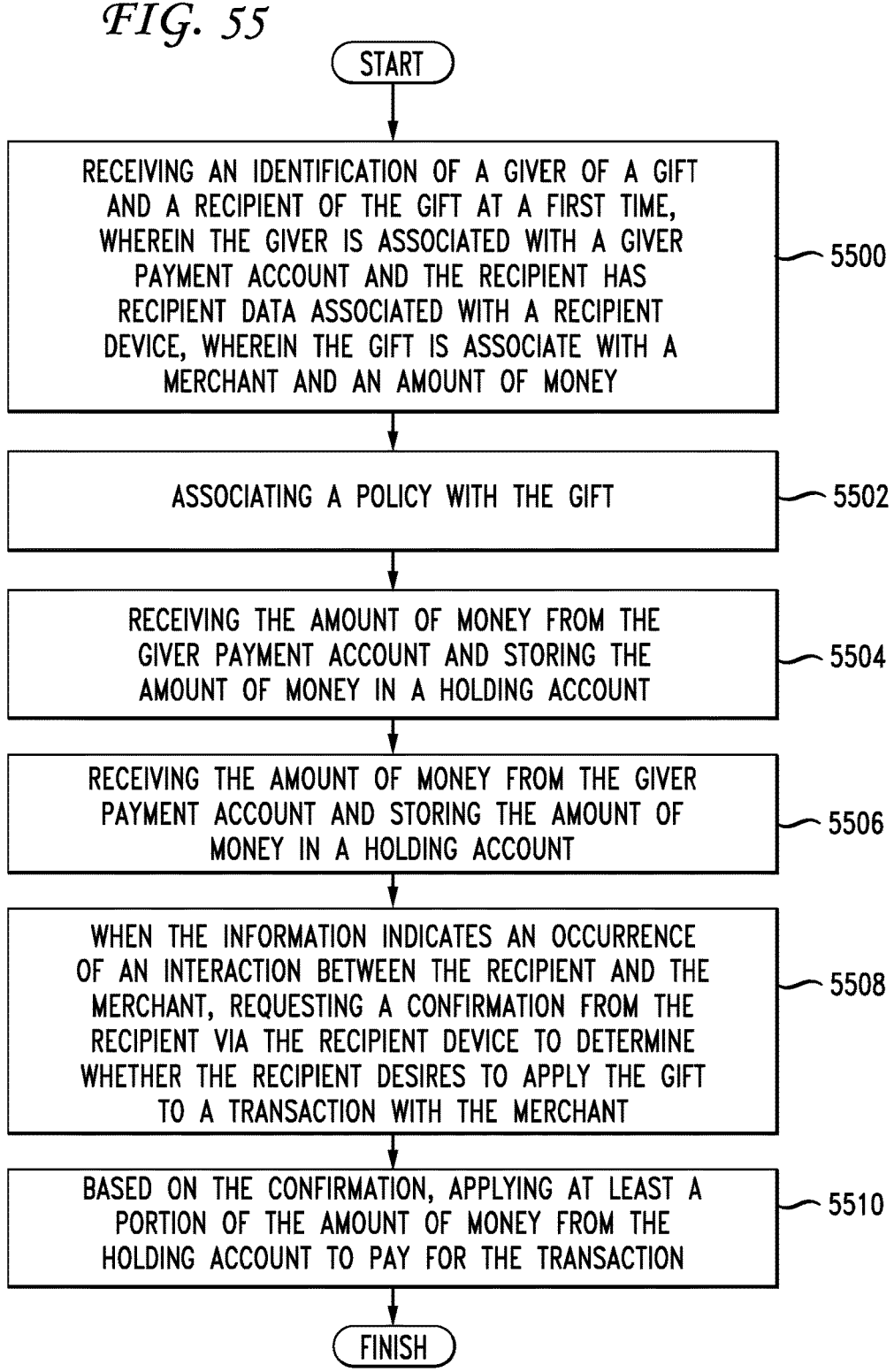
FIG. 55 illustrates an example embodiment related to an approach that does not require coordinate with a card issuing company.

This disclosure now turns to the primary subject matter covered in the claims. An example method embodiment is shown in FIG. 55 and includes receiving an identification of a giver of a gift and a recipient of the gift at a first time, wherein the giver is associated with a giver payment account and the recipient has a recipient number associated with a recipient device (5500). This number can be a phone number, picture, alphanumeric string of characters, or characters associated with the recipient device. In one example, the giver can choose a recipient by selecting their phone number, a dollar amount (say $50) and a merchant, such as Olive Garden. The system associates a policy with the gift in which the policy references and includes at least the merchant and the amount of money (5502). The system receives the amount of money from the giver payment account and stores the amount of money in a holding account (5504) and monitors, via a processor of a computing device, for interactions between the recipient and the merchant. In one embodiment, the monitoring occurs via a geolocation of the recipient device using an application on the recipient device, at a second time which is later than the first time to yield information (5506). In one aspect the system does not withdraw the funds from the giver payment account but the finds remain there and it becomes the holding account.

Based on the information, and when the information indicates that the recipient device is at the merchant geolocation, the system requests a confirmation from the recipient via the recipient device to determine whether the recipient desires to use the gift at the merchant (5508). The "qualifying purchase" is thus made but monitored in a different manner than disclosed above in that it is not directly monitored based on the use of a payment card. The interaction with the user and/or the merchant indicate that the qualifying purchase has occurred. The data on the transaction can be reported from the merchant and not monitored based on credit card company or bank account transactions. In one case, the recipient may not have made a purchase or may not want to have the gift apply at that visit. The recipient can control whether the amount of money or a portion thereof is applied.

The system receives a confirmation that the recipient desires to use the gift at the merchant (5510) and receives from the merchant (or the user or other source) a confirmation of a transaction using a recipient payment account that existed prior to the first time, wherein the recipient payment account is independent of the giver payment account (5512). The system then transfers or applies at least a portion of the amount of money from the holding account to redeem the gift (5516). The money could be transferred to a merchant account, wherein the merchant credits the recipient payment account using the at least a portion of the amount of money. By way of the example above, the recipient may have spent $25 at the Olive Garden and confirms that they would like the gift card to apply. The system would provide a payment of $25 to the Olive Garden or directly to the card company associated with the recipient payment account. When the payment goes to the Olive Garden, then they can automatically or manually credit the recipient payment account for the amount of the gift used.

The processor can communicate with the recipient via an application on a smart phone. The application manages the communications such that when a geolocation connects with a policy, the system "pings" the application and a notification comes up for the user to notify the user of the gift and to inquire about whether the user would like to apply the gift. This moment provides an opportunity to interact with the user at this stage for both the merchant and/or the gift credit processor. When the recipient accepts the gift via communication with a text message or via an application or any other mechanism, the recipient may also agree to other terms such as providing permission to utilize the recipient's name, address, contact information (email, phone number, twitter account, etc.) to accomplish the giving of the gift. If the recipient indicates via the interaction that they desire to use the gift at the merchant, the system can time stamp a record associated with the gift and then "ping" or communicate with the merchant at some point about the gift and seek confirmation of the transaction. If there is a match, i.e., the record shows that the recipient did purchase a $25 meal at the Olive Garden, then the gift can be redeemed as disclosed herein such as by the merchant crediting the card used by the recipient for the qualifying purchase. In this manner, other than a few interactions, the recipient still makes the purchase in their normal fashion. The actual flow of money could occur where $25 is directly deposited into the recipient payment account (whether associated with the card used for the purchase or not) or the payment could transfer money to the merchant who then credits the card of the recipient that was used in the transaction. Communications to the recipient can occur during this time, especially if the recipient needs to sign something to receive the credit. Another embodiment of the application would provide a user interface by which the recipient could interact with the system as the recipient decides how to apply the gift. For example, through the application, the recipient links non-related accounts, which include but are not limited to credit card accounts, utility accounts, telephone accounts, loan accounts, online video streaming accounts, online music streaming accounts, internet service provider accounts, cable or satellite television accounts, and any account to which a recipient makes regular payments. Via the user interface, the application displays the transaction information. After the recipient, through the application, confirms that they are applying the gift to the transaction, the application presents to the recipient options for applying the gift. The recipient could apply the money credited back directly to the transaction through the merchant or the credit card issuing company as previously disclosed, or the application provides the options of applying the money to one of the non-related accounts or a combination of the non-related accounts to which the recipient linked through the application. This provides the recipient an ability to pay other bills with the money credited back.

The application could further provide a method for prioritizing the non-related accounts in a manner that would help the recipient to intelligently apply the gift to an account. This could include arranging them according to predetermined criteria. For example, the recipient is redeeming the $25 he spent at Olive Garden and the application is prompting the user with the different options for applying the $25 credit. The recipient previously linked his credit card account, Netflix account, and Verizon account to the application. The application, based on an algorithm, arranges the accounts according to priority. The criteria for priority include but are not limited to payment due dates, interest rates, amount due, etc. In this example, the recipient has a payment due on his Verizon account whereas his other accounts are not due for another week, so the application suggests paying into the Verizon account. The recipient then chooses the account or accounts to which he would like to apply the $25 credit. The system then transfers $25 from the holding account to the user-specified account or accounts.

Another service the application can provide includes a list of each gift, the merchant with which the gift is associated, and the amount of money or a remainder amount, which amount will be further disclosed in ensuing paragraphs. With this list, the application could then integrate information from the merchants into the list of the gifts, merchants, and amount of money. Such information includes but is not limited to current promotions, daily specials, and events. For example, the recipient has a remainder amount of $25 from a gift to Olive Garden. The application can display information next to the gift associated with Olive Garden that Olive Garden currently is holding a promotional offer of two entrees for the price of one. This allows the recipient to access the application in order to see a comprehensive list of all the gifts and special offers that are currently relevant to the recipient. In all embodiments of the application specified, the application is not limited to an application on a cell phone, but could be an application on a cell phone, tablet, personal computer, or could be a web-based application or communicated via text or email.

In the event that the recipient device is not capable of being monitored for a geolocation or the recipient opts out of using the application on the recipient device through which a geolocation is monitored, the system "pings" or communicates with the merchant on a periodic basis requesting a name, an address, and a transaction with which the recipient is associated. If the merchant finds a transaction associated with one of the name and the address, the system then sends a text message or email to the recipient to confirm the transaction as well as to inquire about whether they would like to apply the gift to the transaction. Once the recipient has confirmed that they would like to apply the gift to the transaction, the system proceeds to credit the accounts in the manner disclosed previously.

Other aspects of this embodiment include the following. The system can apply at least a portion of the amount of money by transferring at least a portion of the amount of money from the holding account to a merchant account or other account such as directly to the recipient account. The merchant if they receive the transfer, can credit the recipient payment account using the at least a portion of the amount of money from the merchant account. The at least a portion of the amount of money can be less than the amount of money to yield a remainder amount. If so, then as disclosed above, the remainder amount can be maintained or transferred immediately or after a period of time to any one of the giver payment account, the recipient payment account, or another account. The remainder can be split between several accounts as well according to the policy. A transfer fee could be extracted from the remainder amount before transferring the at least part of the remainder amount. The transfer fee can be one of a flat fee and a percentage of the remainder amount. The transfer fee can be based on an amount of time occurring between a qualifying purchase by the recipient and transferring the at least part of the remainder amount.

The at least a portion of the amount of money can be less than the amount of money to yield a remainder amount, in which case the method further can include transferring the remainder amount from the holding account to one of the giver payment account and the recipient payment account. Transferring of the remainder amount can occur if no additional qualifying purchase occurs after a predetermined amount of time has passed since a qualifying purchase. The giver can specify in the policy or elsewhere the predetermined amount of time.

Before transferring the at least part of the remainder amount, the method can include transmitting an offer to the recipient, in association with the qualifying purchase, to apply the remainder amount to the recipient payment account for a fee, receiving from the recipient an acceptance of the offer and charging the fee to the recipient payment account. The system, according to the policy, can also notify the recipient of the amount of money or the remainder amount of money in the account after a predetermined time-period has passed. This helps to inform the recipient of the funds that are available to use at the various merchants. For example, the policy could specify that the system will notify the user of the gift if after two months the $25 gift to Olive Garden sits in the holding account untouched. The policy could also specify that the system will continue to notify the user of the gift on a periodic basis until the recipient redeems the gift or the remainder amount. The notifications can be in the form of a text message, a notification via an application on a smart phone, or an email.

Automatic Identification of Giver Groups

A group of friends may be in a group setting and which to each contribute a portion to a shared gift from one set of the group to another an individual or other group of individuals in the group. Several examples and variations are discussed to illustrate these principles. These examples assume that everybody in the group is enrolled in a gift system, such as by signing up for an app and providing their credit/debit card information. An account with the gift system can then store this information in respective user accounts. The system can automatically look at social groups, based on 'friend' relationships on a social network, email communications, or other indication of a social group, and location data reported by people in the social groups. For example, a group of 5 friends have smartphones and can download and install a gift app. Instead of smartphones, the friends may have any other suitable device for reporting location data to the gift system, whether through an app, a service, daemon, web page, or other mechanism. If some of the friends do not have the app beforehand, they can install the app and enroll, register, or create an account with the gift system on the spot. Part of enrollment can include linking one or more social network profiles. Then the gift system can tap into social network profiles and look at friends or social connections to determine if they are also signed up with the gift system.

Then, if you go to dinner with 5 friends, each friend's phone or app reports a location to the gift system, which can identify and pre-create a group based on location-based services and the social networking data. Thus, while the 5 friends are sitting down to eat dinner at a restaurant, each of the friends has their smartphone or respective devices. If one of the friends opens up the dinner payment app, the gift system can automatically identify those friends at the table using location-based services on the fly, or can retrieve the pre-created group. The system can further incorporate a certainty threshold based on similar patterns of movement and inactivity, how long the group is together at the same location, how physically close they are to each other, calendar events, discussion of the dinner on social media, and so forth. The app can include a button for a user to indicate "I'm paying," and can optionally provide further information such as a title of the event, a password for others to join, pre-approve members of the group, send notifications, records, or receipts to the group, and so forth. Then the other friends open the app on their corresponding devices to indicate that they are contributing their portion to the payer. If Tom arrived first at the restaurant and indicated "I'm paying," then as other people arrived or opened their app, the interface of the app can change to provide them a description of the group, Tom's Olive Garden dinner. If Jane opens the app at dinner, the app can display "Tom's Olive Garden group." Jane can join the group and contribute to the meal by simply opening the app, which is be preconfigured or prepopulated for her to simply enter an amount for her portion of the meal. Everyone else in the group can do likewise via the app to contribute their portion of the meal. In one variation, the payer can scan or snap a photograph of the receipt, which the gift system or the smartphone can perform optical character recognition and/or parse to identify specific items in the receipt and their associated costs. In this way, a user does not have to enter an amount, but can simply identify which items he or she consumed, and can optionally enter a percentage of a single item, such as if two users split a large order of fajitas.

In a busy restaurant, multiple potential social groups may exist to which a user may belong. When the system is unsure of which group a user should be associated with, the app can provide a menu or a foyer of available groups, and prompt the user to select one to join. The menu can provide information such as a time, name, who is paying, who else is in the group, and so forth.

Further, the gift system and apps can provide an extra automated interface for specific events, such as a birthday of someone in the group. The system can automatically detect when someone in the group has a birthday and either automatically switch to a birthday mode or prompt one of the users, within the app or via an extra-app notification, about the birthday. The birthday recognition can be applied on an exact day or within a window of days, such as one week before and one week after a birthday. When 5 friends go to a restaurant within one week or two weeks or within some temporal threshold of one of the friend's birthday, the gift system and/or the app can automatically adjust. For example, the app can present an option based on an assumption or prediction that everybody is there to celebrate this person's birthday and that the friend having the birthday will not be paying. If Tom was paying for the birthday lunch, the app can automatically title the group "Angie's Birthday—Tom's paying" or some similar text indicating the birthday recipient and the paying party. Then, the apps on the devices of the other friends in the group can automatically display options to pay for a fourth of the total cost of the meal at the restaurant. In other words, 4 people would be splitting the meal for 5 people and they could each equally split the cost. In other variations, the 4 people can cover their own meal and a quarter of the cost of the meal of the birthday recipient. These options can be established automatically based on user preferences or can be established by the user paying for the meal, for example. The interface can present that as well as an option where everybody is just paying independently.

The app interface can be very simple. The interface can allow people to have the group preconfigured or potentially add somebody that is at dinner who is not automatically identified as part of the group, such as a user who does not have a smartphone or is not a member of the social network. The app interface can allow for searching for additional participants or manually adding a participant who is not in the search results. For example, one of the friends already in the group, or the payer/creator of the group, can add others to the group. If others are already signed up, the app can locate and identify them very easily. For example, the app or the gift system can generate a PIN number for the friends to enter to join the group. Then that person can use somebody else's smartphone to log in and enter a dollar amount or percentage to contribute to the dinner.

Once the gift system receives all the data from the various apps, smartphones, or web interfaces, then the payer simply pays for the meal as usual, such as by giving his or her credit or debit card to the waiter. The waiter can process the card normally. The gift system can establish a policy where individual people in the group then have $25 or $30 or whatever amount or percentage they indicated automatically contributed to the payment via the payer's credit or debit card. The payer purchases the meal with his or her credit card, the system identifies that purchase for $100, and can initiate a transfer of funds in the appropriate amounts from each of the other participant's accounts to the payer's payment account. The money from each of these accounts can immediately be transferred out and placed into a holding account or the money for each individual person at the table can remain in their giver account in this case until the payer pays. Then the system monitors the payer's account for the payment, and upon identification of the payment, can transfer money from all of the other accounts into my account. Alternatively, the gift system can intercept the purchase, such that only the payer's portion is paid from his account and all the other accounts pay the merchant directly.

The gift system can preconfigure the group for a specific meal so that the members of the group are predetermined, such as via an app and gift server architecture. In one variation, one of the user devices serves as the gift server without needing any additional infrastructure. When users open the app, they can almost vie for the opportunity to actually be the one that handles the payment and they get reimbursed. One of the friends can lock themselves in as the designated person to pay for the meal. Further, a user could even lock themselves in as the designated payer in advance, such as if they know they will be meeting for dinner tomorrow. One person can open the app and volunteer to pay prior to even arriving at the restaurant. As a group is determined, the gift system can establish a social environment for determining who is going to pay. Alternatively, the social environment can assist in selecting people from a social network that are going. The social environment can even block the birthday person from viewing the group, participating in the group in advance (to keep it a surprise), or from contributing to payment via the app. In that case, the payer can open the app, identify the group that is going to be at dinner, identify the person whose birthday it is, and even send a message saying "Happy Birthday, dinner is on us" to the birthday person. Then, when that person opens the app that night or in advance of the dinner, the birthday person sees the birthday message and wouldn't have the opportunity to go in and help pay.

Figure 56:
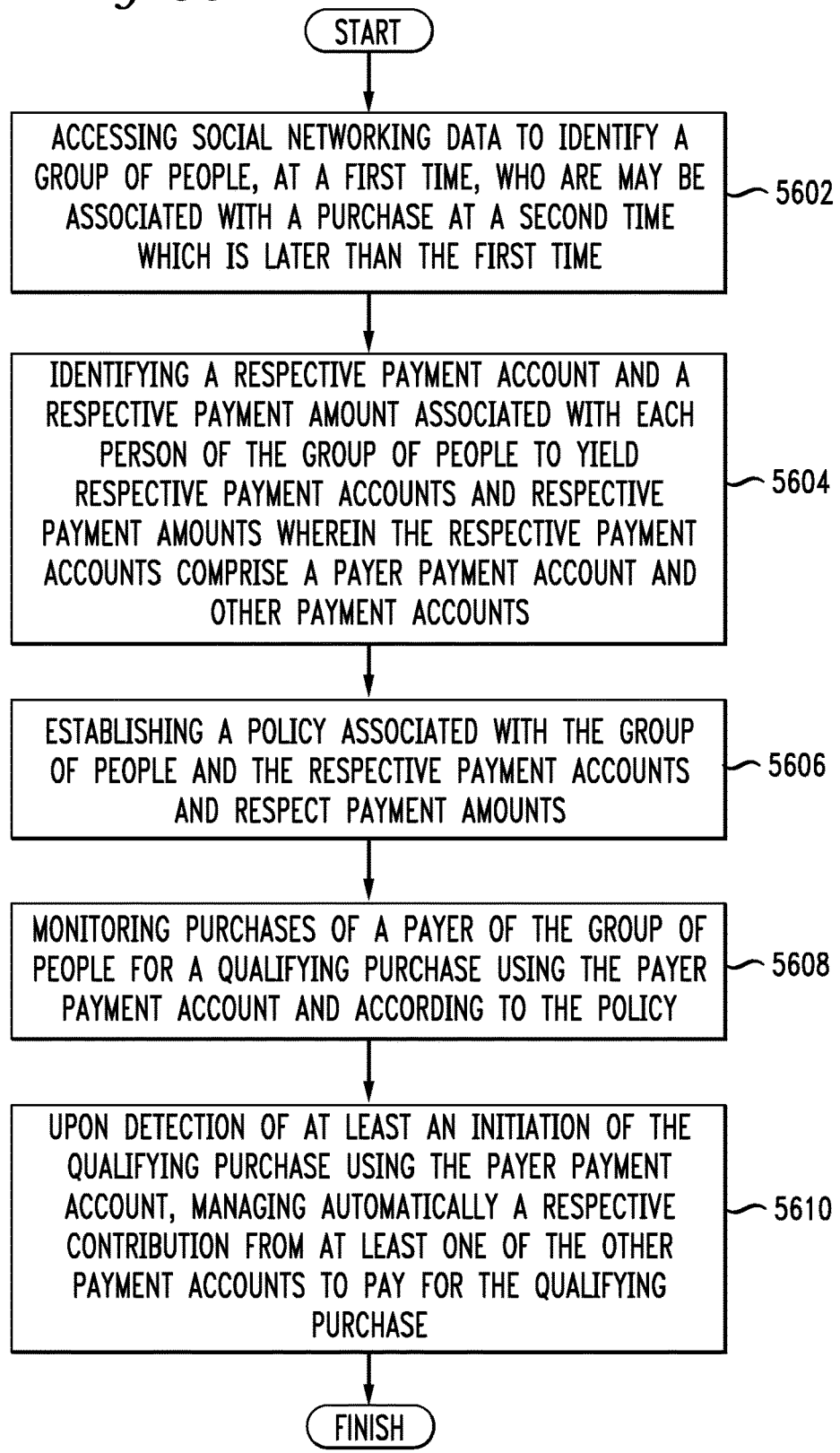
FIG. 56 illustrates an example method embodiment for managing groups associated with a group payment transaction.

FIG. 56 illustrates a method embodiment for managing groups associated with a group payment transaction, and for splitting a transaction among multiple participants automatically based on social network or location data. A system configured to practice the method accesses social networking data to identify a group of people, at a first time, who are associated with a purchase at a second time which is later than the first time (5602). The system can identify the group of people based at least in part on location, social network connection, calendar events, communication logs, or entry of a passcode to join a group, for example. The system can identify the group of people based on location data indicating relative location to each other, which may or may not include absolute location data. The social networking data can identify a person of the group of people who does not have to contribute to the qualifying purchase according to the policy. The social networking data can further identify at least one of a birthday, an anniversary or other special event for a person of the group of people.

The system identifies a respective payment account and a respective payment amount associated with each person of the group of people to yield respective payment accounts and respective payment amounts wherein the respective payment accounts include a payer payment account and other payment accounts (5604). The system can receive, via an application or app on each person's wireless device, data associated with the policy for establishing part of the policy. For example, the data can include a respective person's contribution to the qualifying transaction, an identification of a person to be part of the group of people, and an identification of a person to be excluded from the group.

Then the system establishes a policy associated with the group of people and the respective payment accounts and respect payment amounts (5606). The policy can exclude at least one person of the group of people from contributing to the qualifying purchase, such as a person having a birthday who the rest of the group is treating to dinner. The system monitors purchases of a payer of the group of people for a qualifying purchase using the payer payment account and according to the policy (5608), and, upon detection of at least an initiation of the qualifying purchase using the payer payment account, manages automatically a respective contribution from at least one of the other payment accounts to pay for the qualifying purchase (5610). Managing respective contributions can include the payer payment account paying for an entire price of the qualifying purchase in which the respective contributions from each of the other payment accounts reimburse the payer payment account for a portion of the entire price. In another variation, the system can intercept the payment of the qualifying purchase after initiation of the qualifying purchase using the payer payment account, and cause each of the payer payment account and at least one of the other payment accounts to pay a contribution amount to the qualifying purchase directly to a merchant account associated with the qualifying purchase.

Immersive Gifts and Gift Tracking

Figure 57:
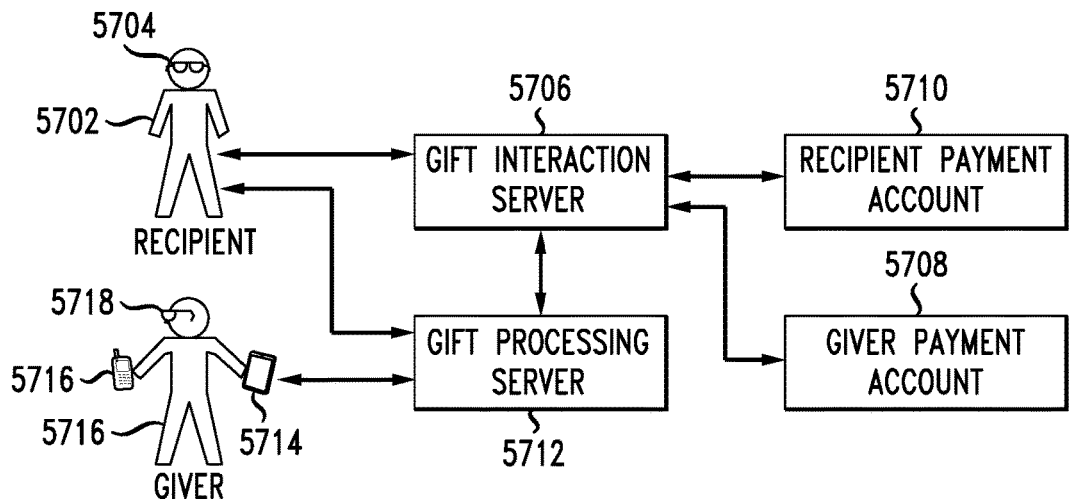
FIG. 57 illustrates an example embodiment of smart glasses as part of an immersive gift environment.

Three separate example embodiments are presented herein for enhancing electronic delivery or redemption of gifts to provide a more immersive experience. Three examples are discussed herein in terms of the example smart glasses illustrated in FIG. 57 as part of an immersive gift environment 5700.

In this example, a recipient 5702 has a wearable electronic device 5704 or other 'intimate' electronic devices, such as smart glasses, Google Glass, clothing with 'smart' components, or a watch. The recipient receives an electronic gift from a gift giver through a gift processing server 5706. The gift is governed by a policy that monitors transactions of the recipient payment account 5710 for a qualifying transaction, and applies funds to the qualifying transaction from the giver payment account 5708. This arrangement can be modified to include various other steps or possible ways of applying funds from the giver payment account to the recipient payment account for the gift.

In the first embodiment, a gift giver of a gift can use the wearable electronic device 5718 or some other device 5714, 5716 to view sample electronic greeting or gift credits. As the giver views the gift or greeting card, the wearable electronic device 5704 can then show the giver a video clip or present some other form of media that the giver wants to be displayed to the recipient 5702 when receiving the gift or greeting card. This information can be sent to the gift interaction server 5712, which governs when and how to deliver the video or other media to the recipient 5702. The recipient 5702 can then also view the video clip or other media when the gift or greeting card is received, upon satisfying some trigger condition such as a geofence or a specific time of day, upon redemption, etc. In one embodiment, the recipient's 5702 wearable electronic device 5704 can automatically present the video or other media to the recipient 5702, or a server can push the content to the recipient's 5702 wearable electronic device 5704. In one example, the gift interaction server 5712 can coordinate with multiple different recipient devices for a coordinated presentation, such as sending audio to a smart phone and corresponding video to smart glasses.

In a second embodiment, when a recipient 5702 of an electronic gift uses his or her wearable electronic device 5704 to view the product associated with the policy governing the electronic gift, the wearable electronic device 5704 can play a message for the recipient 5702 either by itself or according to instructions received from the gift interaction server 5712. For example, the giver buys the recipient 5702 an electronic gift for a watch that is redeemable when the recipient 5702 simply purchases the watch via an associated recipient payment account 5710. The wearable electronic device 5704 can store the message and conditions for triggering the message. Then, as the wearable electronic device 5704 monitors its various sensors and inputs, if the conditions are satisfied the wearable electronic device 5704 can present the message to the recipient without receiving any additional instructions, and can even present the message when no network connection is available. Once the recipient 5702 views the watch, enters the watch aisle at the store, views an advertisement for the watch, or encounters some other trigger associated with the watch, as detected by the wearable electronic device 5704 or an associated sensor or input signal, the wearable electronic device 5704 can display to the recipient 5702 a video clip or other media from the giver. The video or other media can be a recording of the giver or can be selected from a set of already recorded messages, for example.

In a third embodiment, when a recipient 5702 of an electronic gift enters the location of a merchant according to the policy governing the electronic gift, a wearable electronic device 5704 can detect the location of the recipient 5702. Based on the location coinciding with the merchant, the wearable electronic device 5704 can then play a media clip for the recipient 5702 from the giver. For example, the giver buys the recipient 5702 an electronic gift for the spa. The gift system associates the recipient 5702 and the recipient's 5702 payment account with the electronic gift. Then, once the recipient 5702 enters the spa, the wearable electronic device 5704, such as smart glasses, can initiate a video clip that is attached to the electronic gift that the giver created.

These same concepts can be adapted for other electronic devices besides smart glasses, such as smart phones, watches, implanted devices, and so forth. This approach can provide an augmented reality environment surrounding, supporting, describing, and notifying the recipient 5702 of details of the electronic gift.

In one variation, instead of or in addition to triggering delivery of a video or other media, triggering a certain condition associated with the gift can initiate some other activity, such as starting a video recording on smart glasses. For example, if the recipient 5702 enters the watch aisle at the store, thereby activating a trigger, the recipient's 5702 Google Glass can automatically begin recording video of when the recipient 5702 first sees the watch, and his or her reaction thereto, the decision process, and so forth. This video can be recorded and saved for later viewing, or can be immediately broadcast to devices 5714, 5716, 5718 of the giver or other parties designated by the giver or the recipient 5702. In one example, the recipient can agree to submit the video to the watch manufacturer, the merchant, or the electronic gift processing entity via the gift interaction server 5712 for use in promotional or advertising purposes in exchange for a larger gift amount or as part of an entry into a contest. The video of the moments leading up to the purchase can be edited by the recipient 5702 prior to broadcasting or posting the video for others to see on a website or social network.

Figure 58:
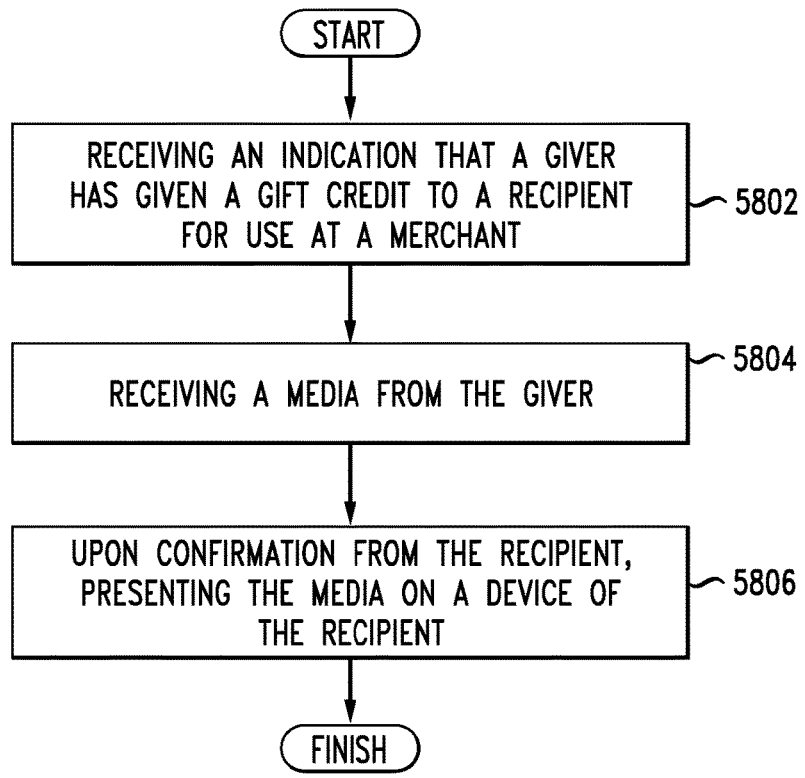
FIG. 58 illustrates an example system embodiment of an immersive gift environment.

Having disclosed some basic system components and concepts, the disclosure now turns to the exemplary method embodiment shown in FIG. 58. For the sake of clarity, the methods are discussed in terms of an exemplary system configured to practice the methods. The steps outlined herein are exemplary and can be implemented in any combination or order thereof, including combinations that exclude, add, or modify certain steps. A first example method embodiment includes receiving an indication that a gift giver has given a gift credit to a recipient for use at a merchant (5802), receiving a media from the giver (5804), and, upon confirmation from the recipient, presenting the media on a device of the recipient (5806). The device can be part of glasses worn by the recipient. A second example embodiment includes receiving an indication that a gift giver has given a gift credit associated with a merchant to a recipient, presenting on a device associated with the recipient information about a gift associated with the gift credit, and following the presenting of the information, presenting a media event created by the giver. A third example embodiment includes receiving an indication that a gift giver has given a recipient a gift credit at a merchant, monitoring a location of a device associated with the recipient, and, when the device is at a merchant location associated with the merchant, presenting a media clip associated with the buyer on the device.

Wearable or other devices can be used to track which gifts were received from which givers. For example, when a recipient redeems a gift by making a qualifying purchase under a policy using his or her recipient payment account, the system can track that transaction and flag the item purchased. The system can associate the giver with that item. Then, the recipient can later query the system, such as by looking at the item via a wearable computing device, to which the system can respond by displaying the giver, the date of the gift, the gift amount, the gift occasion, any notes from the giver, and any other available metadata describing the gift. The system can also display this information via an online portal or a database on a smartphone app, for example. This can allow the recipient to easily recall which gifts came from whom. The system can also track the location of the items, such as using surveillance camera feeds, or smartphone cameras, or other location-providing data sources. The system can provide a summary of all gifts in a particular room or at a particular address, for example.

Another embodiment, which is incorporated herein by reference from a priority case (application Ser. No. 13/754,401), and from which more information is found in the parent case, relates to converting value from one form of currency or media to another. Note FIGS. 32-36 in application Ser. No. 13/754,401. Disclosed are systems, methods, and non-transitory computer-readable storage media for converting gifts from one exchange medium to another exchange medium. A system implementing this method receives a request to convert a first gift amount associated with a first recipient account and a first policy from a first medium of exchange to a second medium of exchange. The first policy can indicate when a first qualifying transaction using the first recipient according to the first medium of exchange account would trigger application of the first gift amount to the first qualifying transaction. The system identifies a second recipient account associated with the second medium of exchange, and converts the first gift amount from the first medium of exchange to the second medium of exchange to yield a second gift amount. Then the system can adapt the first policy to a second policy associated with the second gift amount and the second medium of exchange, wherein the second policy indicates when a second qualifying transaction using the second recipient account according to the second medium of exchange would trigger application of the second gift amount to the second qualifying transaction. In one example, a gift giver provides value to fund a gift not using money, but instead using frequent flyer miles or some other non-currency based value storage medium. The giver provides the frequent flyer miles to the system, which debits the frequent flyer miles from the giver account, and uses that value to create a gift that is currency based and the associated policy governing the gift.

Also disclosed herein is another exemplary method embodiment for creating a gift in one medium of exchange from stored value in another medium of exchange. A system implementing an example method embodiment accesses a first account representing stored value in a first medium of exchange, and an amount of the stored value from the first medium of exchange is user selected or system selected. Then the system converts the amount of the stored value to a second medium of exchange to yield a converted amount, and the system or the user can give the converted amount in the second medium of exchange to a recipient as a gift, wherein the gift is associated with a recipient account for the second medium of exchange, and wherein the gift is associated with a policy monitoring transactions made using the recipient account such that the converted amount is applied to a transaction satisfying conditions of the policy. As an example of this scenario, a gift giver creates a gift and funds the gift with frequent flyer miles or some other non-currency based medium of exchange. The gift is funded using a different non-currency medium of exchange, such as gas points. The gift can have an associated policy governing the gift and its use, such as indicating a recipient account and conditions which a transaction must satisfy to trigger application of the gift. So the giver funds a gift using frequent flyer miles to create a gift and policy for a recipient to use with the recipient's gas point account under specific conditions.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data that cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of executable instructions or associated data structures represents examples of corresponding acts implementing the functions described in the steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or a combination thereof) through a communications network. In a distributed computing environment, program modules can reside in local and/or remote memory storage devices.

The various embodiments described above are provided by way of illustration only and should not be construed to limit the scope of the disclosure. For example, the principles herein are applicable to gift credits, virtual gift cards, gifts, associated with any type of payment mode, including cash, checks, credit cards, debit cards, loyalty cards, and so forth. The principles herein can be applied to any gift credit, gift card, gift or benefit that can be redeemed by using a payment mechanism to make a purchase in the normal fashion without the recipient using a separate physical card or entering a code. Any function disclosed herein in connection with one embodiment can be blended or incorporated into another embodiment. Given generally that redemption of a gift credit, gift card, gift or benefit is managed by a policy, any policy features discussed above can be blended to provide new policies, although such new policy is not specifically set forth in a single discussion of any embodiment. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving, via the Internet, a registration of a recipient payment account at a network-based service provider, the recipient payment account being associated with a recipient;
   receiving, from an entity, an identification of the recipient and a spending category, the recipient payment account being registered with the network-based service provider prior to the receiving of the identification;
   generating, via the network-based service provider, a policy comprising a gift credit and the spending category, wherein the policy is at least in part defined by the entity and wherein the policy is linked to the recipient payment account;
   transmitting, via a processor of a computing device and via a wireless communication channel, an electronic notice to a recipient device, the electronic notice referencing the policy;
   monitoring, via a processor of a computing device, purchasing transactions made using the recipient payment account via a payment processing system for a qualified purchase according to the policy; and
   based on the qualified purchase, transferring, via a processor of a computing device, the gift credit from an entity payment account to the recipient payment account.

2. The method of claim 1, wherein the recipient payment account is one of a debit account, a financial account, and a credit account.

3. The method of claim 1, wherein the entity comprises one of a business entity and a person.

4. The method of claim 1, wherein the spending category comprises at least one of a network merchant identification or a network merchant category.

5. The method of claim 1, further comprising:
receiving an initial amount of money from an entity account associated with the entity into a service provider account, wherein the gift credit is drawn from the initial amount of money.

6. The method of claim 1, wherein the gift credit is determined by comparing an initial amount of money received from the entity to a purchase amount associated with the qualified purchase.

7. The method of claim 6, wherein if the purchase amount is less than the initial amount of money, then the gift credit transferred to the recipient payment account is a full amount of the qualified purchase, and wherein if the purchase amount is more than the initial amount of money, then the gift credit transferred is the initial amount of money.

8. The method of claim 1, further comprising:
charging the recipient payment account for the qualified purchase; and
reimbursing the recipient payment account when the qualified purchase appears on a transaction history of the recipient payment account.

9. The method of claim 1, further comprising:
charging a percentage of an initial amount of money provided by the entity as a service fee for using the network-based service provider.

10. The method of claim 9, wherein one of the entity, the recipient and a third party is charged the percentage of the initial amount of money.

11. The method of claim 1, wherein the spending category comprises one of an individual point of sale, a chain of stores, and a plurality of businesses in a same industry.

12. The method of claim 1, wherein a third party pays at least a portion of an initial amount of money which funds the gift credit.

13. A system comprising:
a processor of a computer device; and
a non-transitory computer-readable storage medium storing instructions which, when executed by the processor of the computing device, cause the processor to perform operations comprising:
receiving, via the Internet, a registration of a recipient payment account at a network-based service provider, the recipient payment account being associated with a recipient;
receiving, from an entity, an identification of the recipient and a spending category, the recipient payment account being registered with the network-based service provider prior to the receiving of the identification;
generating, via the network-based service provider, a policy comprising a gift credit and the spending category, wherein the policy is at least in part defined by the entity and wherein the policy is linked to the recipient payment account;
transmitting, via a communication channel, an electronic notice to a recipient device, the electronic notice referencing the policy;
monitoring purchasing transactions made using the recipient payment account via a payment processing system for a qualified purchase according to the policy; and
based on the qualified purchase, transferring the gift credit from an entity payment account to the recipient payment account.

14. The system of claim 13, wherein the recipient payment account is one of a debit account, a financial account, and a credit account.

15. The system of claim 13, wherein the entity comprises one of a business entity and a person.

16. The system of claim 13, wherein the spending category comprises at least one of a network merchant identification or a network merchant category.

17. The system of claim 13, wherein the non-transitory computer-readable storage medium stores further instructions which, when executed by the processor of the computing device, cause the processor of the computing device to perform operations further comprising:
receiving an initial amount of money from an entity account associated with the entity into a service provider account, wherein the gift credit is drawn from the initial amount of money.

18. The system of claim 17, wherein if the gift credit is less than the initial amount of money, then the gift credit transferred to the recipient payment account is a full amount of the qualified purchase, and wherein if the gift credit is more than the initial amount of money, then the gift credit transferred is the initial amount of money.

19. The system of claim 13, wherein the non-transitory computer-readable storage medium stores further instructions which, when executed by the processor of the computing device, cause the processor of the computing device to perform operations further comprising:
charging the recipient payment account for the qualified purchase; and
reimbursing the recipient payment account when the qualified purchase appears on a transaction history of the recipient payment account.

20. A non-transitory computer-readable storage device storing instructions which, when executed by a processor of a computing device, cause the processor of the computing device to perform operations comprising:
receiving, via the Internet, a registration of a recipient payment account at a network-based service provider, the recipient payment account being associated with a recipient;
receiving, from an entity, an identification of the recipient and a spending category, the recipient payment account being registered with the network-based service provider prior to the receiving of the identification;
generating, via the network-based service provider, a policy comprising a gift credit and the spending category, wherein the policy is at least in part defined by the entity and wherein the policy is linked to the recipient payment account;
transmitting, via a communication channel, an electronic notice to a recipient device, the electronic notice referencing the policy;
monitoring purchasing transactions made using the recipient payment account via a payment processing system for a qualified purchase according to the policy; and
based on the qualified purchase, transferring the gift credit from an entity payment account to the recipient payment account.

* * * * *